United States Patent
Furlan et al.

(10) Patent No.: US 10,846,534 B1
(45) Date of Patent: Nov. 24, 2020

(54) SYSTEMS AND METHODS FOR AUGMENTED REALITY NAVIGATION

(71) Applicant: Capital One Services, LLC, McLean, VA (US)

(72) Inventors: Elizabeth Furlan, Plano, TX (US); Chih-Hsiang Chow, Coppell, TX (US); Steven Dang, Plano, TX (US)

(73) Assignee: CAPITAL ONCE SERVICES, LLC, McLean, VA (US)

( * ) Notice: Subject to any disclaimer, the term of this patent is extended or adjusted under 35 U.S.C. 154(b) by 0 days.

(21) Appl. No.: 16/821,526

(22) Filed: Mar. 17, 2020

(51) Int. Cl.
| | |
|---|---|
| G06T 19/00 | (2011.01) |
| G06K 9/00 | (2006.01) |
| G06K 9/48 | (2006.01) |
| G06K 9/62 | (2006.01) |
| G06T 19/20 | (2011.01) |
| G06T 7/90 | (2017.01) |
| G06Q 10/08 | (2012.01) |
| G06Q 40/02 | (2012.01) |
| G06Q 30/02 | (2012.01) |

(Continued)

(52) U.S. Cl.
CPC ......... *G06K 9/00671* (2013.01); *G01C 21/20* (2013.01); *G01S 19/39* (2013.01); *G06K 7/1417* (2013.01); *G06K 9/48* (2013.01); *G06K 9/6267* (2013.01); *G06N 3/04* (2013.01); *G06Q 10/087* (2013.01); *G06Q 30/0281* (2013.01); *G06Q 30/0625* (2013.01); *G06Q 30/0643* (2013.01); *G06Q 40/025* (2013.01); *G06T 7/74* (2017.01); *G06T 7/90* (2017.01); *G06T 19/006* (2013.01); *G06T 19/20* (2013.01); *G06F 3/0482* (2013.01); *G06F 3/04817* (2013.01); *G06K 2209/23* (2013.01); *G06N 3/08* (2013.01); *G06T 2200/24* (2013.01); *G06T 2207/10016* (2013.01); *G06T 2207/20084* (2013.01); *G06T 2207/30252* (2013.01); *G06T 2219/2012* (2013.01)

(58) Field of Classification Search
CPC ..................... G06T 19/006; G06K 9/00671
See application file for complete search history.

(56) References Cited

U.S. PATENT DOCUMENTS

| | | |
|---|---|---|
| 8,947,455 B2 | 2/2015 | Friesen |
| 10,067,568 B2 | 9/2018 | Di Censo et al. |

(Continued)

*Primary Examiner* — Yi Yang
(74) *Attorney, Agent, or Firm* — Finnegan, Henderson, Farabow, Garrett & Dunner LLP

(57) ABSTRACT

An augmented reality system including processors and storage devices storing instructions. The instructions may configure the processors to perform operations including determining a location of a mobile device, identifying a facility based on the location, requesting mapping data from a facility server, the mapping data comprising a plurality of vehicles, vehicle location data, and landmarks, identifying one location attribute in a video feed captured by an augmented reality viewer displayed in the mobile device, and determining whether the one location attribute matches the plurality of vehicles or the landmarks. The operations may also include identifying qualified vehicles from the vehicles based on qualification criteria, determining whether the qualified vehicles is in a field of view of the augmented reality viewer based on object attributes and the vehicle location data, and generating a modified video feed by providing an indication associated with qualified vehicles in the field of view.

19 Claims, 27 Drawing Sheets

(51) Int. Cl.
*G06Q 30/06* (2012.01)
*G06N 3/04* (2006.01)
*G06K 7/14* (2006.01)
*G01C 21/20* (2006.01)
*G01S 19/39* (2010.01)
*G06T 7/73* (2017.01)
G06N 3/08 (2006.01)
G06F 3/0481 (2013.01)
G06F 3/0482 (2013.01)

(56) References Cited

U.S. PATENT DOCUMENTS

| | | |
|---|---|---|
| 10,203,781 B2 | 2/2019 | Gavriliuc et al. |
| 10,540,819 B2 | 1/2020 | Aurongzeb et al. |
| 2003/0112154 A1* | 6/2003 | Yoakum ................ G08G 1/14 340/932.2 |
| 2011/0060653 A1* | 3/2011 | King ................ G06Q 30/0261 705/14.58 |
| 2015/0123966 A1 | 5/2015 | Newman |
| 2017/0103267 A1* | 4/2017 | Mishra ............... G06K 9/00973 |
| 2017/0237849 A1* | 8/2017 | Livingston ........ H04M 1/72577 455/418 |
| 2017/0329768 A1 | 11/2017 | Plowman et al. |
| 2018/0173953 A1* | 6/2018 | Ghata ................ G06K 9/6202 |
| 2018/0349699 A1* | 12/2018 | O'Connell ........... G06T 19/006 |
| 2018/0365578 A1* | 12/2018 | Naughton .............. G06N 5/045 |
| 2019/0019022 A1 | 1/2019 | Marda et al. |
| 2019/0236845 A1 | 8/2019 | Rhodes et al. |
| 2020/0003578 A1* | 1/2020 | Klinger ................ G01C 21/20 |

\* cited by examiner

1600

SYSTEMS AND METHODS FOR AUGMENTED REALITY NAVIGATION

TECHNICAL FIELD

The present disclosure relates generally to systems and methods for augmented reality navigation and, more particularly, to systems and methods combining augmented reality tools with image recognition techniques to generate augmented reality user interfaces that simplify navigating through facilities such as parking lots.

BACKGROUND

Augmented reality tools create interactive experiences in which real-time images of objects are enhanced by computer-generated perceptual information. Augmented reality tools can manipulate images of real environments by adding information (constructing over the natural environment), removing information (masking the natural environment), or modifying information (altering the natural environment). This manipulation of environments results in a seamless experience that merges physical elements with computer-generated features. Thus, augmented reality tools can alter a user's ongoing perception of a real-world environment.

Augmented reality has been explored for multiple applications in education, entertainment, healthcare, and marketing, among others. For example, augmented reality tools have been used to create new types of video games. Also, augmented reality has been used for in-store marketing, interactive textbooks, and medical training. However, there are certain applications where augmented reality has not been successfully deployed, or it has been difficult to incorporate. For example, it has been challenging to effectively incorporate augmented reality in navigation applications. Navigation applications demand fast response times that are unattainable with some augmented reality technology. Moreover, it has been difficult to incorporate augmented reality technology in navigation tools because such integration may require employing high-performance devices that can be expensive or not readily available. For instance, many augmented reality techniques require significant computing resources that are not available in common devices, such as smartphones. These and other technical challenges have prevented the effective incorporation of augmented reality in navigation tools.

The disclosed systems and methods for augmented reality navigation address one or more of the problems set forth above and/or other problems in the prior art.

SUMMARY

One aspect of the present disclosure is directed to an augmented reality system. The system may include one or more processors and one or more storage devices storing instructions that, when executed, configure the one or more processors to perform operations. The operations may include determining a location of a mobile device, identifying a facility based on the location, requesting mapping data from a facility server (the mapping data comprising a plurality of vehicles, vehicle location data, and landmarks), identifying at least one location attribute in a video feed captured by an augmented reality viewer displayed in the mobile device, and determining whether the at least one location attribute matches at least one of the plurality of vehicles or the landmarks. The operations may also include, in response to determining the at least one location attribute matches at least one of the plurality of vehicles or the landmarks, identifying qualified vehicles from the plurality of vehicles based on qualification criteria, determining whether at least one of the qualified vehicles is in a field of view of the augmented reality viewer based on object attributes (identified in the field of view) and the vehicle location data, and generating a modified video feed by providing an indication associated with qualified vehicles in the field of view.

Another aspect of the present disclosure is directed a non-transitory computer-readable medium storing instructions that, when executed by a processor, cause the processor to operate an augmented reality system. The operations may include determining a location of a mobile device, identifying a facility based on the location, requesting mapping data from a facility server (the mapping data comprising a plurality of vehicles, vehicle location data, and landmarks), identifying at least one location attribute in a video feed captured by an augmented reality viewer displayed in the mobile device, and determining whether the at least one location attribute matches at least one of the plurality of vehicles or the landmarks. The operations may also include, in response to determining the at least one location attribute matches at least one of the plurality of vehicles or the landmarks, identifying qualified vehicles from the plurality of vehicles based on qualification criteria, determining whether at least one of the qualified vehicles is in a field of view of the augmented reality viewer based on object attributes (identified in the field of view) and the vehicle location data, and generating a modified video feed by providing an indication associated with qualified vehicles in the field of view.

Yet another aspect of the present disclosure is directed to a computer-implemented method for generating augmented reality images. The method may include determining a location of a mobile device, identifying a facility based on the location, requesting mapping data from a facility server (the mapping data comprising a plurality of vehicles, vehicle location data, and landmarks), identifying at least one location attribute in a video feed captured by an augmented reality viewer displayed in the mobile device, and determining whether the at least one location attribute matches at least one of the plurality of vehicles or the landmarks. The method may also include, in response to determining the at least one location attribute matches at least one of the plurality of vehicles or the landmarks, identifying qualified vehicles from the plurality of vehicles based on qualification criteria, determining whether at least one of the qualified vehicles is in a field of view of the augmented reality viewer based on object attributes (identified in the field of view) and the vehicle location data, and generating a modified video feed by providing an indication associated with qualified vehicles in the field of view.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
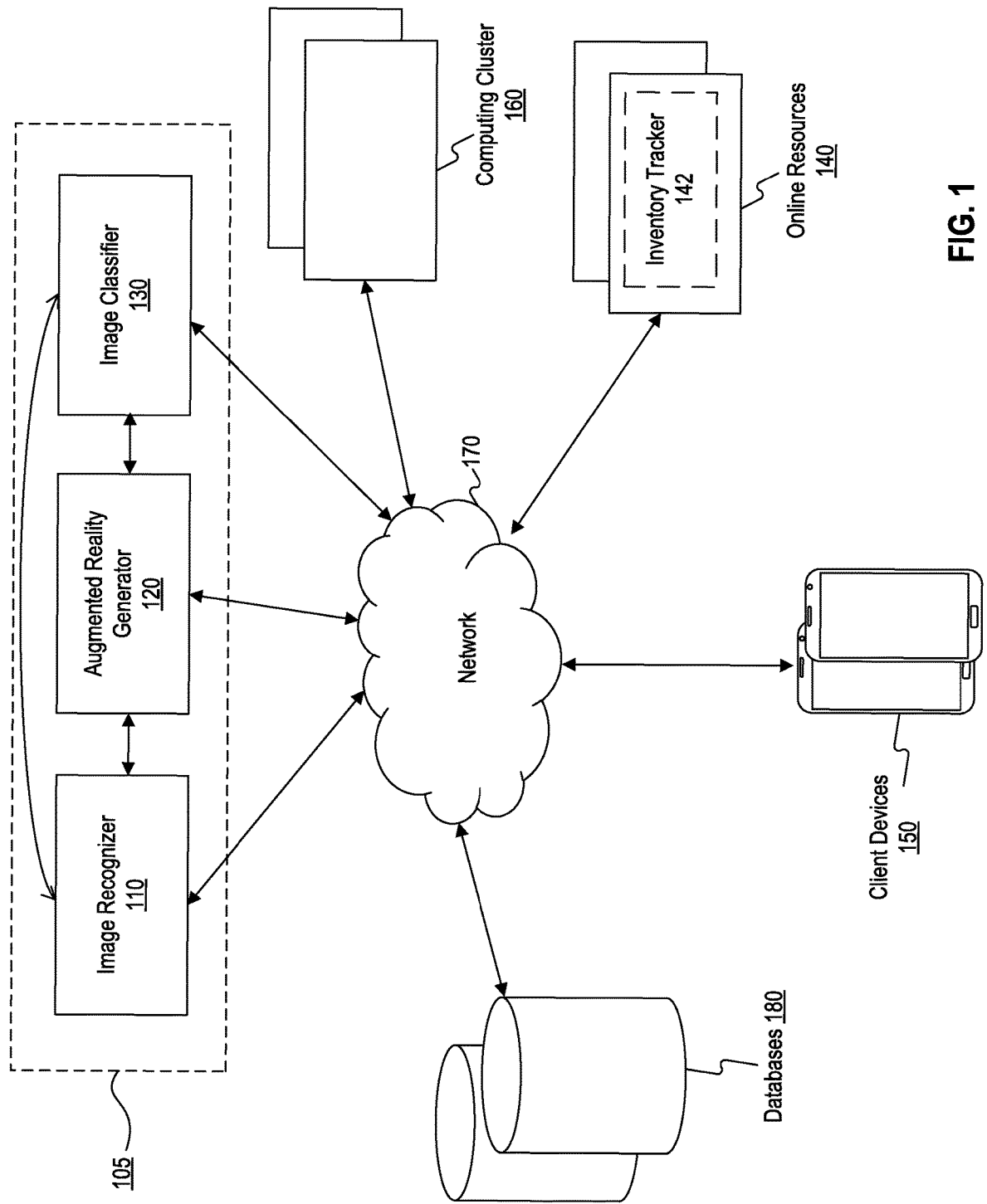
FIG. 1 is a block diagram of an exemplary system, consistent with disclosed embodiments.

The disclosure is generally directed to systems and methods for augmented reality navigation. The disclosed systems and methods may improve augmented reality (AR) tools for indoor and outdoor navigation by combining machine learning methods for image recognition with positioning systems. This combination allows the disclosed systems and methods to provide AR graphical user interfaces (GUIs) where items selected items can be highlighted in real time to facilitate indoor or outdoor navigation. For example, in some embodiments the disclosed systems may identify the location of a user using GPS information, correlate the user location with mapping data (which may be received from a third party), and associate items displayed in an AR viewer of a mobile device with the features retrieved from the mapping data. Based on these correlations, the disclosed systems and methods may create AR GUIs that highlight items of interest for a user, as the user navigates through the facility or location. Thus, the disclosed systems and methods may improve AR navigation by compiling information from different sources (e.g., from both facilities mapping data and image recognition) to identify items that are of interest to the user and create AR GUIs with modified video feeds that highlight items based on user preferences.

Further, the disclosed systems and methods may improve location services using image recognition techniques. In places in which traditional location services like GPS are unreliable, such as indoor locations, the disclosed systems and methods may improve accuracy by associating objects identified in an AR viewer with mapping information, which may be collected a priori from the location. For example, the disclosed systems and methods may improve indoor navigation in a facility by correlating landmarks in mapping data (which may be a digital file detailing the location of landmarks and objects relative to each other) with the landmarks identified in an augmented reality viewer. Then, the disclosed systems and methods may improve the precision of navigation tools because elements recognized in an AR viewer may be used to correct the position objects and/or the direction of a user.

The disclosed systems and methods may also facilitate finding specific items of interest in a location using AR tools. Thus, the disclosed systems and methods may improve image or real-time search tools. A user that is interested in a specific item or location may get directions to the item or location with AR GUIs. For example, a user in a parking lot that is looking for a specific vehicle may use disclosed AR GUIs to get directions for the specific vehicle. The combination of employing image recognition, location services, and mapping information, allows the disclosed systems and methods to generate guiding AR GUIs that help searching within a facility.

Moreover, the disclosed systems and methods may also improve augmented reality browsing tools to enhance customer experience when evaluating multiple items in a facility. The disclosed systems and methods may generate AR GUIs that modify the environment in the video feed to highlight items that are qualified under certain pre-determined parameters. For example, a user shopping for a new vehicle may use the disclosed systems and methods to highlight only vehicles that are within a predetermined price range. In such embodiments, the disclosed systems and methods may identify vehicles in a field of view of an AR viewer, determine which ones of the vehicles are within some qualification criteria, and modify video feeds presented to the user to highlight the vehicles that qualify for the selected criteria. Alternatively, or additionally, the disclosed systems and methods may improve browsing tools by masking or hiding not qualified vehicles. Additionally, the disclosed systems and methods may improve browsing tools by digitally highlighting vehicles that are of interest to the user and/or removing the vehicles that are not of interest to the user.

Some embodiments of the disclosed systems and methods may also facilitate the generation of AR GUIs employing pre-stored AR models and/or using pixel-modification methods that change the appearance of objects in AR viewers. For example, to minimize computation time, the disclosed systems and methods may recall AR models for vehicles based on make/model classifications. In such embodiments, an object in the AR viewer may be classified in one or more of predetermined categories (e.g., using convolutional neural networks (CNNs)). Based on the classification, the disclosed systems and methods may identify an AR model for the object. Then, this model may be displayed anchored in the AR viewer (i.e., overlying the AR model over the detected object) and video feeds may be modified. The combination of machine-learning identification and pre-created AR models may allow the disclosed methods to improve the response time of AR GUIs, facilitating their incorporation in navigation tools. Alternatively, or additionally, the disclosed systems and methods may include methods of quickly modifying video feeds by providing indications associated with specific items in the video feed. For example, when there are no augmented reality models, the disclosed systems and methods may improve the generation of augmented reality models by generating pixel-based modifications and/or including simple labels or tags on the video display in AR viewers.

Moreover, the disclosed systems and methods may improve AR navigation by providing multi-tiered identification methods that enhance image recognition accuracy. Some embodiments of the disclosed systems and methods may use a combination of image identification, QR code identification, and real-time inventory trackers to identify items in a field of view. With this multi-tiered process, even if one of the identification methods is unsuccessful, other identification methods may result in successful identification. For example, standard image recognition may be unable to identify a specific vehicle in a parking lot (e.g., the lighting condition is poor), the disclosed systems and methods may still be able to identify the vehicle using QR codes associated with the vehicle. Alternatively, or additionally, the disclosed systems and methods may improve accuracy of the identification using real-time inventory tracking systems to correct recognition results based on, for example, parking lot number or surrounding landmarks. Hence, disclosed multi-tiered or multi-path approach to image recognition allows the disclosed systems and methods to provide more accurate augmented reality GUIs.

Further the disclosed systems and methods may be employed to effectively manage screen space. Particularly for portable devices, in which the screen space is limited, the disclosed systems and methods may generate dynamic GUIs that specifically display elements that are relevant for a user search while removing irrelevant elements. For example, the disclosed methods generate AR GUIs that, based on user selections, maximize screen space by eliminating, minimizing, enlarging, hiding, and/or re-shaping items in a field of view. These GUI configurations may facilitate performing searching or browsing tasks.

Some embodiments of the disclosed systems and methods may be tailored to improve the technical field of identifying images of vehicles. Image identification of vehicles may be particularly useful when using mobile devices because it enables the combination of multiple capabilities currently available in portable devices. For example, the disclosed systems and methods may combine smartphone location tracking, camera, and computing power to identify vehicles based on multi-sourced information. Accordingly, the disclosed systems and methods may improve the technical field of recognizing vehicle images by coordinating communication between different elements of the system, reducing latency between the communications, reducing bandwidth utilization, and improving accuracy and relevance of the results presented to the user.

Reference will now be made in detail to the disclosed embodiments, examples of which are illustrated in the accompanying drawings.

FIG. 1 is a block diagram of an exemplary system 100, consistent with disclosed embodiments. System 100 may be used to identify a vehicle and associated attributes based on an image of the vehicle, consistent with disclosed embodiments. System 100 may include an augmented reality (AR) system 105 which may include an image recognizer 110, an augmented reality (AR) generator 120, and an image classifier 130. System 100 may additionally include online resources 140, client devices 150, computing clusters 160, and databases 180. In some embodiments, as shown in FIG. 1, components of system 100 may be connected to a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with hosting services or servers that store web pages for car manufacturers and/or car dealers. In other embodiments, online resources 140 may be associated with a cloud computing service. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as image compression, notification of identified vehicles alerts, and/or completion messages and notifications.

In some embodiments, as shown in FIG. 1, one or more of online resources 140 may include inventory trackers 142. Inventory trackers 142 may be a system that uses image recognition and location systems to determine the location of items within a facility. In some embodiments, online resources 140 that are associated with a facility have information about the facility, and may be included in, or coupled to the facility. For example, online resources 140 may be associated with vehicle dealerships. Such online resources 140 may be coupled to one or more inventory trackers 142 that track the position of vehicles within the dealership. In such embodiments, inventory trackers 142 may include a system that collects images from front/rear cameras of vehicles in the dealership (also known as dash or parking assistance cameras) and determine the position of vehicles within the dealership by analyzing the captured images. For example, inventory trackers 142 may analyze images collected from vehicles in the dealership to determine an associated parking lot number. In other embodiments, inventory trackers 142 may include item positioning systems using, for example, RFID tags or BLE Beacons to track and identify the location of items within the facility associated with online resources 140. Inventory trackers 142 may be used to implement real-time inventory tracking that provides mapping data for location services.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may include software that, when executed by a processor, performs known Internet-related communication and content display processes. For instance, client devices 150 may execute browser software that generates and displays interfaces including content on a display device included in, or connected to, client devices 150. Client devices 150 may execute applications that allows client devices 150 to communicate with components over network 170 and generate and display content in interfaces via display devices included in client devices 150. The display devices may be configured to display GUIs described in FIGS. 21-27. The disclosed embodiments are not limited to any particular configuration of client devices 150. For instance, a client device 150 may be a mobile device that stores and executes mobile applications to perform operations that provide functions offered by AR system 105 and/or online resources 140, such as providing information about vehicles in a database 180. In certain embodiments, client devices 150 may be configured to execute software instructions relating to location services, such as GPS systems. For example, client devices 150 may be configured to determine a geographic location and provide location data and time-stamp data corresponding to the location data. In yet other embodiments, client devices 150 may have camera 620 to capture video and/or still images.

While client devices 150 and AR system 105 are shown as different elements in system 100, in some embodiments these elements may be combined. For example, in certain embodiments AR system 105 may be implemented within one or more client devices 150. Client devices are further described below in connection with FIG. 6.

Computing clusters 160 may include a plurality of computing devices in communication. For example, in some embodiments, computing clusters 160 may be a group of processors in communication through fast local area networks. In other embodiments computing clusters 160 may be an array of graphical processing units configured to work in parallel as a GPU cluster. In some embodiments, computing clusters 160 may include a GPU driver for each type of GPU present in each cluster node, a Clustering API (such as the Message Passing Interface, MPI), and VirtualCL (VCL) cluster platform such as a wrapper for OpenCL™ that allows most unmodified applications to transparently utilize multiple OpenCL devices in a cluster.

Databases 180 may include one or more computing devices and storage devices configured with appropriate software to perform operations consistent with providing AR system 105, AR generator 120, and image classifier 130 with data associated with vehicle images, vehicle features, and stored information about vehicle sales like cost or condition. Databases 180 may include, for example, Oracle™ databases, Sybase™ databases, or other relational databases or non-relational databases.

While databases 180 are shown separately, in some embodiments databases 180 may be included in or otherwise related to one or more of AR system 105, image recognizer 110, AR generator 120, image classifier 130, and online resources 140.

Databases 180 may be configured to collect and/or maintain the data associated with vehicles being displayed in online resources 140 and provide it to the AR system 105, model generator 120, image classifier 130, and client devices 150. Databases 180 may collect the data from a variety of sources, including, for instance, online resources 140. Databases 180 are further described below in connection with FIG. 5.

Image classifier 130 may include one or more computing systems that collect images and process them to create training data sets that can be used to develop image identification models. For example, image classifier 130 may include an image collector 410 (FIG. 4) that collects images in an AR viewer that are then used for training a linear regression classifier or a convolutional neural network.

AR generator 120 may include one or more computing systems configured to generate augmented reality GUIs. AR generator 120 may receive or obtain information from databases 180, computing clusters 160, online resources 140, and image classifier 130. For example, AR generator 120 may receive a plurality of AR models from databases 180 and/or online resources 140. In some embodiments, AR generator 120 may receive requests from client devices 150. As a response to the request, AR generator 120 may manipulate video feeds captured with an AR viewer based on the user preferences and classifications.

In some embodiments, AR generator 120 may employ a series of pre-programmed modules to manipulate or modify captured video feeds to highlight object, mask objects, or include tags. For example, AR generator 120 may create AR GUIs using WebXR™ APIs and standards for rendering 3D scenes. In such embodiments, AR generator 120 may perform WebXR functions for initiating a modified video session such as:
enum XRSessionMode {"inline", "immersive-vr", "immersive-ar"};
navigator.xr.supportsSession('immersive-ar').then(( )=>{// 'immersive-ar' sessions supported.}

Further, AR generator 120 may perform functions to generate blended environments, which combine objects or images of the captured video feed with computer-generated features. For example, AR generator 120 may perform WebXR functions as:
enum XREnvironmentBlendMode {"opaque", "alpha-blend", "additive"};
partial interface XRSession {//Attributes readonly attribute XREnvironmentBlendMode environmentBlendMode;}.

Additionally, or alternatively, AR generator 120 may perform functions to dictate behaviors of elements added, masked, or modified in the video feed. For example, AR generator 120 may present content applying a specific blending technique to combine virtual pixels with the real-world environment. The appropriate technique and behavior of the element may be determined based on the target device's display technology and the mode. In such embodiments, AR generator 120 may choose to perform opaque, alpha-blend, or additive environments. When performing opaque environment blending, AR generator 120 may render buffers obtained by a mobile device and source-over blending on top of buffers containing exclusively 100% opaque black pixels and applying opaque and pass-through displays when the mode is set to either "immersive-vr" or "inline."

Alternatively, or additionally, AR generator 120 may perform operations for alpha-blend environment blending, using source-over blending on top of buffers and manipulating pixel representations of the captured environment. In such embodiments, AR generator 120 may align pixel representations with XRFrames to transform each view. Furthermore, in some embodiments AR generator 120 may perform operations for additive environment blending, in which AR generator 120 may render buffers obtained in an augmented reality viewer and create a composite using lighter blending before being presented on a mobile device. AR generator is further described in connection with FIG. 3.

Image recognizer 110 may include one or more computing systems configured to perform operations consistent with identifying vehicle images. In some embodiments, Image recognizer 110 may receive a request to identify an image. Image recognizer 110 may receive the request directly from client devices 150. Alternatively, image recognizer 110 may receive the request from other components of system 100. In some embodiments, image recognizer may employ image identification models that may represent an input layer and an output layer connected via nodes with different activation functions as in a convolutional neural network. "Layers" in the neural network may transform an input variable into an output variable (e.g., holding the class scores) through a differentiable function. The convolutional neural network may include multiple distinct types of layers. For example, the network may include a convolution layer, a pooling layer, a ReLU Layer, a number filter layer, a filter shape layer, and/or a loss layer. Further, the convolution neural network may comprise a plurality of nodes. Each node may be associated with an activation function and each node maybe connected with other nodes via synapsis that are associated with a weight. Identification models of image recognizer 110 may also include Random Forests, composed of a combination of decision tree predictors. Moreover, image recognizer 110 may generate an identification result based on the information received from client devices 150 requests and transmit the information to other elements of system 100.

FIG. 1 shows image recognizer 110, AR generator 120, and image classifier 130 as a different components. However, image recognizer 110, AR generator 120, and image classifier 130 may be implemented in the same computing system. For example, all elements in AR system 105 may be embodied in a single server or in one of client devices 150. For example, a smartphone may be used to perform AR system 105 and include each of the image recognizer 110, AR generator 120, and image classifier 130 implemented within the processor of the smartphone.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
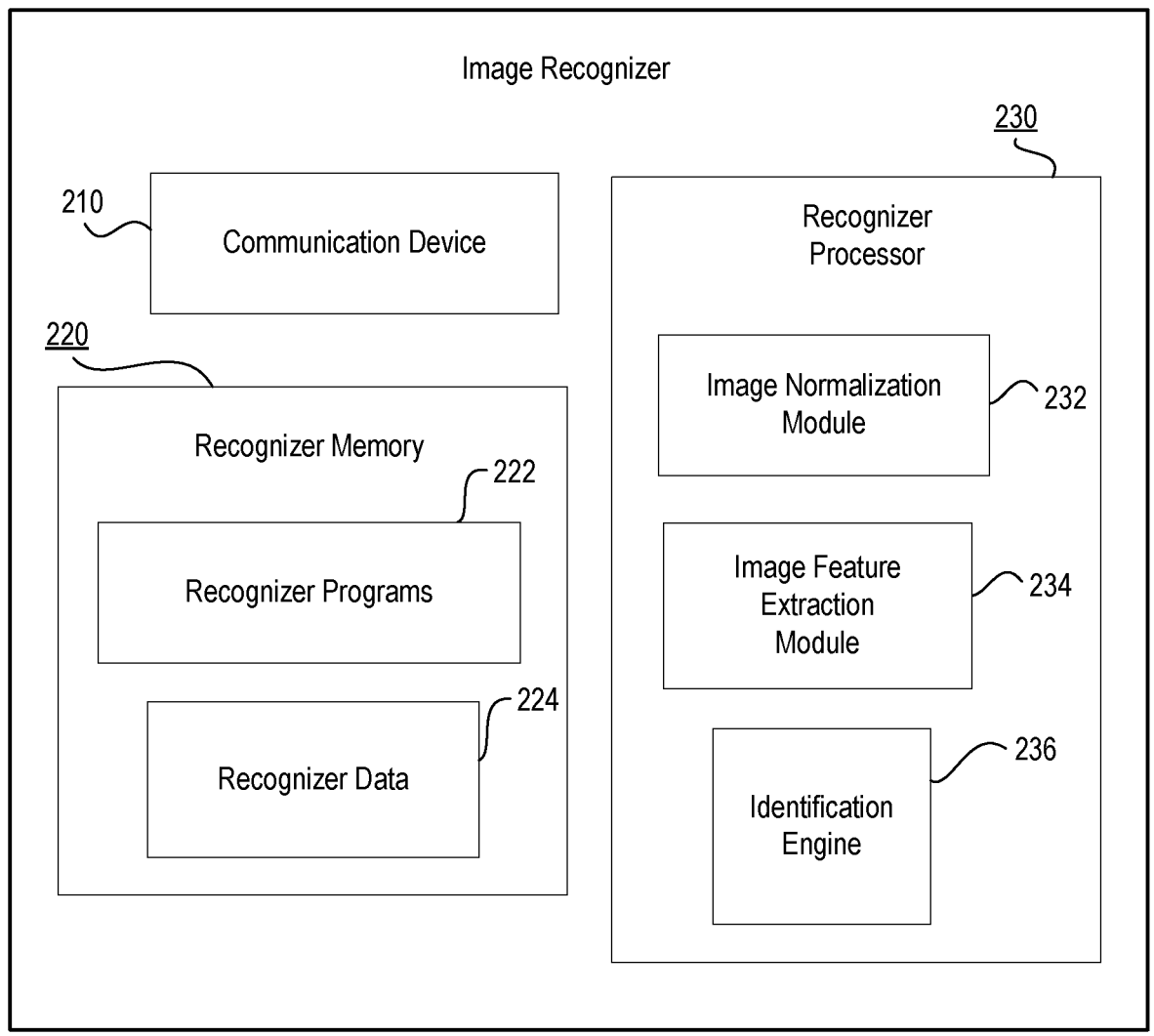
FIG. 2 is a block diagram of an exemplary image recognizer, consistent with disclosed embodiments.

FIG. 2 shows a block diagram of an exemplary image recognizer 110 (FIG. 1), consistent with disclosed embodiments. Image recognizer 110 may include a communication device 210, a recognizer memory 220, and one or more recognizer processors 230. Recognizer memory 220 may include recognizer programs 222 and recognizer data 224. Recognizer processor 230 may include an image normalization module 232, an image feature extraction module 234, and an identification engine 236.

In some embodiments, image recognizer 110 may take the form of a server, a general-purpose computer, a mainframe computer, or any combination of these components. In other embodiments, image recognizer 110 may be a virtual machine. In yet other embodiments, operations and functions described for image recognizer 110 may be implemented by client devices 150 and processing units in client devices 150.

Communication device 210 may be configured to communicate with one or more databases, such as databases 180 described above, either directly, or via network 170. Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Recognizer memory 220 may include one or more storage devices configured to store instructions used by recognizer processor 230 to perform functions related to disclosed embodiments. For example, recognizer memory 220 may store software instructions, such as recognizer program 222, that may perform operations when executed by recognizer processor 230. The disclosed embodiments are not limited to separate programs or computers configured to perform dedicated tasks.

In certain embodiments, recognizer memory 220 may store sets of instructions for carrying out processes to identify a vehicle from an image, generate a list of identified attributes, and/or generate instructions to display a modified graphical user interface, described below in connection with FIGS. 21-27. In certain embodiments, recognizer memory 220 may store sets of instructions for identifying whether an image is acceptable for processing and generate instructions to guide the user in capturing an acceptable image. Other instructions are possible as well. In general, instructions may be executed by recognizer processor 230 to perform processes consistent with disclosed embodiments.

In some embodiments, recognizer processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, recognizer processor 230 may be a plurality of devices coupled and configured to perform functions consistent with the disclosure.

In some embodiments, recognizer processor 230 may execute software to perform functions associated with each component of recognizer processor 230. In other embodiments, each component of recognizer processor 230 may be an independent device.

Image normalization module 232 may normalize a received image so it can be identified in the model. For example, communication device 210 may receive an image or video feed from client devices 150 to identify objects. The image may be in a format that cannot be processed by image recognizer 110 because it is in an incompatible format or may have parameters that cannot be processed. For example, an image may be received in a specific format such as High Efficiency Image File Format (HEIC) or in a vector image format such as Computer Graphic Metafile (CGM). Then, image normalization module 232 may convert the received image to a standard format such as JPEG or TIFF. Alternatively, or additionally, the received image may have an aspect ratio that is incompatible with an identification model. For example, the image may have a 2.39:1 ratio, that may be incompatible with the identification model. Then, image normalization module 232 may convert the received image to a standard aspect ratio such as 4:3. In some embodiments, the normalization may be guided by a model image. For example, a model image stored in recognizer data 224 may be used to guide the transformations of the received image.

In some embodiments, recognizer processor 230 may implement image normalization module 232 by executing instructions to create an application in which images are received and transformed. In other embodiments, however, image normalization module 232 may be a separate hardware device or group of devices configured to carry out image operations.

Image feature extraction module 234 may extract features from a received image, a video feed, or a normalized image. In some embodiments, features may be extracted from an image by applying a pre-trained convolutional neural network. For example, in some embodiments pre-trained networks such as Inception-v3, AlexNet, or TensorFlow may be used to automatically extract features from a target image. In such embodiments, feature extraction module 234 may import layers of a pre-trained convolutional network, determine features described in a target layer of the pre-trained convolutional network, and initialize a multiclass fitting model using the features in the target layer and images received for extraction.

In other embodiments, other deep learning models such as Fast R-CNN can be used for automatic feature extraction. In yet other embodiments, processes such as histogram of oriented gradients (HOG), speeded-up robust features (SURF), local binary patterns (LBP), color histogram, or Haar wavelets may also be used to extract features from a received image.

Recognizer processor 230 may implement image feature extraction module 234 by executing software to create an environment for extracting image features. However, in other embodiments, image feature extraction module 234 may include independent hardware devices with specific architectures designed to improve the efficiency of aggregation or sorting processes. For example, image feature extraction module 234 may be a GPU array configured to partition and analyze layers in parallel. Alternatively, or additionally, image feature extraction module 234 may be configured to implement a programming interface, such as Apache Spark™, and execute data structures, cluster managers, and/or distributed storage systems. For example, image feature extraction module 234 may include a resilient distributed dataset that is manipulated with a standalone software framework and/or a distributed file system.

Identification engine 236 may calculate correlations between a received image and stored attributes based on one or more identification models. For example, identification engine 236 may use a model from model generator 120 and apply inputs based on a received image or received image features to generate an attributes list associated with the received image.

Identification engine 236 may be implemented by recognizer processor 230. For example, recognizer processor 230 may execute software to create an environment to execute models from model generator 120. However, in other embodiments identification engine 236 may include hardware devices configured to carry out parallel operations.

The components of image recognizer 110 may be implemented in hardware, software, or a combination of both. For example, although one or more components of image recognizer 110 may be implemented as computer processing instructions embodied in computer software, all or a portion of the functionality of image recognizer 110 may be implemented in dedicated hardware.

Figure 3:
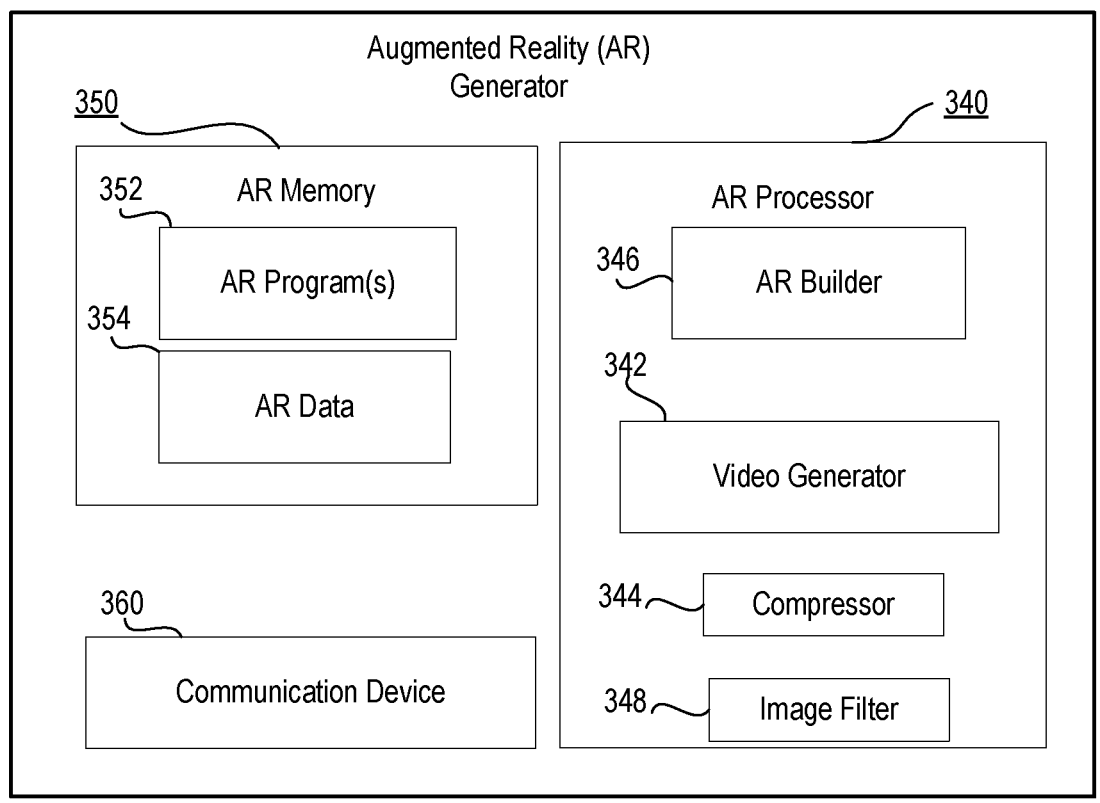
FIG. 3 is a block diagram of an exemplary augmented reality generator, consistent with disclosed embodiments.

Referring now to FIG. 3, there is shown a block diagram of an exemplary AR generator 120 (FIG. 1), consistent with disclosed embodiments. AR generator 120 may include an AR processor 340, an AR memory 350, and a communication device 360.

AR processor 340 may be embodied as a processor similar to recognizer processor 230. AR processor 340 may include an AR builder 346, a video generator 342, a compressor 344, and an image filter 348.

AR builder 346 may be implemented in software or hardware configured to create identification models based on training data. In some embodiments, AR builder 346 may generate AR models that can be then used to generate modified video feeds. For example, AR builder 346 may take a video feed of a natural environment, analyze objects within the field of view and generate an AR model to create a modified video feed. In some embodiments, AR builder 346 may perform operations known in the art to generate 3D AR models of vehicles based on their make, model, and trim line. In addition, AR generator 120 may be configured to load a generic 3D model, convert the generic 3D model to a specific format, generate anchor points for the model, customize the 3D model based on the target make, model, and trim line of the vehicle, and generate a model file for modifying video feeds. In some embodiments, the customization of the AR model may be based on attributes extracted with a CNN from images of sample vehicles with the target make, model, and trim line. Additionally, or alternatively, AR builder 346 may also perform operations program operations for the AR model such as adding animations and/or adding texture. AR builder 346 may employ additional or alternative techniques for constructing AR models.

Video generator 342 may be implemented in software or hardware configured to create modified video feeds that can be displayed in augmented reality viewers, as further disclosed in connection to FIGS. 21-27. Video generator 342 may utilize software development kits to generate modified video feeds and/or include computer generated elements in video feeds being displayed in client devices. Video generator 342 may use AR applications that permits placing virtual objects through camera viewers and adjusting the position of the virtual objects in front of the lens.

In some embodiments, video generator 342 may be initialized after image recognizer 110 identifies objects in a video feed and AR generator 120 receives instructions to modify the video. Video generator 342 may then select a target image for modification, add required models (for example models developed by AR builder 346), add GUI settings, and create scripts for adding elements into the video feed. Alternatively, or additionally, video generator 342 may be configured to generate scripts that perform pixel operations in video feeds. For example, video generator 342 may manipulate video feeds to change color of pixels. In such embodiments, video generator 342 may be configured to identify colors of pixels in an area (e.g., within a vehicle layout), determine a color gradient with adjacent pixels, identify a texture of the vehicle, and generate video filters or conversion operations that change the colors of specific pixels. Furthermore, in some embodiments video generator 342 may utilize video editing tools to include labels or images in a video feed and generate augmented reality views.

Compressor 344 may be implemented in software or hardware configured to create identification models based on training data. Compressor 344 may perform operations to reduce the file size of video feeds and AR GUIs. Compressor 344 may use video codecs to store the separate but complementary data streams as one combined package. Compressor 344 may use lossless or lossy video compression methods. Compressor 344 may use compression techniques used in video coding standards such as discrete cosine transform (DCT) and motion compensation (MC).

Image filter 348 may be implemented in software or hardware configured to prepare video streams for augmented reality insertion. One challenge in implementing augmented reality navigation tools is the lack of uniformity in the images received from mobile devices. This problem is particularly exacerbated for augmented reality applications that have images in multiple angles, with varying contrast, and in movement. To enhance accuracy and prevent sending error messages requesting the user to capture and send new images, image filter 348 may enhance specific features that are used by AR builder 346 and video generator 342 when creating the AR video feeds. For example, image filter 348 may enhance contrast or increase color hue in an image to more clearly identify key features in the image and prepare AR models or facilitate video editing.

AR memory 350 may include one or more storage devices configured to store instructions used by AR processor 340 to perform operations related to disclosed embodiments. For example, AR memory 350 may store software instructions, such as AR program(s) 352, that may perform operations when executed by AR processor 340. In addition, AR memory 350 may include AR data 354, which may include already-generated AR models. For example, AR data 354 may include AR models of vehicles that are being categorized based on model, trim line, and/or model year. Additionally, or alternatively, AR data 354 may include information from third parties in order to generate AR models. For example, AR data 354 may include mapping data from third parties that can be included as part of the AR models. For example, AR models may include models for both vehicles and landmarks in a map.

Figure 4:
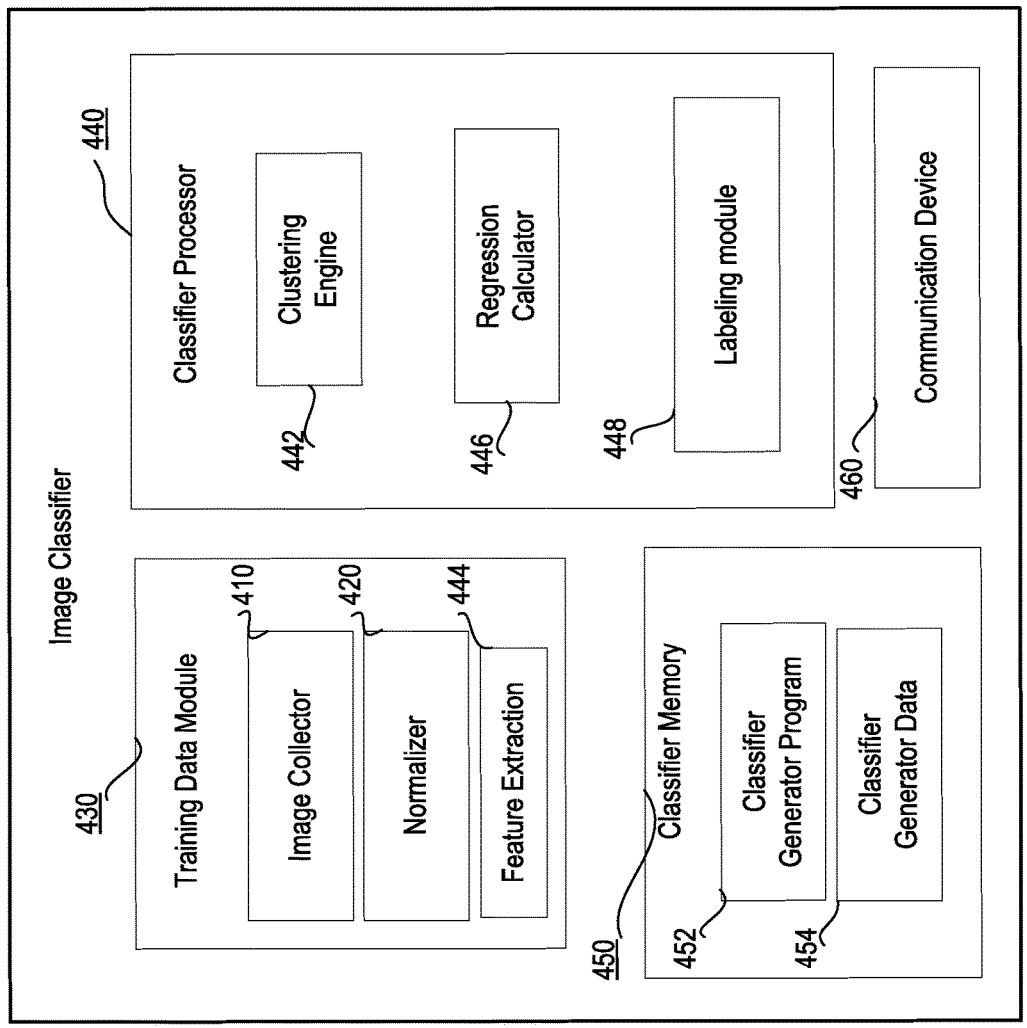
FIG. 4 is a block diagram of an exemplary image classifier, consistent with disclosed embodiments.

Referring now to FIG. 4, there is shown a block diagram of an exemplary image classifier 130 (FIG. 1), consistent with disclosed embodiments. Image classifier 130 may be configured to facilitate the generation of groups of images for training convolutional networks and allowing identification of objects in an AR viewer. Image classifier 130 may include a training data module 430, a classifier processor 440, and a classifier memory 450.

Data training module 430 may include an image collector 410, an image normalizer module 420, and a feature extraction module 444.

Image collector 410 may be configured to search for images associated with key words. In some embodiments, image collector 410 may collect images from online resources 140 and store them in classifier memory 450

Training data module 430 may additionally include an image normalization module 420, similar to the image normalization module 232. However, in some embodiments, image normalization module 420 may have a different model image resulting in a different normalized image. For example, the model image in image normalization module 420 may have a different format or different size.

Training data module 430 may have a feature extraction module 444 configured to extract features of images. In some embodiments, feature extraction module 444 may be similar to the image feature extraction module 234. For example, image feature extraction module 234 may also be configured to extract features from using CNNs. In other embodiments, images that are collected by image collector 410 and normalized by image normalization module 420 may be processed by feature extraction module 444. In yet other embodiments, feature extraction module 444 may implement feature extraction techniques as compiled functions that feed-forward data into an architecture to the layer of interest in the neural network. For instance, feature extraction module 444 may implement the following script:

dense_layer=layers.get_output(net1.layers_['dense'], deterministic=True)
output_layer=layers.get_output(net1.layers_['output'], deterministic=True)
input_var=net1.layers_['input'].input_var
f_output=t.function([input_var], output_layer)
f_dense=t.function([input_var], dense_layer)

In other embodiments, feature extraction module 444 may implement engineered feature extraction methods such as scale-invariant feature transform, Vector of Locally Aggregated Descriptors (VLAD) encoding, or extractHOGFeatures, among others. Alternatively, or additionally, feature extraction module 444 may use discriminative features based in the given context (i.e. Sparse Coding, Auto Encoders, Restricted Boltzmann Machines, PCA, ICA, K-means).

Image classifier 130 may include a classifier processor 440 which may include clustering engine 442, a regression calculator 446, and a labeling module 448. In some embodiments, classifier processor 440 may cluster images based on the extracted features using classifier processor 440, particularly clustering engine 442.

Clustering engine 442 may be a processor configured to perform a density-based spatial clustering of applications with noise (DBSCAN). In some embodiments, clustering engine 442 may transmit information to labeling module 448. Labeling module 448 may be configured to add or modify metadata associated with images clustered by clustering engine 442.

In some embodiments, a regression calculator 446 may generate a logistic regression classifier based on the images that have been labeled by labeling module 448. In some embodiments, regression calculator 446 may develop a sigmoid or logistic function that classifies images.

Classifier memory 450 may include one or more storage devices configured to store instructions used by classifier processor 440 to perform functions related to disclosed embodiments. For example, classifier memory 450 may store software instructions, such as a classifier generator program 452, that may perform one or more operations when executed by classifier processor 440. In addition, classifier memory 450 may include model data 354 (FIG. 3), which may include images for the regression calculator 446.

Figure 5:
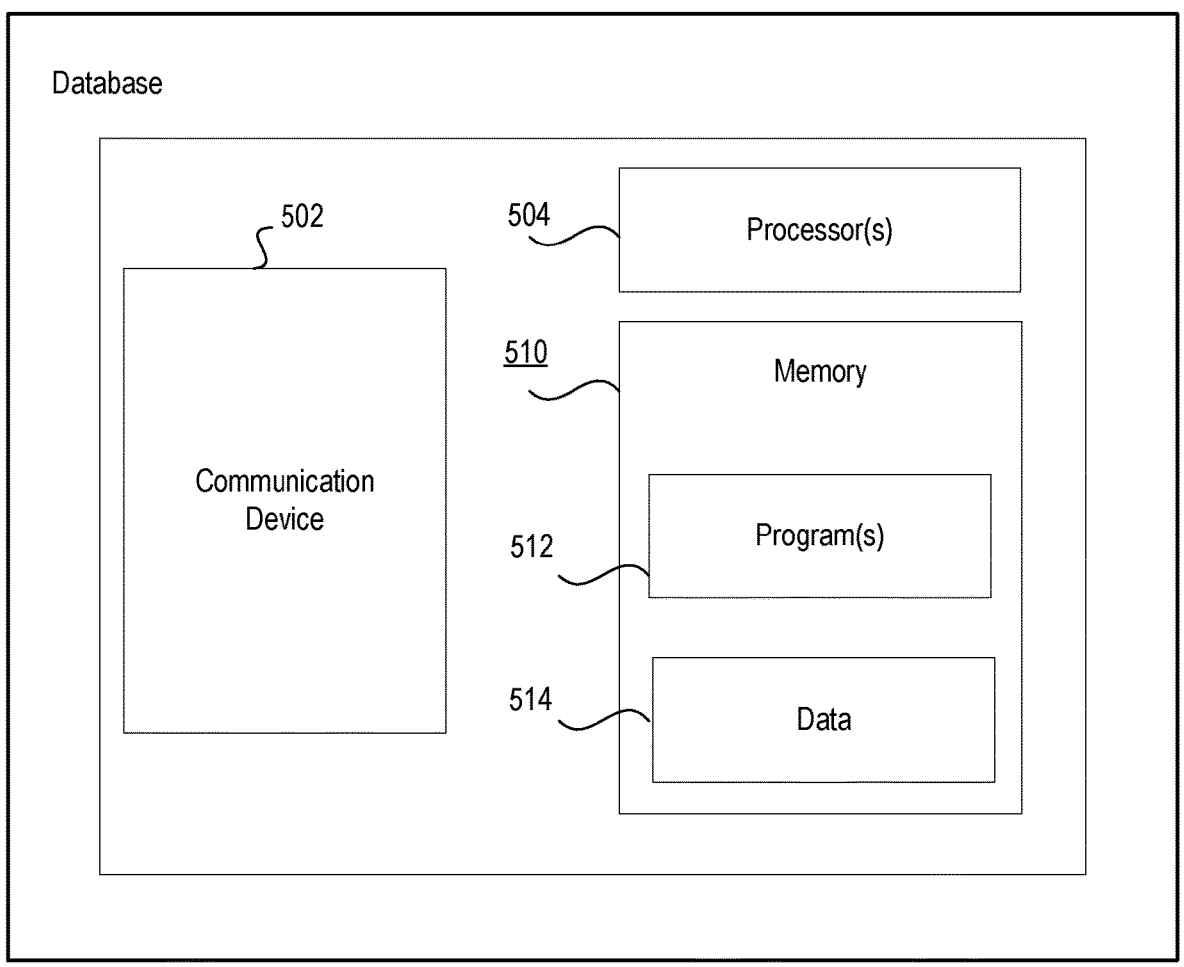
FIG. 5 is a block diagram of an exemplary database, consistent with disclosed embodiments.

Referring now to FIG. 5, there is shown a block diagram of an exemplary database 180 (FIG. 1), consistent with disclosed embodiments. Each of databases 180 may include a communication device 502, one or more database processors 504, and database memory 510 including one or more database programs 512 and data 514.

In some embodiments, databases 180 may take the form of servers, general-purpose computers, mainframe computers, or any combination of these components. Other implementations consistent with disclosed embodiments are possible as well.

Communication device 502 may be configured to communicate with one or more components of system 100, such as online resource 140, AR system 105, AR generator 120, image recognizer 110, and/or client devices 150. In particular, communication device 502 may be configured to provide to AR generator 120 images of vehicles that may be used to generate AR models.

Communication device 502 may be configured to communicate with other components as well, including, for example, AR memory 352 (FIG. 3). Communication device 502 may take any of the forms described above for communication device 210 (FIG. 2).

Database processors 504, database memory 510, database programs 512, and data 514 may take any of the forms described above for recognizer processors 230, memory 220, recognizer programs 222, and recognizer data 224, respectively (FIG. 2). The components of databases 180 may be implemented in hardware, software, or a combination of both hardware and software. For example, although one or more components of databases 180 may be implemented as computer processing instruction modules, all or a portion of the functionality of databases 180 may be implemented instead in dedicated electronics hardware.

Data 514 may be data associated with websites, such as online resources 140. Data 514 may include, for example, information relating to websites of automobile dealers and/or automobile manufacturers. Data 514 may include AR models of vehicles, images of automobiles, and information relating to automobiles, such as cost, condition, and dealers offering the automobile for sale.

Figure 6:
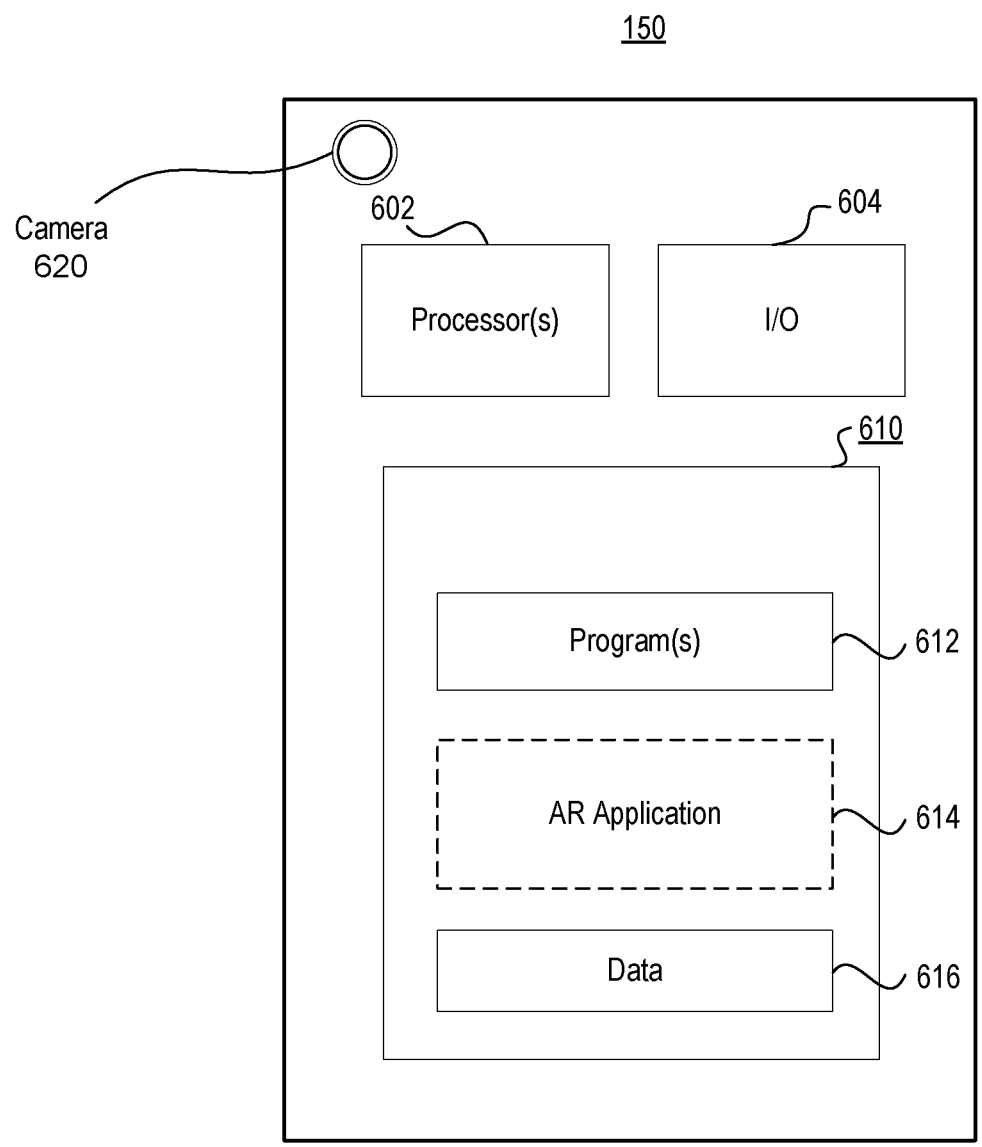
FIG. 6 is a block diagram of an exemplary client device, consistent with disclosed embodiments.

Referring now to FIG. 6, there is shown a block diagram of an exemplary client device 150 (FIG. 1), consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general-purpose computers, or any combination of these components. Further, client devices 150 may take the form of wearable devices, such as smart glasses or smartwatches. Alternatively, client devices 150 (or systems including client devices 150) may be configured as a particular apparatus, embedded systems, dedicated circuit, and the like based on the storage, execution, and/or implementation of the software instructions that perform one or more operations consistent with the disclosed embodiments. According to some embodiments, client devices 150 may include web browsers or similar computing devices that access web site consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may include multiple programs. Memory 610 may also store data 616 that is used by one or more AR programs 352 (FIG. 3).

Memory 610 may include instructions to perform image classification and/or generate graphical user interfaces. For example, memory 610 may store instructions that configure processor 602 to perform image classification operations, like extracting attributes from images, searching other images with similar attributes, and generating GUIs to display image classification results. Memory 610 may also include instructions to generate intermediate GUIs after receiving a search query and may include instructions to generate and modify the dynamic GUIs. For example, memory 610 may include instructions to generate GUIs with interactive icons and the functions or operations of the interactive icons may be stored in memory 610.

In certain embodiments, memory 610 may store an augmented reality (AR) application 614 that may be executed by processor 602 to perform one or more image identification processes consistent with disclosed embodiments. In certain aspects, AR application 614, or another software component, may be configured to generate and transmit request for servers to request navigation instructions or modified video streams. For example, AR application 614 may store an augmented reality viewer, image recognition operations, and look-up tables that correlate identified attributes with available vehicles. Further, AR application 614 may include metafiles with information about vehicles, inventory status, and their related attributes. Moreover, AR application 614 may be modifiable or updatable with patches received from other elements of system 100. For example, when AR system 105 issues a patch for a classification or identification model, AR application 614 may run the patch to update identification models or update mapping data. Moreover, AR application 614 may also include instructions to generate AR GUIs, as further described in connection to FIGS. 21-27.

In embodiments in which client devices 150 are separated from AR system 105, AR application 614 may also configure processor 602 to communicate with AR system 105 or determine the location of client devices 150. For instance, through AR application 614, client devices 150 may communicate with AR system 105 to report a location and request AR models. For example, AR application 614 may generate HTTP requests or other TCP/IP packets directed to AR system 105 with data for generating AR features. Alternatively, or additionally, AR application 614 may generate queries for AR system 105 based on attributes identified from an image or user selections. In such embodiments, AR application 614 may also include instructions that configure processor 602 to generate graphical user interfaces based on responses or communications from other elements of system 100. For example, AR application 614 may include instructions to generate GUIs based on results obtained from servers. Further, AR application 614 may store classification or identification models.

Further, in some embodiments, AR application 614 may perform image compression specifically for vehicle images. For example, in some embodiments instead of transmitting or receiving the full image through the network, AR application 614 may transmit or receive only key features of the image such as make, model, trim line, and/or color. Based on attribute information, AR application 614 may retrieve a sample image and make modifications to generate images. For instance, AR system 105 identified vehicles of make Toyota™, from 2010, with different colors. Instead, of sending multiple AR models of Toyotas from 2010 with multiple colors, AR system 105 may transmit the attributes information (i.e., make, model, and colors). Based on such information, AR application 614 may retrieve a sample AR model of a Toyota from 2010, make modifications to the AR model, and overlay it in AR viewers.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response (QR) Codes or providing information to the user. I/O devices 604 may also include components for NFC communication. I/O devices 604 may also include one or more digital and/or analog devices that allow a user to interact with client devices 150 such as a touch-sensitive area, buttons, or microphones. I/O devices 604 may also include one or more accelerometers to detect the orientation and inertia of client devices 150. I/O devices 604 may also include other components known in the art for interacting with AR system 105.

In some embodiments, client devices 150 may include a camera 620 that is configured to capture still images or video and send it to other components of system 100 via, for example, network 170.

The components of client devices 150 may be implemented in hardware, software, or a combination of both hardware and software.

Figure 7:
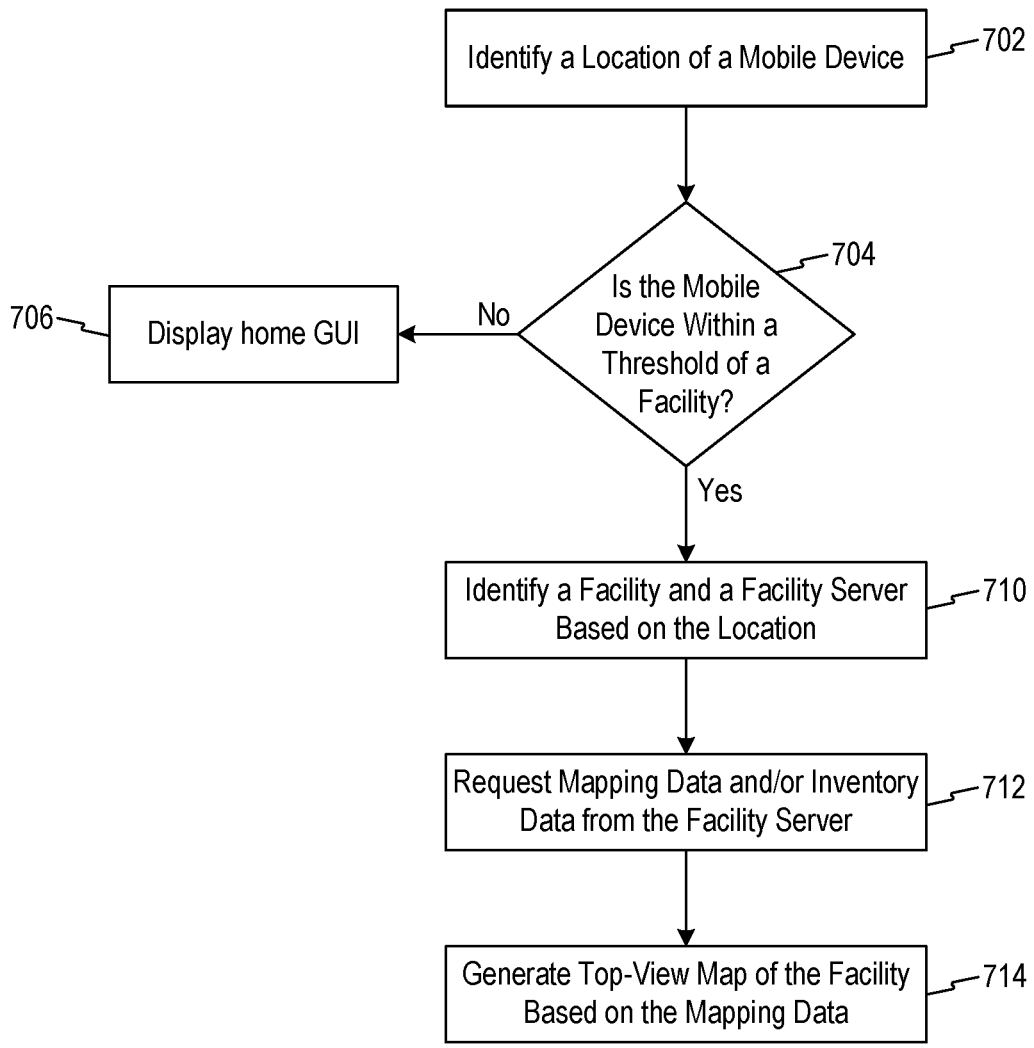
FIG. 7 is a flow chart illustrating an exemplary process for the localization of mobile devices, consistent with disclosed embodiments.

Referring now to FIG. 7, there is shown a flow chart illustrating an exemplary process 700 for the localization of mobile devices, consistent with disclosed embodiments. In some embodiments, process 700 may be executed by AR system 105. For example, image recognizer 110 may perform steps in process 700. In other embodiments, however, process 700 may be performed by client devices 150. For example, processor 602 in client devices 150 may execute instructions in AR application 614 (FIG. 6) to perform process 700 and identify the location of client devices 150. Further, as previously discussed in connection to FIG. 1, in some embodiments process 700 may be performed by multiple elements of system 100. For example, some steps of process 700 may be performed by AR system 105, while other steps of process 700 may be performed by client devices 150.

The description of process 700 below illustrates an embodiment in which AR system 105 performs steps of process 700. However, as previously discussed, other elements of system 100 may also be configurable to perform one or more of the steps in process 700. For example, client devices, and in particular processor(s) 602 may perform one or more steps of process 700.

In step 702, AR system 105 may identify the location of a mobile device. For example, AR system 105 may identify the location of one or more client devices 150 using location services such as GPS modules. Alternatively, or additionally, AR system 105 may identify the location of one or more client devices 150 using indoor location positioning, including WiFi signals, BLE beacons, and/or RFID tags.

In step 704, AR system 105 may determine whether the mobile device is within a threshold of a facility such as a vehicle dealership recorded in, for example, databases 180. AR system 105 may correlate the location of facilities that are part of the system with the location identified in step 702. For example, after identifying the location of one or more of client devices 150, AR system 105 may determine if the identified GPS coordinates match coordinates of facilities that are part of the system. In such embodiments, AR system 105 may compare a table of facility locations with the determined location of step 702. For example, AR system 105 may correlate the geographic location of multiple vehicle dealerships stored in databases 180 and determine whether the location determined is step 702 matches the location of at least one of the vehicle dealerships.

Moreover, in some embodiments AR system 105 may use a threshold distance to evaluate whether the mobile device is close to a facility. To prevent mistakes from inaccurate estimations of the locations, AR system 105 may predetermine a threshold distance that would still consider the mobile device to be within the facility's location. For example, AR system 105 may establish a 100-meter radius around a facility (such as a dealership) as a threshold and consider mobile devices within such threshold to be within the facility. In some embodiments, the threshold may be based on the facility characteristic. For example, if the facility is a large vehicle dealership, AR system 105 may adjust the threshold distance to be larger. In this way, by decreasing or increasing the threshold distance AR system 105 may facilitate establishing corrections between facilities, such as vehicle dealerships, and the mobile devices.

If in step 704 AR system 105 determines that the mobile devices is not within a threshold of the facility (step 704: No), AR system 105 may determine that the mobile device is not close to any facility and continue to step 706. In step 706, AR system 105 may display a home GUI on the mobile device. Because the mobile device is not close to any facility, there is no need to devote resources in AR operations. Instead, AR system 105 may use other searching mechanisms, like key word searching or image searching to provide results for users.

However, if in step 704 AR system 105 determines that the mobile device is within a threshold of a facility (step 704: Yes), AR system 105 may continue to step 710. In step 710, AR system 105 may identify the facility that is close, or within a threshold, of the mobile device. Further, AR system 105 may also identify a server or one of online resources 140 associated with the facility. For example, in step 710 AR system may locate a server or repository that contains data of a vehicle dealership that is close to the mobile device or one of one or more client devices 150.

In step 712, AR system 105 may request mapping data and/or inventory data from the facility server identified is step 710. For example, AR system 105 may request mapping data for a vehicle dealership. The mapping data may include the location of vehicles in the dealership parking lot, their parking lot numbers, characteristics of the vehicles, and some landmarks that help pinpoint the location of vehicles within the dealership. Additionally, or alternatively, AR system 105 may request inventory data from a server associated with a vehicle dealership. For example, AR system 105 may request a list of the vehicles available in the parking lot of the dealership, their characteristics (such as make, model, trim line), and their pricing information.

In step 714, AR system 105 may use the mapping and/or inventory data to generate a top-view map of the facility. For instance, using the information in the mapping data AR system 105 may render a top-view map of the parking lot and indicate the position of vehicles and/or landmarks within the vehicle dealership, as further described in connection with FIG. 27. This mapping information could be displayed to a user in one or more of client devices 150 to improve navigation in the parking lot. Alternatively, or additionally, the mapping data may also be used to verify data and correct potential errors in the inventory data.

Figure 8:
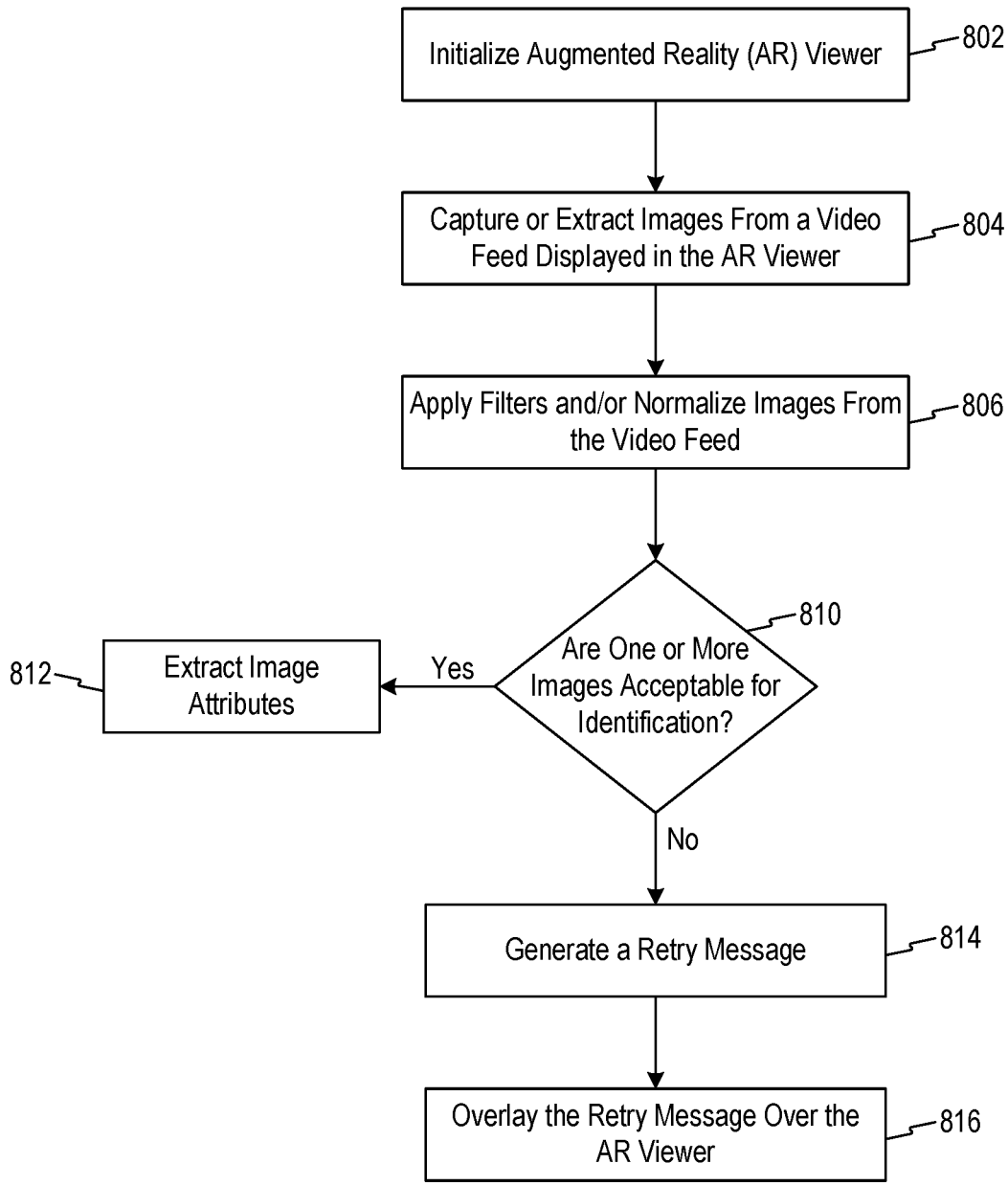
FIG. 8 is a flow chart illustrating an exemplary process for initializing an augmented reality viewer, consistent with disclosed embodiments.

Referring now to FIG. 8, there is shown a flow chart illustrating an exemplary process 800 for initializing an AR viewer, consistent with disclosed embodiments. In some embodiments, process 800 may be executed by AR system 105. In other embodiments, however, process 800 may be performed by client devices 150. Further, in some embodiments process 800 may be performed by multiple elements of system 100.

In some embodiments, process 800 may follow process 700. For example, step 802 may be performed immediately after one of the steps in process 700. For example, process 800 may be performed immediately after step 712 (FIG. 7). In other embodiments, however, process 800 may be performed concurrently with, or independently from, process 700.

The description below of steps in process 800 illustrates an embodiment in which AR system 105 performs steps of process 800. However, as previously discussed other elements of system 100 may also be configurable to perform one or more of the steps in process 800.

In step 802, AR system 105 may initialize an augmented reality viewer. For example, AR system 105 may initialize an AR viewer in one or more of client devices 150 by triggering camera 620 (FIG. 6) and displaying a GUI in client devices 150 that shows video feeds captured in real time and icons associated with AR application 614.

In step 804, AR system 105 may capture images from a video feed captured and/or displayed in the AR viewer. For example, AR system 105 may sample images in the video feed (e.g., being captured with camera 620) and record them in a local memory for image recognition. In such embodiments, AR system 105 may take a sample every second for the 10 seconds after the AR viewer is activated. Alternatively, or additionally, AR system 105 may sample groups of images when AR application 614 is activated. Further, AR system 105 may collect snippets of video that can then be processed for image and/or sound analysis.

In step 806, AR system 105 may apply filters and/or normalize the images captured from the video feed in step 804. For example, AR system 105 may apply filtering operations and/or image normalizers in step 806. As further explained in connection with FIG. 9, AR system 105 may normalize the content or format of the sampled images for analysis.

In step 810, AR system 105 may determine whether one or more images, sampled in step 804 and normalized and filtered in step 806, are acceptable for image identification. AR system 105 may, for example, perform a cursory analysis in which AR system 105 may determine the contrast of the image, format, pixel resolution, and/or color quality to determine if the quality of the sample image is sufficient for identification.

If AR system 105 determines that one or more images are acceptable for identification (step 810: Yes), AR system 105 may continue to step 812 and extract image attributes from the sample images for identification. For example, in step 812, and using processes further described in connection to FIG. 10, AR system 105 may extract attributes of samples images. In such embodiments, AR system 105 may extract parameters of images using pre-trained convolutional networks or other image identification techniques. Further, in such embodiments AR system 105 may perform image processing techniques to identify contours, distinguishing features, and pixel patterns.

If, however, AR system 105 determines that images are not acceptable for identification (step 810: No), AR system 105 may continue to step 814 and generate a retry message GUI, such as the one described in FIG. 25. For example, when the images are not acceptable for identification, AR system 105 may still try to collect images to perform image recognition operations. In some embodiments, however, AR system 105 may decide not to show a retry message but an error message in step 814, further described in connection with FIG. 25.

In step 816, AR system 105 may overlay a retry or error message over the AR viewer. For example, in step 816 AR system 105 may generate instructions to modify an AR GUI displaying the AR viewer to include a pop-up message.

Figure 9:
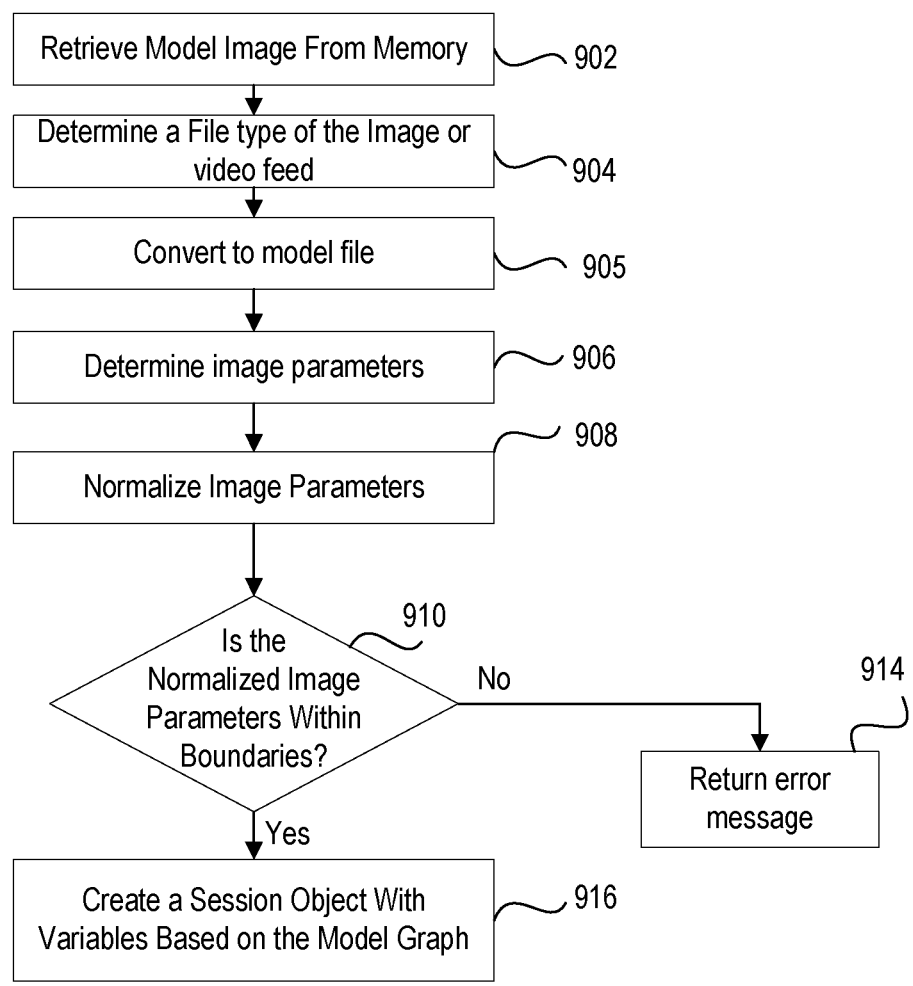
FIG. 9 is an exemplary flow chart illustrating an image normalization process, consistent with disclosed embodiments.

Referring now to FIG. 9, there is shown a flow chart illustrating an exemplary image normalization process 900, consistent with disclosed embodiments. In some embodiments, process 900 may be performed by AR system 105. In other embodiments, however, process 900 may be performed by client devices 150. For example, processor(s) 602 in client devices 150 may execute instructions in AR application 614 (FIG. 6) to perform process 900. Further, in some embodiments process 900 may be performed by multiple elements of system 100.

In some embodiments, process 900 may be part of process 800. For example, process 900 may be performed as part of step 806 (FIG. 8). In other embodiments, however, process 900 may be performed concurrently with process 800 or independently from process 800.

The description below of steps in process 900 illustrates an embodiment in which AR system 105 performs steps of process 900 to normalize images of vehicles sampled from video feeds captured in AR viewers. However, as previously discussed, other elements of system 100 may also be configurable to perform one or more of the steps in process 900. Further, steps of process 900 may be performed for identification of other elements, like landmarks, numbers, or parking lot features, not only vehicles.

In step 902, AR system 105 may retrieve image data representing a vehicle model, landmarks, or numbers. For example, AR system 105 may retrieve a model image data from recognizer memory 220. The model image data may include information such as a model format and model dimensions.

In step 904, AR system 105 may determine a file type of received image data. For example, AR system 105 may identify that the image data is in JPEG format. Alternatively, AR system 105 may identify the image data is a raster format, such as GIF or TIFF. Also, AR system 105 may be configured to determine the image data is in a vector format such as CGM or XPS. In yet other embodiments, AR system 105 may determine the image data is in a proprietary image format such as HE IC.

In step 905, AR system 105 may convert the format of the received image data from the determined file type to the model file type. In some embodiments, converting the received image data to a new format may include executing the following scripting function, where MODEL is the model format:

import Image
    im=Image.open('test.jpg')
    im.save('test.MODEL') # or 'test. MODEL'

In step 906, AR system 105 may determine image parameters of the received image data. For example, AR system 105 may identify parameters such as size, color, compression ratio, orientation, and components, among others.

In step 908, AR system 105 may apply operations to normalize parameters. For example, AR system 105 may resize the received image data, blur, crop, despeckle, dither, draw on, flip, join, and re-sample based on parameters of the model image.

In step 910, AR system 105 may determine whether the normalized image data is within boundaries for processing. For example, after the normalization process, the contrast of the image may be poor. Because the transformation process of step 908 has degraded the quality of the image, the image data may not be suitable for processing by AR system 105. If the normalized image data is not within boundaries (step 910: No), AR system 105 may generate an error message. For example, AR system 105 may return to step 814 (FIG. 8). However, if the normalized image data is within boundaries (step 910: yes), AR system 105 may continue to step 916 an create a session object in which features of the normalized image may be stored.

Figure 10:
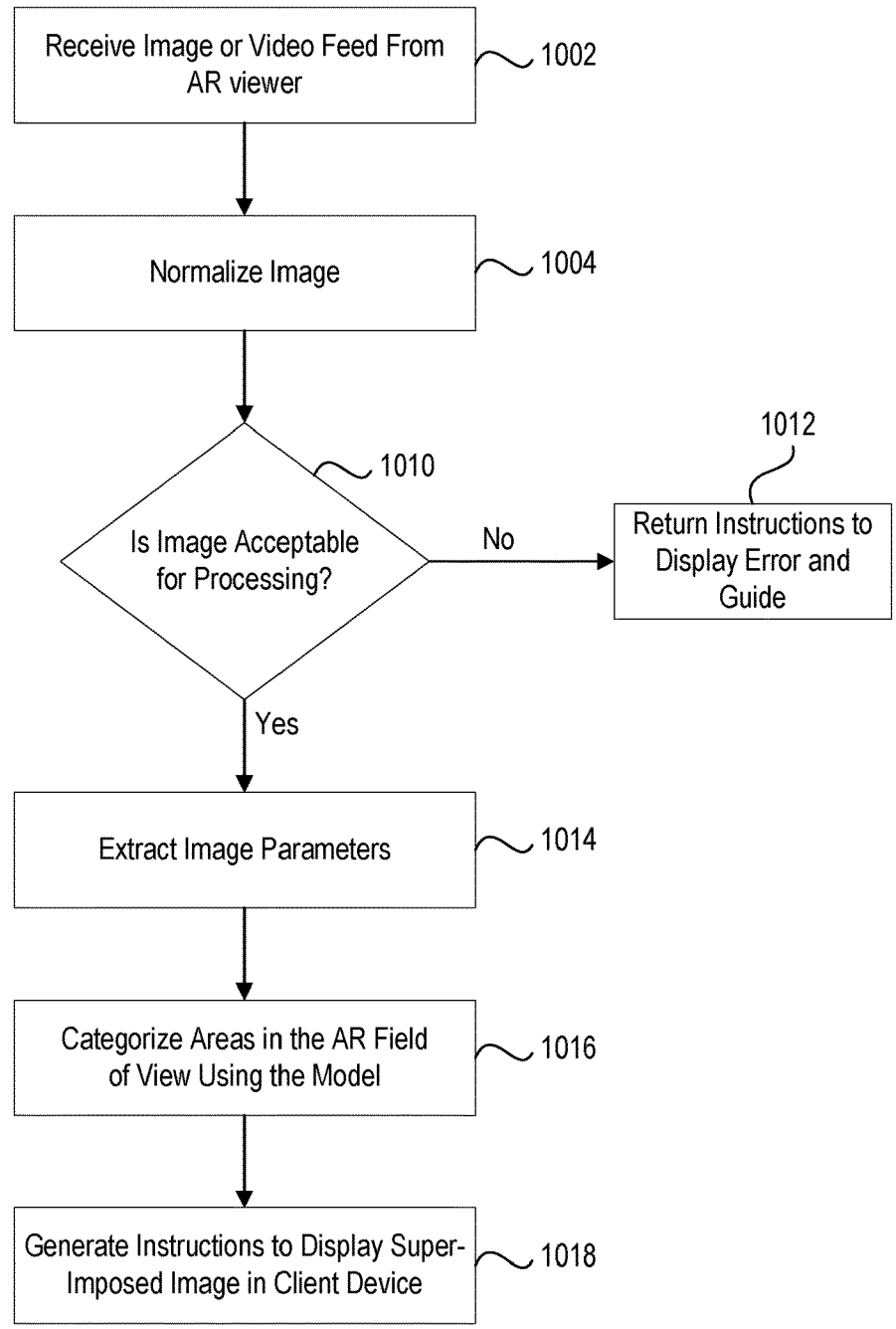
FIG. 10 is a flow chart illustrating an exemplary process for image categorization, consistent with disclosed embodiments.

Referring now to FIG. 10, there is shown a flow chart of an exemplary process 1000 for image categorization, consistent with disclosed embodiments. In some embodiments, process 1000 may be performed by AR system 105. In other embodiments, however, process 1000 may be performed by client devices 150 and/or multiple elements of system 100.

In some embodiments, process 1000 may be part of process 800. For example, process 1000 may be performed as part of step 812 (FIG. 8). In other embodiments, however, process 1000 may be performed concurrently with process 800 or independently from process 800.

The description below of steps in process 1000 illustrates an embodiment in which AR system 105 performs steps of process 1000. However, as previously discussed other elements of system 100 may also be configurable to perform one or more of the steps in process 1000.

In step 1002, AR system 105 may receive a captured image or one of the sampled images of step 804 (FIG. 8). Accordingly, The captured image may be captured by, for example, camera 620 (FIG. 6) in client devices 150. Further, the captured image may be sampled from a video stream or video feed. Moreover, the captured image may be an image that is being observed in a client device 150 running an AR viewer.

In some embodiments, the image received in step 1002 may have a specific image format and AR system 105 may determine a file type of received image data in step 1002. For example, AR system 105 may identify that the received image is in JPEG format. Alternatively, AR system 105 may identify the image data is a raster format, such as GIF or TIFF.

In step 1004, AR system 105 may apply filters and/or normalize images in preparation for parameter extraction and image classification. For example, in step 1004, AR system 105 may convert the format of the received image data. In some embodiments, converting the received image may include executing a scripting function, such as the following, where MODEL is the model format:

import Image;
    im=Image.open('test.jpg');
    im.save('test. MODEL') # or 'test. MODEL';

Further, in step 1004, AR system 105 may apply operations to normalize the received image. For example, AR system 105 may resize the received image data, blur, crop, despeckle, dither, draw on, flip, join, and re-sample based on the parameters of the model image. Additionally, or alternatively, in some embodiments, AR system 105 may normalize the image based on normalization rules and determine a plurality of attributes from the normalized image by extracting the attributes from the normalized image using a pretrained convolution neural network.

In step 1010, AR system 105 may determine whether the filtered and/or normalized image is acceptable for image classification or identification. If the normalized image data is not acceptable (step 1010: No), AR system 105 may continue to step 1012 and generate an error GUI. However, if the filtered or normalized image data is acceptable for identification (step 1010: Yes), AR system 105 may continue to step 1014 and extract image attributes using classification or identification models.

In step 1014, AR system 105 may use a neural network model or other machine-learning model to extract image parameters or attributes from the received image. For example, in step 1014, AR system 105 may import layers of a pre-trained CNN, determine features described in a target layer of the pre-trained network, and initialize a multi-class fitting model using the features in the target layer. In such embodiments, AR system 105 may extract features of the captured image using a CNN with max pooling layers, and mean, max, and L2 norm layers to compute extracted parameters. Additionally, AR system 105 may generate a file with the features it identified from the image. In some embodiments, in which the capture image is an image of a vehicle, the identified attributes or features may include vehicle make, vehicle model, and/or vehicle trim line. Alternatively, or additionally, in step 1014 AR system 105 may get Histogram of Oriented Gradient (HOG) features for different images and feed those to a Logistic Regression or Support Vector Machine and train them to classify the images and obtain preliminary results. Further, the identified attributes or features may include vehicle make, vehicle model, vehicle body style, vehicle year, vehicle color, and/or vehicle trim line.

Furthermore, AR system 105 may extract image attributes using techniques as compiled functions that feed-forward data into an architecture to the layer of interest in the neural network. For instance, AR system 105 may implement the following script for generating activations for a dense layer, determine image parameters, and extract image attributes:

dense_layer=layers.get_output(net1.layers_['dense], deterministic=True);
    output_layer=layers.get_output(net1.layers_[output], deterministic=True);
    input_var=net1.layers_['input'].input_var;
    f_output=t.function([input_var], output_layer);
    f_dense=t.function([input_var], dense_layer).

In step 1016, AR system 105 may correlate the extracted image parameters with preliminary results based on a confidence level that results from applying an identification model. For example, AR system 105 may search image result based on the extracted parameters and classify results from the search based on their relevance or confidence level. In some embodiments, the confidence levels determined in step 1016 may be configured as a probability function.

In step 1018, AR system 105 may generate instructions to display superimposed images in one or more client devices 150. For example, AR system 105 may determine that specific vehicle AR models should be super imposed in client devices 150 to highlight certain vehicles in the AR viewer. As further discussed in connection to FIG. 11, in some embodiments AR system 105 may desire to highlight certain elements in the augmented reality viewer. For example, AR system 105 may want to highlight vehicles that are within a budget. In such embodiments, AR system 105 may generate instructions to change color of vehicles or superimpose AR models by pinning them to certain anchor points in the video feed captured with the augmented reality viewer. Accordingly, in some embodiments AR systems may perform operations of retrieving, from a database, an AR model for each one of the qualified vehicles, selecting AR models for qualified vehicles in the field of view based on the identified vehicle make, vehicle model, and vehicle trim line, and overlaying the selected AR models on qualified vehicles in the field of view.

Additionally, or alternatively, AR system 105 may determine if there are visualization preferences that affect how the results should be presented. The visualization preferences may include parameters for GUIs displayed in client devices 150. For example, the visualization preferences may include number of preliminary results that should be presented, size of icons in GUI, type of interactions that the icons have, whether classification results are presented with thumbnail images or only text results. Moreover, in step 1018, AR system 105 may determine whether an interactive search filter should be displayed.

Figure 11:
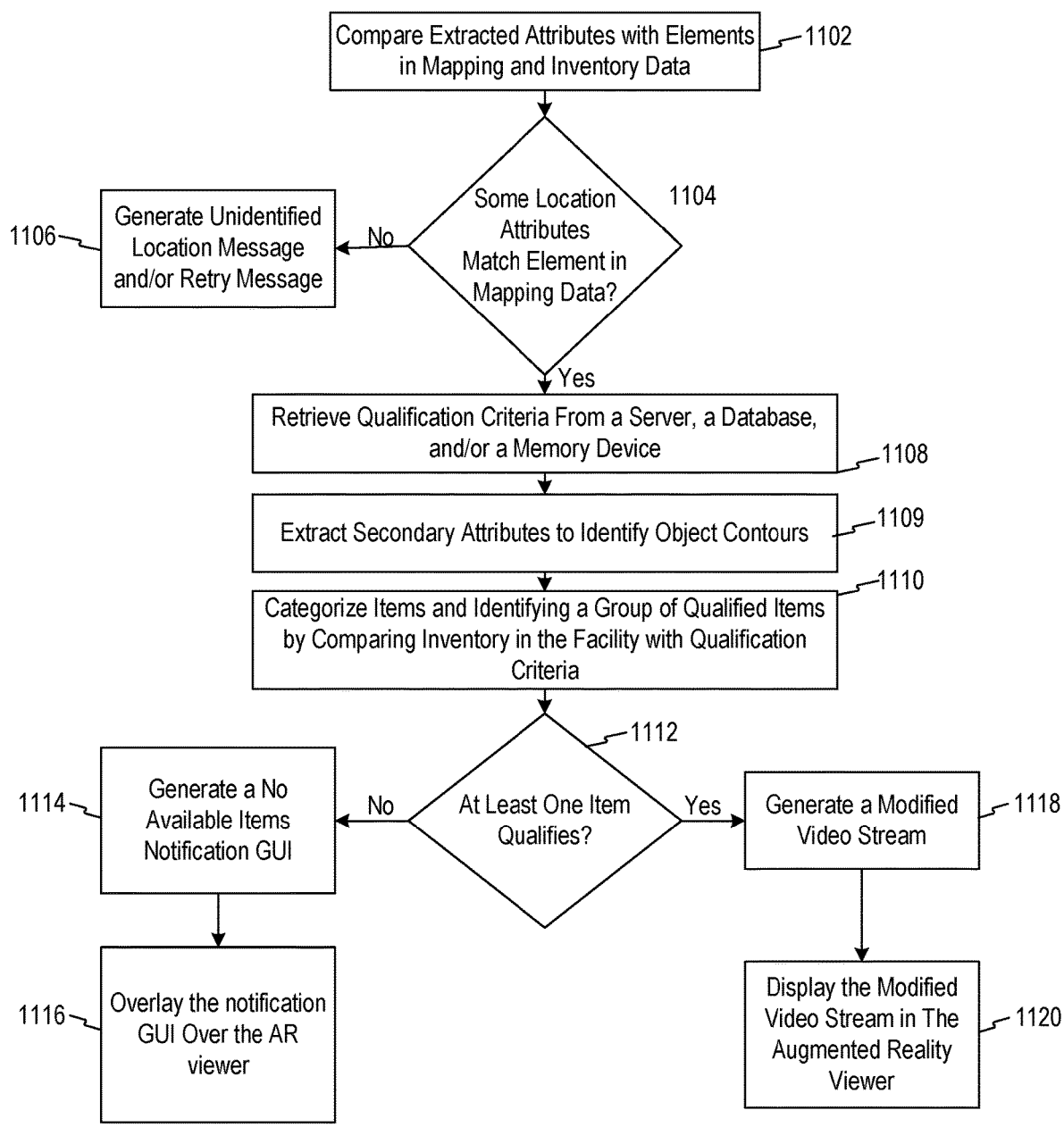
FIG. 11 is a flow chart illustrating an exemplary process for comparing attributes with mapping data, consistent with disclosed embodiments.

Referring now to FIG. 11, there is shown a flow chart of an exemplary process 1100 for comparing attributes with mapping data, consistent with disclosed embodiments. In some embodiments, process 1100 may be performed by AR system 105. In other embodiments, however, process 1100 may be performed by client devices 150 or by multiple elements of system 100.

In some embodiments, process 1100 may be performed immediately after process 800. For example, process 1100 may be performed after step 812 (FIG. 8). In other embodiments, however, process 1100 may be performed concurrently with process 800 or independently from process 800.

The description below of steps in process 1100 illustrates an embodiment in which AR system 105 performs steps of process 1100. However, as previously discussed other elements of system 100 may also be configurable to perform one or more of the steps in process 1100.

In step 1102, AR system 105 may compare extracted attributes with elements in mapping and inventory data. For example, AR system 105 may compare the attributes extracted from videos or sample images in step 812 (FIG. 8) with mapping and inventory data requested in step 712 (FIG. 7). In such embodiments, AR system 105 may compare attributes identified in an image of a parking lot with the information provided in the mapping and inventory data of the dealership. For instance, if based on extracted attributes AR system 105 determines there is a Toyota vehicle in the field of view, AR system 105 may compare the attributes of the vehicle with vehicles in the mapping and inventory data from the facility server.

In step 1104, AR system 105 may determine whether some attributes extracted from the image or video fees match elements in the mapping data. For example, AR system 105 may determine whether the attributes or location attributes associated with a vehicle identified in the augmented reality viewer match the attributes of vehicles in the mapping or inventory data. If AR system 105 determines that none of the extracted image attributes match elements in the mapping data (Step 1104: No), AR system 105 may continue to step 1106 and generate an unidentified location message. Alternatively, or additionally, AR system 105 may generate a retry message that may be displayed in an AR GUI on client devices 150. However, if AR system 105 determines that some attributes extracted from images match elements in the mapping data (step 1104: Yes), AR system 105 may continue to step 1108.

In step 1108, AR system 105 may retrieve qualification criteria from a server, a database, and/or a memory device. For example, after determining it is possible to establish the location of the user in a parking lot (e.g., when an object in the AR viewer matches elements in the mapping information), AR system 105 may seek to highlight vehicles or elements that are of interest to the user. Thus, AR system 105 may retrieve qualification criteria that was stored in a memory device of mobile devices. For example, AR system 105 may attempt to highlight vehicles that are within the user's budget or other user metric. Then, AR system 105 may provide an AR GUI that modifies the environment captured in the AR viewer to help users navigate the parking lot. To that end, in step 1108 AR system 105 may retrieve qualification criteria from client devices 150, which may specify the kind of elements the user is interested. Qualification criteria may include maximum budget and/or vehicle features—such as make, model, year, color, trim line. In some embodiments, the qualification criteria may be locally stored in client devices 150. In other embodiments, however, the qualification criteria may be retrieved from online resources 140 and/or databases 180.

In step 1109, AR system 105 may extract secondary attributes from images to identify object contours. While a cursory extraction may be performed for comparing attributes with mapping data in step 1102, the secondary extraction of step 1109 may be more comprehensive and attempt to recognize specific objects in addition to landmarks for location. This secondary extraction may employ techniques further discussed in connection to FIG. 10 to identify contours of specific objects and also categorize the specific object.

In step 1110, AR system 105 may categorize items identified in an AR viewer. AR system 105 may, for example, associate each vehicle identified in an AR viewer with a specific model, year, trim line, brand, and color. Moreover, AR system 105 may also identify a group of qualified items by comparing inventory and/or mapping data of the facility with the qualification criteria. For example, if the qualification criteria includes a maximum budget, AR system 105 may identify a group of qualified items in the facility that are below the maximum budget. Alternatively, or additionally, AR system 105 may identify a group of qualified items based on target features. In the case of vehicles, target features may include make, model, trim line, down payment, and monthly payments. In some embodiments, the correlation between qualification criteria and available items in the facility may be performed using look-up tables and data searching known in the art.

In step 1112, AR system 105 may determine whether at least one element in the mapping and inventory data qualifies based on the qualification criteria. If AR system 105 determines that none of the items in the mapping or inventory data qualify under the qualification criteria of step 1108 (step 1112: No), AR system 105 may continue to step 1114 in which AR system 105 may generate a "no available items" notification GUI. For example, in step 1114 AR system 105 may generate instructions to display a message in client devices 150. The message may indicate that none of the items in the facility meets the qualification criteria. In step 1116, as further described in connection with FIG. 26, AR system 105 may overlay the notification created in step 1114 over an augmented reality viewer displayed in client devices 150.

However, if AR system 105 determines that at least of the items in the mapping or inventory data qualify under the qualification criteria of step 1108 (step 1112: Yes), AR system 105 may continue to step 1118 and generate a modified video stream. For example, AR system 105 may generate a modified video feed in which colors of qualified vehicles are modified. Alternatively, or additionally, AR system 105 may generate a modified video by incorporating AR models on the AR viewer and/or overlaying information on the augmented reality viewer.

In step 1120, AR system 105 may configure client devices 150 to display the modified video stream in augmented reality viewers. In such embodiments, AR system 105 may execute APIs that interact with platforms such as iOS (ARKit) and/or Android (ARCore) to display the augmented reality views on client devices.

Combined processes 1100 and 900 may allow AR system 105 to normalize a plurality of images from the video feed, extract secondary attributes from the images employing a convolutional neural network, identify vehicle contours in the images based on the secondary attributes; and categorize each one of the vehicle contours using a classification model.

Figure 12:
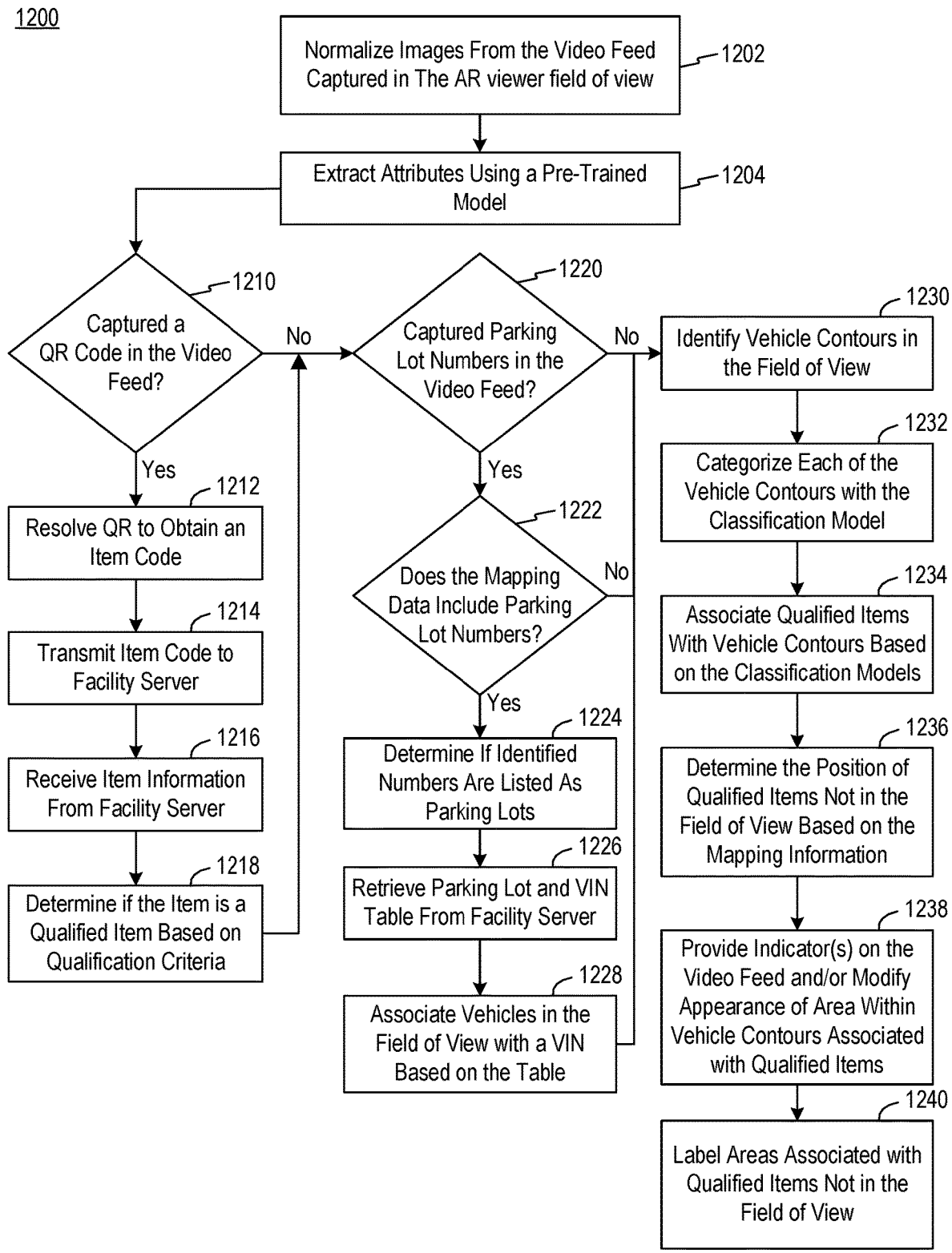
FIG. 12 is a flow chart illustrating an exemplary vehicle identification process, consistent with disclosed embodiments.

Referring now to FIG. 12, there is shown a flow chart of an exemplary vehicle identification process 1200, consistent with disclosed embodiments. In some embodiments, process 1200 may be performed by AR system 105. In other embodiments, however, process 1200 may be performed by client devices 150 and/or multiple elements of system 100.

In some embodiments, process 1200 may be performed immediately after process 1100. In other embodiments, process 1200 may follow steps of process 800, such as step 812 (FIG. 8). In other embodiments, however, process 1200 may be performed concurrently with process 800 or 1100.

The description below of steps in process 1200 illustrates an embodiment in which AR system 105 performs steps of process 1200. However, as previously discussed, other elements of system 100 may also be configurable to perform one or more of the steps in process 1200.

In step 1202, AR system 105 may normalize images form the video feed captured in the augmented reality viewer field of view. For example, AR system 105 may apply filters and/or normalize images from the video feed as further described in step 806 (FIG. 8).

In step 1204, AR system 105 may extract attributes from normalized images using pre-trained extraction models. For example, as described in FIG. 8, AR system 105 may employ CNNs to extract attributes and features from the images. Other models for image recognition and feature extraction may also be applied. For instance, AR system 105 may also apply image recognition using deep learning or pattern matching in step 1204.

In step 1210, AR system 105 may determine whether the attributes extracted from an image include an identification code, such as a QR code. For example, in step 1210 AR system 105 may determine if there is a captured QR code in the video feed. If AR system 105 determines that there is a captured QR code in the video feed (step 1210: Yes), AR system 105 may continue to step 1212. In step 1212, AR system 105 may resolve the QR code to obtain an item code. In step 1214, AR system 105 may transmit the item code to a facility server. For example, AR system 105 may transmit an item code to the server providing mapping an inventory information in step 712 (FIG. 7).

In step 1216, AR system 105 may receive item information from the facility server. For example, in response to the transmission and request is step 1214, AR system 105 may receive item information in step 1216. In step 1218, AR system 105 may determine if the item associated with the QR code is qualified based on user qualification criteria, received in step 1108 (FIG. 11).

In some embodiments, QR codes may be placed close to vehicles in a parking lot to help identify them with AR application 614 (FIG. 6). In such embodiments, the QR codes may minimize required image processing because instead of applying models to recognize vehicles or landmarks, as described in connection with FIG. 10, AR system 105 may simply identify QR codes to determine locations. Then the item code retrieved from QR identification may be associated with the vehicle. For example, the QR code may specify a vehicle identification number (VIN) or a reference number in the dealership's database. This information of vehicles may be used in step 1218 to determine if the item is a qualified item based on qualification criteria. For certain applications, these former steps of 1200 may enable AR system 105 to identify location attributes by identifying a QR code within vehicle contours, resolving the QR code to obtain a vehicle code, transmitting, to a facility server, the vehicle code, and receiving, from the facility server, a vehicle identification number and vehicle pricing information.

In some embodiments, AR system 105 may performed tiered identifications. For example, AR system 105 may first run a process to determine if there are any QR codes in a field view. If there are none, AR system 105 may attempt identification with other techniques that also minimize resource expenditure during identification and improve response times. This type of configuration may resolve technical challenges associated with poor utilization of resources in AR systems and/or low response times. Accordingly, if in step 1210 AR system 105 determines that there is not a QR code in the video feed (step 1210: No), AR system 105 may continue to step 1220.

In step 1220, AR system 105 may determine if there are captured parking lot numbers in the video feed. For example, AR system 105 may perform image recognition to determine if there captured images include parking lot numbers. If AR system 105 determines there are parking lot numbers in the captured video feed or in the field of view (step 1220: Yes), AR system 105 may continue to step 1222, in which AR system 105 may determine whether the mapping data received from the facility server contains parking lot number information. For example, AR system 105 may review the mapping data to determine if there is a relationship between vehicles and parking lot numbers in the mapping or inventory data.

If AR system 105 determines that the mapping information includes parking lot numbers (step 1222: yes), AR system 105 may continue to step 1224 and compare the numbers captured in the video feed with numbers of the mapping data. In this way, AR system 105 may determine if identified numbers are listed as parking lots in step 1224.

In step 1226, AR system 105 may retrieve tables of parking lot numbers and VINs from facility servers to correlate them with the numbers captured in the video feed. For example, AR system 105 may retrieve parking lot and VIN table from facility server. In step 1228, AR system 105 may associate the vehicles in the field of view with a VIN based on the table and the number of the parking lot that is closest to the vehicle. Accordingly, in such embodiments AR system 105 may be configured to identify numbers in the augmented reality viewer and determine whether the at least one location attribute matches at least one of the plurality of vehicles or landmarks comprises determining whether the identified numbers match at least one of the parking lot numbers.

In the tiered identification process, QR codes and parking lot numbers in the field of view may require the least amount of resources for image recognition as they may be easily recognizable. However, if QR codes and parking lot numbers are not visible in the field of view, AR system 105 may perform more complex image recognition analysis to identify items, such as identifying vehicles in AR viewer field of view. Accordingly, if in step 1120 AR system 105 determines that there are no numbers captured in the video feed (step 1220: No) or if in step 1222 AR system determines the mapping data does not include parking lot numbers (step 1222: No), AR system 105 may continue to step 1230 and identify vehicle contours in the field of view.

In step 1230, AR system 105 may apply image recognition techniques to identify contours of objects in the field of view. For example, AR system 105 may use image classification with CNNs. Alternatively, or additionally, AR system 105 may employ object detection with Region-based Convolutional Neural Network or approaches like Single Shot MultiBox Detector and/or Region-Based Fully Convolutional Networks (R-FCN). Further, for step 1230 AR system may apply object tracking with stacked auto encoders (SAE) and/or semantic segmentation techniques such as Fully Convolutional Networks (FCN). By employing one or more of these image recognition techniques, AR system may identify objects, such as contours of vehicle in step 1230.

In step 1232, AR system 105 may categorize objects, such as vehicle contours, with classification models—like the one described in connection with FIG. 10. For example, AR system 105 may associate each vehicle contour identified in step 1230 with a make, model, trim line. In step 1234, AR system 105 may associate qualified items with vehicle contours based on the classification model. In some embodiment, AR system 105 may determine that based on the qualification criteria, received for example in step 1108 (FIG. 11), vehicles of a certain make, model, and trim line would count as qualified items. In such embodiments, AR system 105 may associate contours that the classification model identifies with qualified make, model, trim lines in step 1234. Moreover, in step 1236, AR system 105 may determine the position of the qualified items that are not in the field of view. Using mapping data received from the facility or dealership, AR system 105 may determine the position of other items that are within the facility but are not being part of the field of view. This process may facilitate navigation using augmented reality systems because it allows to identify objects of interest with the location of one of the items and mapping information. Combining the ability to establish a location with image recognition and the mapping data received from facility servers, may improve the user experience by facilitating pointing out the specific items that are of interest, even if they are not part of the field of view.

In step 1238, AR system 105 may provide indicators on the video feed and/or modify the appearance of an area within contours associated with qualified items. For example, in step 1238 AR system 105 may include arrows, stars, rectangles, and/or circles within or around the vehicle contours, or in the proximity of vehicle contours. In such embodiments, AR system 105 may overlay icons on video images and/or input AR models of icons that get periodically updated. Additionally, or alternatively, when a contour is associated with a qualifying item, AR system 105 may modify the appearance of the area within the contour by changing its color. In such embodiments, AR system 105 may also modify other parameters of the pixels within the vehicle contour, such as texture or opacity. Further, AR system 105 may perform operations to create a natural view of the modified item. For example, in changing the color of the area within the vehicle contour, AR system 105 may also determine rates of color changes, lighting, and reflections to replicate these parameters in the modified image or video feed. Thus, in such embodiments AR system 105 may, for example, calculate an original color gradient for each one of the qualified vehicles in the field of view and replicate the color gradient with a highlighting color when modifying the color of the qualified vehicles in the field of view.

Alternatively, or additionally, AR system 105 may use AR models to modify the appearance of the area associated with qualified items. AR system 105 may identify anchor points in the identified vehicle contours (such as headlights, plate, and roof) and retrieve AR models that can be superimposed on the identified vehicle contours to modify the appearance of the are in step 1218. Further, AR system 105 may generate a modified video feed by modifying the color of non-qualified vehicles in the field of view to a color different from the highlighting color.

In step 1240, AR system 105 may also provide indicators associated with specific vehicles by labeling areas associated with qualified items. As further described in connection with FIG. 22, AR system 105 may modify fields of view in AR viewers by supper imposing labels for each one of the vehicles. Additionally, or alternatively, AR system 105 may label areas to help navigate to qualified items that are not in the field of view. For example, if a qualified item is not in the field of view but it is in the facility, AR system 105 may generate labels that give directions to not visible qualified items. In some embodiments, AR system 105 may label areas with navigation instructions, such as arrows, or create labels that indicate the presence of a qualified item that is not fully visible.

Process 1200 describes an exemplary multi-tiered identification process that would allow a user to use AR tools to facilitate navigation while attempting to reduce utilization of computer resources. The described approach of first attempting to detect QR codes, then numbers, and then object contours, allow AR system 105 to effectively use resources and improve response time. Moreover, these techniques may be combined or used in parallel. If one area has a QR code but another does not, AR system 105 may segregate the image in different areas and give a specific treatment to each one of the areas, identifying QR codes, parking lot, and object contours, in specific areas whenever they are available. Such segregation of areas in the areas of the video feed may facilitate processing images faster and use parallelism techniques to improve the user experience.

Figure 13:
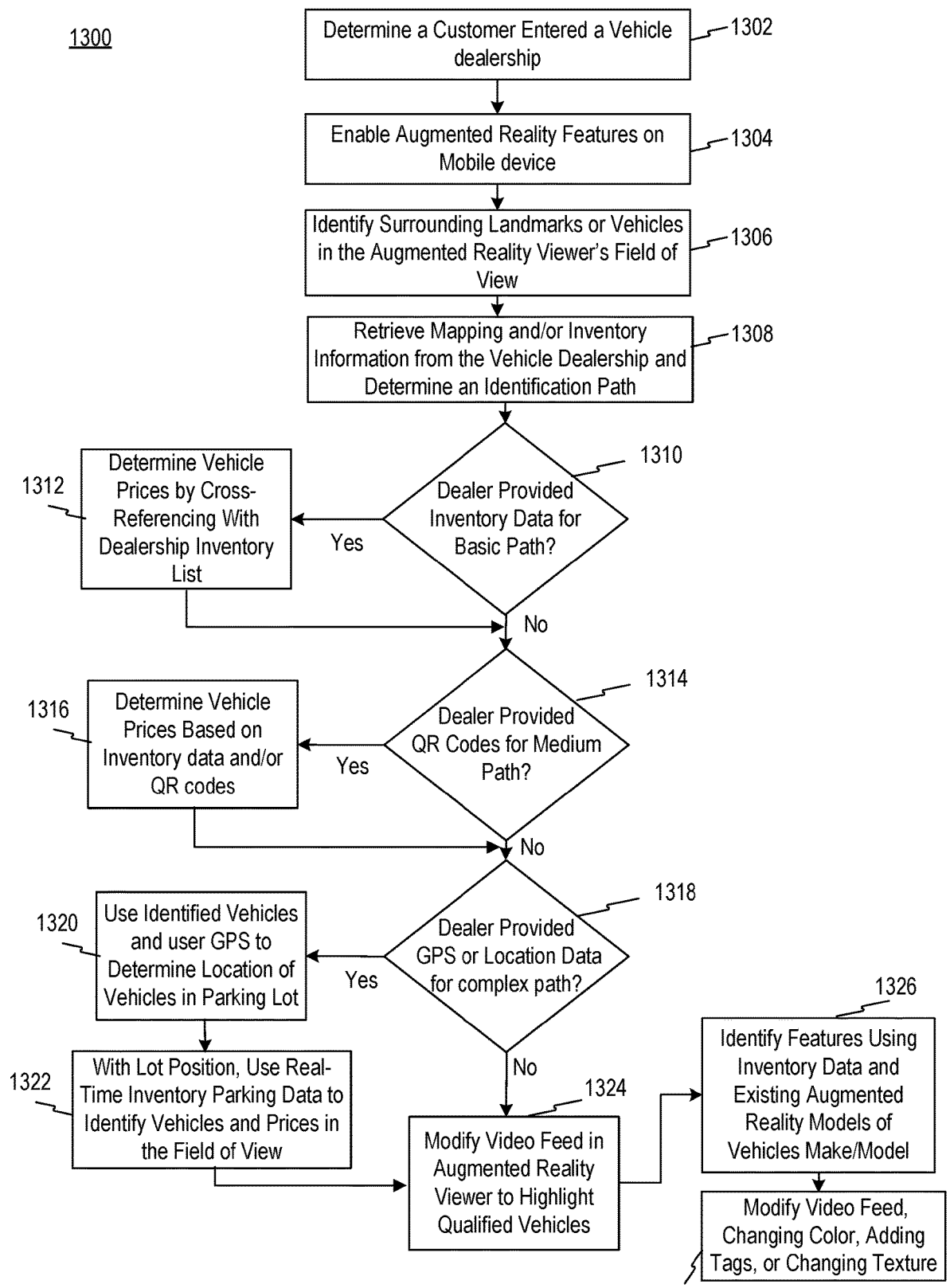
FIG. 13 is a flow chart illustrating an exemplary process for highlighting vehicles in a video feed, consistent with disclosed embodiments.

Referring now to FIG. 13, there is shown a flow chart of an exemplary vehicle process 1300 for highlighting vehicles in a video feed, consistent with disclosed embodiments. In some embodiments, process 1300 may be performed by AR system 105. In other embodiments, however, process 1300 may be performed by client devices 150. For example, processor(s) 602 in client devices 150 may execute instructions in AR application 614 (FIG. 6) to perform process 1300. Further, as previously discussed in connection to FIG. 1, in some embodiments process 1000 may be performed by multiple elements of system 100.

The description below of steps in process 1300 illustrates an embodiment in which AR system 105 performs steps of process 1300. However, as previously discussed, other elements of system 100 may also be configurable to perform one or more of the steps in process 1300. Moreover, the description below of process 1300 is tailored for vehicle recognition and navigation in a parking lot. Nonetheless, similar techniques may be applied in different contexts, such as shopping malls, airports, or other facilities unrelated to vehicle dealerships.

In step 1302, AR system 105 may determine a customer entered a facility, such as a vehicle dealership. Using location services, like GPS, or the connection with certain wireless devices, like BLE beacons, AR system 105 may determine one or more client devices 150 entered the vehicle dealership.

In step 1304, AR system 105 may enable AR features on mobile devices associated with the costumer. For example, AR system 105 may enable AR application 614 (FIG. 6) in client devices 150 associated with customers that entered the vehicle dealership in step 1302. In step 1306, AR system 105 may identify surrounding landmarks or vehicles in an AR viewer field of view. For example, in step 1304 AR system 105 may enable an AR viewer that users a camera of mobile devices. In such embodiments, AR system 105 may perform previously discussed image recognition techniques to identify surrounding landmarks or vehicles in the field of view.

In step 1308, AR system 105 may retrieve mapping and/or inventory information from the vehicle dealership. Based on that information, AR system 105 may also determine an image identification path. In some embodiments, AR system 105 may contact a server associated with the vehicle dealership to retrieve information about the dealership. The information may include mapping information, QR codes or parking lot numbers, inventory information, pricing information, and/or data from real-time tracking tools. Based on the quantity and/or quality of the data, AR system 105 may determine which identification path could be used. For example, if the dealership is providing only inventory information, the vehicle identification path may be basic, using only vehicle contour identification and categorization to identify vehicles in the parking lot. If, however, the dealership is providing more robust information, including QR codes and information of real-time inventory tracking systems, AR system 105 may determine that a more complex path of identification can be performed.

In step 1310, AR system 105 may determine whether the dealer provided inventory data for a basic identification path. Basic identification path may be a rudimentary identification process in which AR system 105 would attempt to identify vehicles in the AR viewer using image recognition to then correlate them with inventory data. This type of identification may be more resource-intensive because the images need to be analyzed in greater detail and may have higher error rates. However, basic identification path may facilitate incorporating more dealerships in databases of AR system 105 because it may require minimal dealership participation. For example, with basic identification path, any dealership with digital records of vehicles being offered in a parking lot could participate in the AR application with a small set-up cost.

If AR system 105 determines that the dealership provided inventory and/or mapping data sufficient for basic identification path (step 1310: Yes), AR system 105 may continue to step 1312 and determine vehicle prices by cross-referencing vehicle attributes identified in the field of view with the inventory and/or mapping information. For example, AR system 105 may determine the prices of vehicles identified in the field of view of the augmented reality viewer in step 1312. AR system 105 may then continue to step 1314. If, however, AR system 105 determines that the dealership did not provide inventory data (step 1310: No), AR system 105 may skip step 1312 and continue directly to step 1314.

In step 1314, AR system 105 may determine whether the dealership provided QR information for a medium identification path. For example, AR system may determine whether the dealership indicates in the inventory data that vehicles are associated with QR codes. If AR system 105 determines that the dealership provided QR codes for a medium identification path (step 1314: Yes), AR system 105 may continue to step 1316. In step 1316, AR system 105 may determine vehicle prices by resolving QR codes in the field of view and identifying prices based on the QR related information. For example, if AR system 105 determines that the dealership provided QR code information, AR system 105 may scan captured images or video feeds for presence of QR codes. AR system 105 may also resolve QR codes and determine vehicle prices based on inventory data and/or QR codes in step 1316. AR system may continue to step 1318. Alternatively, if AR system 105 determines that the dealership did not provide QR codes for identification path 2 (step 1314: No), AR system 105 may skip step 1316 and continue directly to step 1318.

In step 1318, AR system 105 may determine whether the dealership provided GPS or location data sufficient for a complex identification path. For example, AR system 105 may determine whether the dealership server provided information of the GPS location of different vehicles of the parking lot. Alternatively, or additionally, AR system 105 may determine whether the dealership provided real-time inventory tracking information for vehicles in the parking lot. The complex identification path may result in the highest accuracy while having low computation costs. With a complex identification path, once a user is located within the parking lot, only minimal image recognition would be required because most of the identification information can be obtained from the dealership. Instead of having to recognize vehicle contours to determine their location and inventory data, by using a complex identification path, items may be recognized based on location information provided by the dealership. Accordingly, use of a complex identification path may be faster and less computationally expensive. This type of identification, however, requires that dealerships share highly specific and up-to-date information. Thus, there may be a limited number of dealerships with the capability or willingness to provide such information, resulting in higher set-up costs.

If AR system 105 determines that the dealer-provided location information is sufficient for a complex identification path (step 1318: Yes), AR system 105 may continue to step 1320 and use inventory and GPS data to determine the location of vehicles in the parking lot. For example, based on the recognition of a landmark in the AR viewer, AR system 105 may estimate the location of the user and estimate the location of vehicles in the parking lot based on dealer-provided data. AR system 105 may also continue to step 1322 and use real-time inventory parking data to identify vehicles and prices in the field of view. For instance, in step 1322 AR system 105 may compare parking lot positions with images captured by the AR viewer to identify vehicles and prices in the field of view. Additionally, or alternatively, AR system may capture a sample image from the video feed, apply a classification function to the sample image (the classification function identifying vehicle model, vehicle make, and vehicle year), and comparing the location of the mobile device with mapping data to identify a VIN. With that information, AR system 105 may continue to step 1324. If, however, AR system 105 determines that the dealership did not provide GPS or location data for a complex identification path (step 1318: No), AR system 105 may skip steps 1320 and 1322 and continue directly to step 1324.

In step 1324, AR system 105 may modify a video feed captured with the augmented reality viewer to highlight qualified vehicles. For example, AR system 105 may compare the qualification criteria with identified vehicles and highlight vehicles in the parking lot that meet the qualification criteria. As further described in connection with FIGS. 12 and 15, AR system 105 may employ different AR techniques to modify video feed in the augmented reality viewer.

In some embodiments, AR system 105 may employ AR models to modify video feeds in AR viewers. In such embodiments, AR system 105 may identify features using inventory and employ existing augmented reality models of vehicles make/model to generate modified video feeds with augmented reality elements. For example, after identifying vehicles with one or more of the identifications paths, AR system 105 may associate vehicles with some feature that is described in the inventory data. Based on this correlation, AR system 105 may identify an existing AR model that could be used in augmented reality tools. In such embodiments, AR system 105 may determine that features of identified vehicles of a specific model. Using this information AR system 105 may retrieve an existing AR model that match the vehicle to then superimpose it on the AR viewer, displaying a modified video feed.

Alternatively, or additionally, AR system 105 may modify the video feed by changing pixels of an area associated with the vehicle. For example, in some embodiments AR system 105 may modify video feeds by changing color, adding tags, or change texture of the video feed in step 1328. For example, in embodiments in which AR models are not available for a specific type of vehicle, AR system 105 may modify video feeds to highlight qualified vehicles by changing colors, adding tags, or modifying the texture of qualified vehicles.

Figure 14:
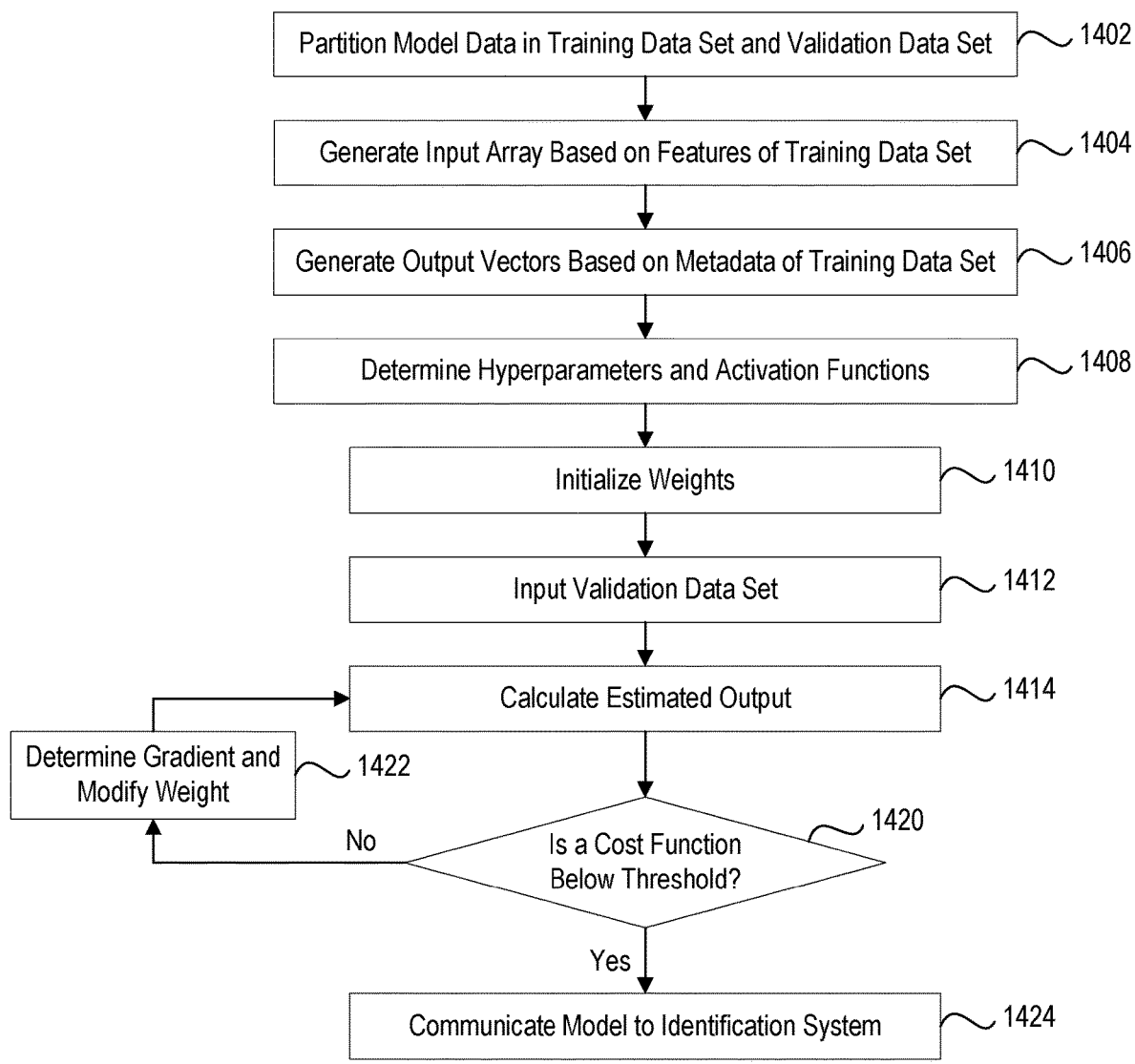
FIG. 14 is an exemplary flow chart illustrating a process for generating an identification model, consistent with disclosed embodiments.

Referring now to FIG. 14, there is shown a flow chart of an exemplary process 1400 for generating an identification model, consistent with disclosed embodiments. In some embodiments, process 1400 may be performed by AR system 105. For example, image classifier 130 may perform steps in process 1400. In other embodiments, however, process 1400 may be performed by client devices 150. Further, as previously discussed in connection to FIG. 1, in some embodiments process 1400 may be performed by multiple elements of system 100.

In some embodiments, process 1400 may be performed prior to process 1300. For example, models for vehicle identification may be generated before the AR viewer is activated. In other embodiments, however, process 1400 may be concurrent with other processes. In some embodiments, process 1400 may be used to generate identification tools for AR GUIs.

The description below of steps in process 1400 illustrates an embodiment in which AR system 105 performs steps of process 1400. However, as previously discussed, other elements of system 100 may also be configurable to perform one or more of the steps in process 1400.

In step 1402, AR system 105 may partition images of vehicles into a training data set and a validation data set. For example, AR system 105 may receive data representing a plurality of images of vehicles. The images may be associated with metadata describing attributes of the vehicle in the image. AR system 105 may divide the images of the vehicles and generate two groups, one to train a convolutional neural network and a second to validate the model.

In step 1404, AR system 105 may generate an input array based on features of the training data set. For example, AR system 105 may generate a variable including feature information of images in the training data set.

In step 1406, AR system 105 may generate output vectors based on metadata of the training data set. For example, based on the images in the training data set, AR system 105 may generate a desired output vector identifying vehicle make and model that is included in the training data set.

In step 1408, AR system 105 may determine hyperparameters and activation functions to initialize the model to be created. For example, AR system 105 may select a number of layers and nodes and determine whether the network will be fully or partially connected. In addition, in step 1408 AR system 105 may determine the dimensionality of the network.

In step 1412, AR system 105 may apply the input array based on features of training data set of step 1404 to calculate an estimated output in step 1414 and a cost function. In step 1420, AR system 105 may determine whether the cost function is below a threshold of required accuracy, which may be specified by the user. If AR system 105 determines that the cost function is not below a threshold and the "required accuracy has not being achieved (step 1420: No), AR system 105 may continue to step 1422 and determine a gradient to modify weights in synapsis or modify the activation functions in the different nodes. However, if the cost function is below a threshold (step 1120: Yes), AR system 105 may accept the model and communicate the model to a server in system 100 and/or client devices 150 in step 1424.

Figure 15:
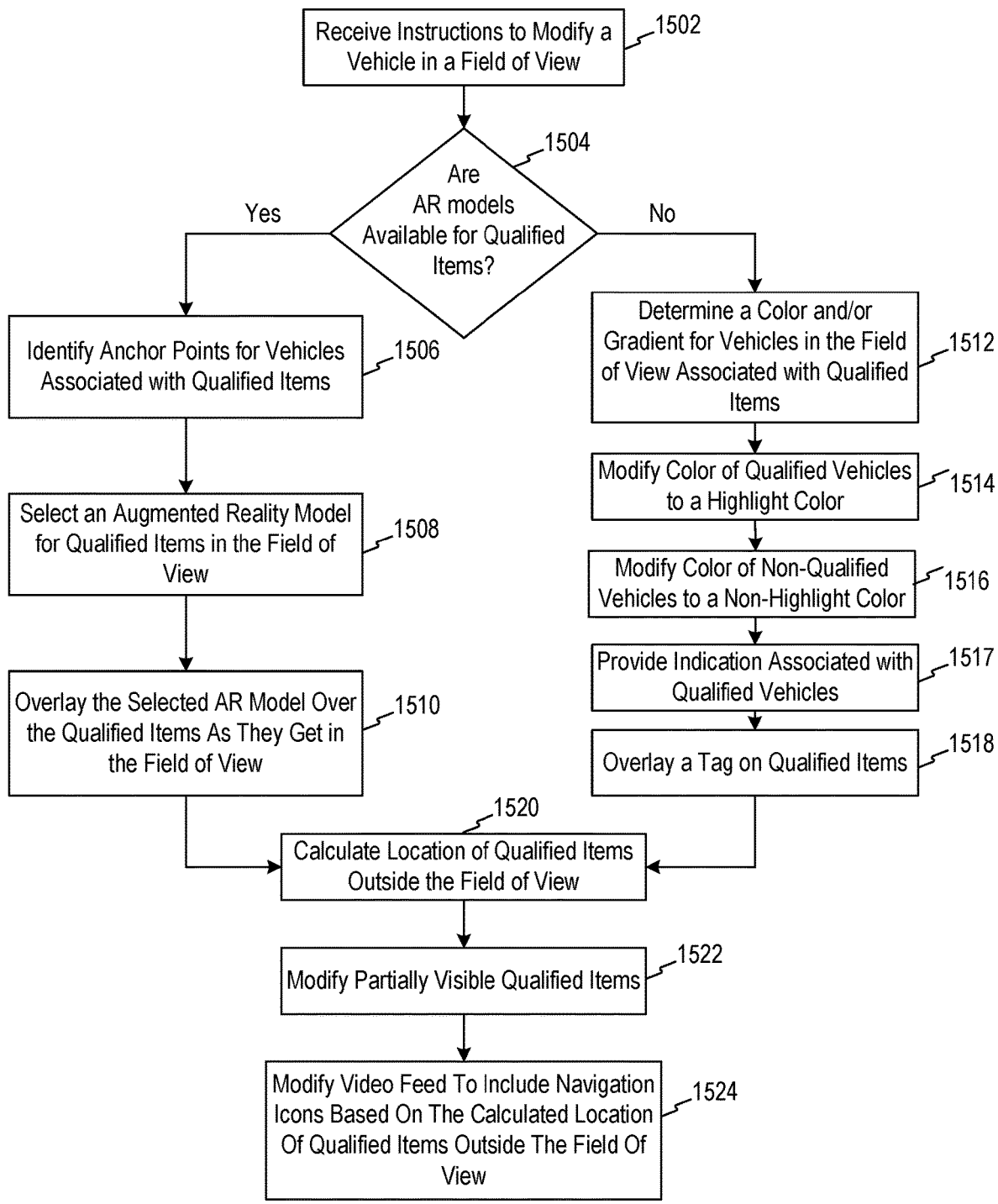
FIG. 15 is a flow chart illustrating a process for generating modified video feeds, consistent with disclosed embodiments.

Referring now to FIG. 15, there is shown a flow chart of an exemplary process 1500 for generating modified video feeds, consistent with disclosed embodiments. In some embodiments, process 1500 may be performed by AR system 105. In other embodiments, however, process 1500 may be performed by client devices 150 and/or multiple elements of system 100.

In some embodiments, process 1500 may be performed immediately after process 1200. In other embodiments, process 1500 may be part of process 1300, or other process that modifies video feeds for AR GUIs. For example, process 1500 may be performed as part of process 1100 during step 1118 (FIG. 11).

The description below of steps in process 1500 illustrates an embodiment in which AR system 105 performs steps of process 1500. However, as previously discussed, other elements of system 100 may also be configurable to perform one or more of the steps in process 1500.

In step 1502, AR system 105 may receive instructions to modify a vehicle in a field of view. For example, AR system 105 may receive instructions to modify a vehicle in the field of view of an augmented reality viewer displayed on client devices 150.

In step 1504, AR system 105 may determine whether there are AR models available for qualified items. For example, after identifying which vehicles in a parking lot meet the qualification criteria, with for example process 1100 (FIG. 11), AR system 105 may determine if the vehicles identified as qualifying vehicles have an AR model that could be used to create the AR view. If in step 1504 AR system 105 determines there are augmented reality models identified for the qualified vehicles or items (step 1504: Yes), AR system 105 may continue to step 1506.

In step 1506, AR system 105 may identify "anchor points" for AR vehicle models in qualified vehicles. For example, AR system 105 may identify headlights, plates, or tires in qualified vehicles as anchor points for AR models. In step 1508, AR system 105 may select an augmented reality model for the one or more qualified items in the field of view. These models may be selected based on their similarity with identified vehicles or items or their rendering complexity. In step 1510, AR system 105 may overlay the selected AR model over the qualified items.

If, however, AR system 105 determines that there are no AR models available for qualified items (step 1504: No), AR system 105 may continue to step 1512 and determine a color and/or gradient for vehicles in the field of view that are associated with qualified items. For example, AR system 105 may determine that qualified vehicles in the parking lot will be highlighted with a yellow color with no gradient or transparency. In step 1514, AR system 105 may modify the color of qualified vehicles to a highlight color. In some embodiments, in step 1516 AR system 105 may modify the color of non-qualified vehicles to a non-highlight color. For example, AR system 105 may gray out non-qualified vehicles. Additionally, or alternatively, AR system 105 may provide indicators associated with qualified vehicles in step 1517. For example, in step 1517 AR system 105 may modify video feeds by providing indicators like arrows, boxes, and/or stars to also highlight qualified vehicles. Further, in some embodiments, AR system 105 may overlay a tag on qualified items in step 1518. As further described in connection with FIG. 22, AR system 105 may generate an AR GUI that not only changes the color of qualified vehicles but also overlays information. Thus, in step 1518 AR system may modify the video feed to put tags with information such as vehicle characteristics or pricing information to facilitate navigation in the parking lot using augmented reality tools.

With modifications using AR models (step 1510) and/or using color changes (e.g., step 1516), AR system 105 may continue to step 1520, in which AR system 105 may calculate location of qualified items outside the field of view. For example, AR system 105 may determine that there are qualified items in the parking lot that are not in the field of view. Based on the mapping data and the qualification criteria, AR system 105 may estimate the location of other qualified items that are in the parking lot but that are not in the field of view.

In step 1522, AR system 105 may modify partially visible qualified items. For example, if a qualified vehicle is unrecognizable by the image recognizer but it is partially in the field of view (based on the mapping information provided by the dealership), AR system 105 may still perform color or AR model changes to that partially vehicle image.

Further, if the qualified items are not even partially visible in the field of view, in step 1524 AR system 105 may modify the video feed captured with an AR viewer to include navigation icons based on estimated locations of qualified items. For example, it there are qualified items or vehicles in the opposite side of the field of view (e.g., behind the user), AR system 105 may generate navigation icons and modify the video feed to indicate there are additional qualified items in back of the user. Alternatively, if the AR system 105 determines that there are additionally qualified items or vehicles in the left of the field of view, AR system 105 may generate icons to indicate there are additional qualified items in the left of the field of view.

Overall process 1500 may facilitate generating AR video feeds or images to highlight the presence of qualified items in the facility and/or guide users to the qualified items in the facility.

Figure 16:
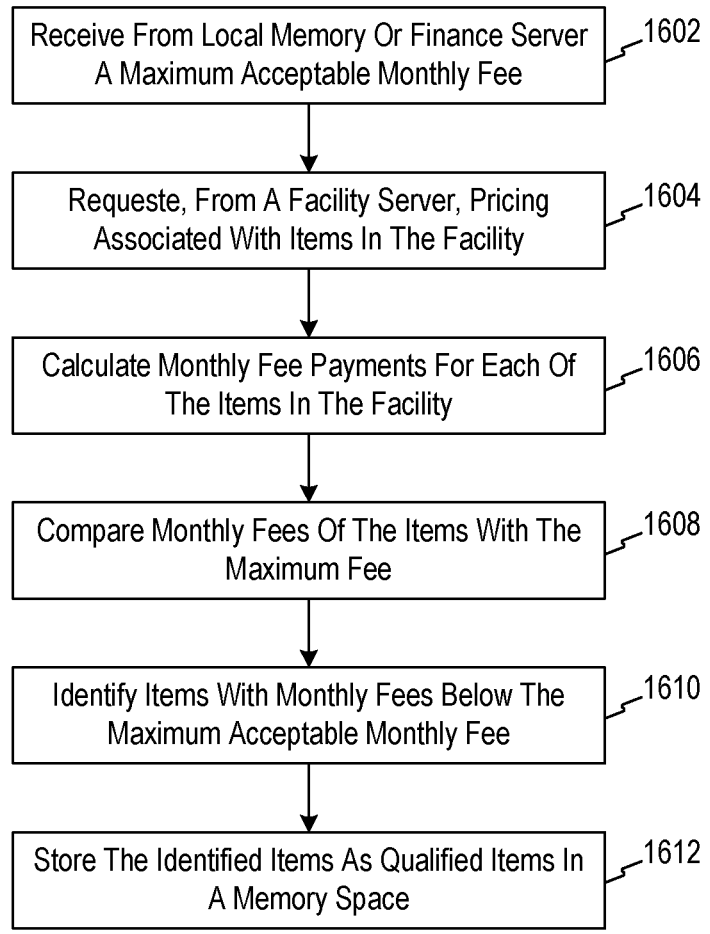
FIG. 16 is a flow chart illustrating an exemplary process for identifying qualified items, consistent with disclosed embodiments.

Referring now to FIG. 16, there is shown an exemplary process 1600 for identifying qualified items, consistent with disclosed embodiments. In some embodiments, process 1600 may be performed by AR system 105. In other embodiments, however, process 1600 may be performed by client devices 150 and/or multiple elements of system 100.

In some embodiments, process 1600 may be performed as part of process 1100 (FIG. 11). For example, process 1600 may be performed as part of step 1110. In other embodiments, process 1600 may be independently performed.

The description below of steps in process 1600 illustrates an embodiment in which AR system 105 performs steps of process 1600. However, as previously discussed, other elements of system 100 may also be configurable to perform one or more of the steps in process 1600.

In step 1602, AR system 105 may receive, from local memory or finance server, a maximum acceptable monthly payment For example, a user of AR application 614 (FIG. 6), may pre-configure the application to specify the maximum monthly payment that is acceptable to the user. Alternatively, or additionally, AR system 105 may retrieve a maximum loan amount that a user could receive and calculate a maximum acceptable monthly payment. In such embodiments, AR system 105 may retrieve this information from one or more of online resources 140 (FIG. 1).

In step 1604, AR system 105 may request, from a facility server, pricing associated with items in the facility. For example, AR system 105 may request inventory data with pricing information form a vehicle dealership that manages a parking lot.

In step 1606, AR system 105 may calculate monthly payments for each of the items in the facility. For example, using the pricing information of step 1604 and loan terms, AR system 105 may calculate the monthly payments.

In step 1608, AR system 105 may compare monthly payments of the items with the maximum payment. In step 1610, AR system 105 may identify items with monthly payments below the maximum acceptable monthly payment. In some embodiments, items identified in step 1610 may be vehicles that are affordable to a user of the AR application 614.

In step 1612, AR system 105 may store the identified items as qualified items in a memory space. For example, AR system 105 may store the identified qualified vehicles in a local memory of client devices 150. In such embodiments, AR system 105 may store the vehicle characteristics, location, and pricing information when the vehicle qualifies.

Additionally, or alternatively, AR system 105 may identify the qualified items performing operations of retrieving (from a provider server) a maximum monthly payment acceptable to the user, requesting (from the facility server) pricing associated with each of the vehicles, calculating monthly payments for each of the vehicles based on the pricing, comparing the monthly payments with the maximum monthly payment, and identifying vehicles with monthly payments below the maximum monthly payment as the qualified vehicles.

Figure 17:
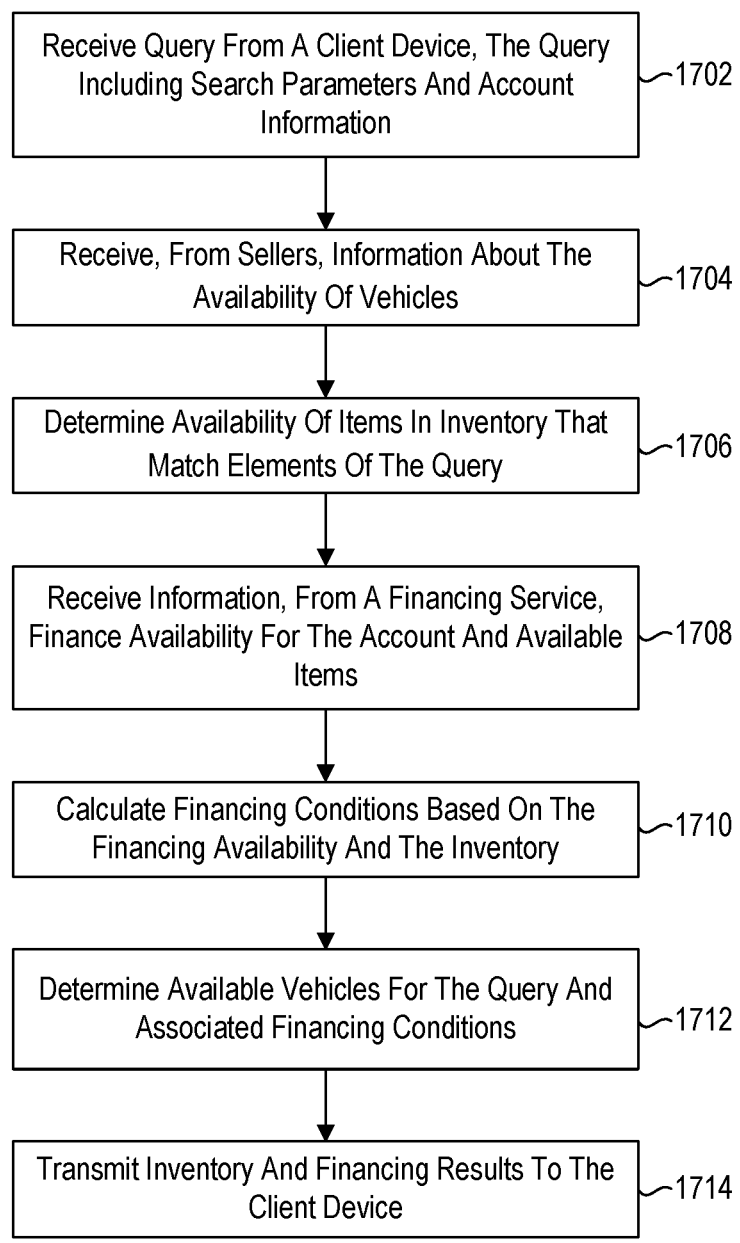
FIG. 17 is a flow chart illustrating an exemplary client query resolution process, consistent with disclosed embodiments.

Referring now to FIG. 17, there is shown an exemplary client query resolution process 1700, consistent with disclosed embodiments. In some embodiments, process 1700 may be performed by AR system 105. In other embodiments, however, process 1700 may be performed by client devices 150 and/or multiple elements of system 100.

In some embodiments, process 1700 may be performed after process 1100 (FIG. 11). For example, process 1700 may be performed immediately after step 1120. In other embodiments, process 1700 may be independently performed.

Process 1700 may be performed when a user identifies an item that he would like to research. For instance, AR tools may help a user find an item that he is interested in. Once he finds the item, the user may want to get additional information about the item. The user may want to learn more specific information, compare the item with other items, and/or obtain the availability of financing to purchase the item. Thus, the disclosed methods and systems may perform process 1700 to provide this further detailed information to users that want additional information or financing availability for an item.

The description below of steps in process 1700 illustrates an embodiment in which AR system 105 performs steps of process 1700. However, as previously discussed, other elements of system 100 may also be configurable to perform one or more of the steps in process 1700.

In step 1702, AR system 105 may receive a query from client devices 150. For example, AR system 105 may receive a query that specifies a vehicle make, model, and trim line from client devices 150. The query may include search parameters, an account information based on the user of the client devices 150, and/or client identification in the AR application 614.

In step 1704, AR system 105 may receive information about the availability of vehicles. For example, when the image classification is for vehicle images, AR system 105 may receive inventory information from online resources 140 associated with vehicle dealers, vehicle manufacturers, and/or aggregator websites. In step 1706, AR system 105 may determine availability of items in the inventory that match elements of the query. In some embodiments, AR system 105 may generate an array, or similar information structures, correlating the query elements with items in the inventory received in step 1704.

In step 1708, AR system 105 may receive information of finance availability based on an account associated with the query and the items in the inventory list that match the query requirements. In some embodiments, the finance availability information may be received from online resources 140.

In step 1710, AR system 105 may calculate financing conditions based on the financing availability and the items in the inventory. In step 1012, AR system 105 may determine available vehicles for the query and associate financing conditions. For example, AR system 105 may generate a composite list that includes both the vehicles from the inventory that match the query attributes or requirements with the financing conditions calculated in step 1710.

In step 1714, AR system 105 may transmit inventory results and financing information to other elements of system 100. For example, AR system 105 may transmit a list of vehicles that match the query requirements with associated financing conditions to client devices 150.

Figure 18:
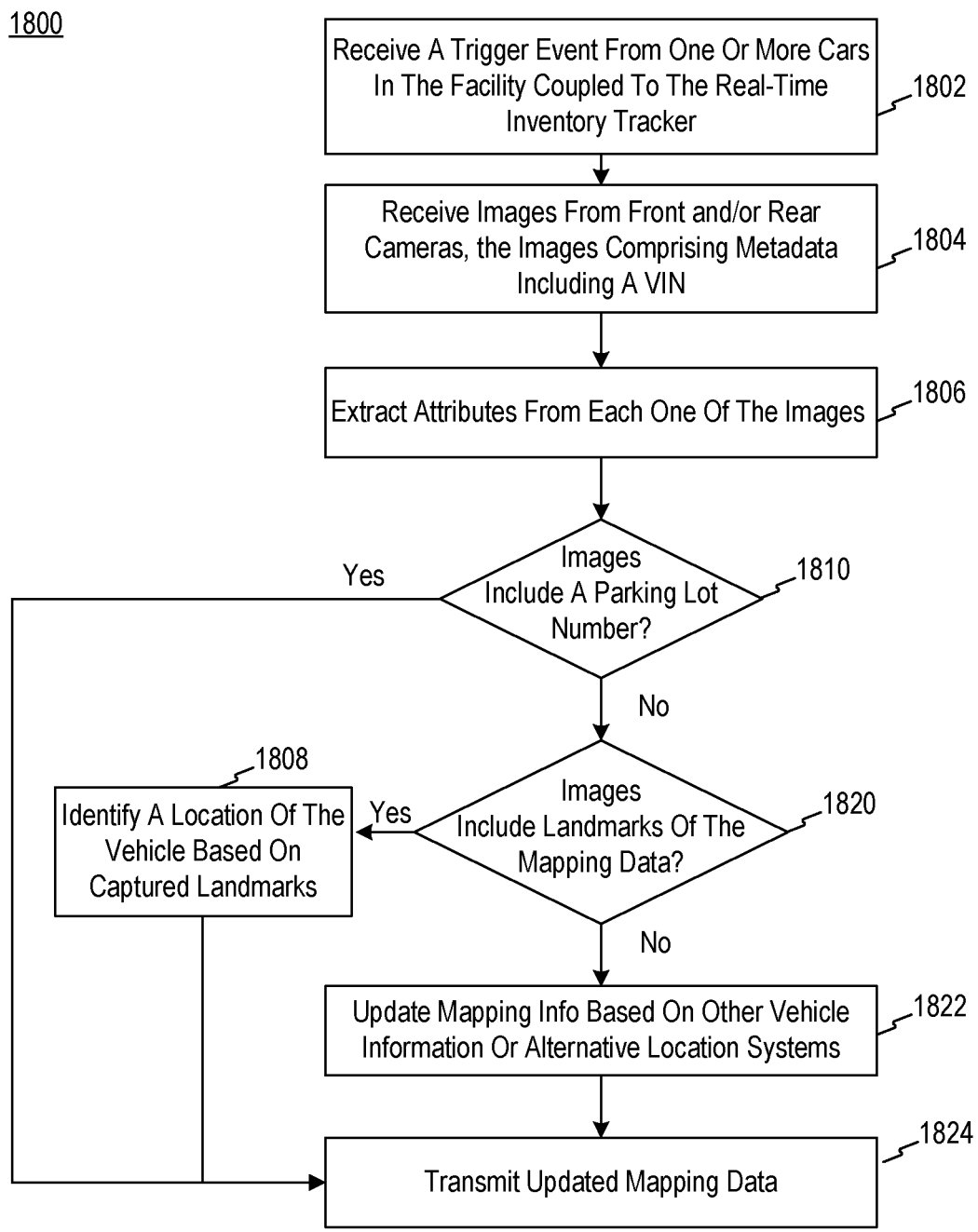
FIG. 18 is a flow chart illustrating an exemplary process for updating mapping data, consistent with disclosed embodiments.

Referring now to FIG. 18, there is shown an exemplary process 1800 for updating mapping data, consistent with disclosed embodiments. In some embodiments, process 1800 may be performed by AR system 105. In other embodiments, however, process 1800 may be performed by client devices 150 and/or databases 180 and/or multiple elements of system 100.

In some embodiments, process 1800 may be performed when a facility includes a real-time inventory tracking system. This type of facilities may enable identification systems that rely on real-time information, instead of, or in addition to, image recognition. As described in connection with FIG. 13, using these type of systems may allow improved accuracy and response time in AR applications. However, such systems require greater involvement from dealerships. Further, process 1800 describes steps to update mapping data of a parking lot using location information for the vehicles. Similar real-time tracking systems may be used for other type of items in a facilities, such as consumer products and/or electronics.

The description below of steps in process 1800 illustrates an embodiment in which AR system 105 performs steps of process 1800. However, other elements of system 100 may also be configurable to perform one or more of the steps in process 1800.

In step 1802, AR system 105 may receive a trigger event from one or more vehicles in the facility coupled to the real-time inventory tracker. In some embodiments, the trigger event may include a signal that one of the vehicles in the facility was started. Alternatively, or additionally, the trigger event may come from a motion sensor placed in the facility. Other trigger events based on image recognition or manual inputs.

In step 1804, AR system 105 may receive images from front and/or rear cameras (i.e., cameras mounted on the front/rear of vehicles, also known as dash cameras) of vehicles. In some embodiments, the images received in step 1804 may include metadata including a VIN. For example, AR system 105 may receive information that is captured in parking assistance cameras.

In step 1806, AR system 105 may extract attributes from the images received in step 1806. For example, AR system 105 may extract attributes from the images using CNNs or other image recognition technique.

In step 1810, AR system 105 may determine whether the images include parking lot numbers. For example, based on the attributes extracted in step 1806, AR system 105 may determine whether the parking assistance cameras captured a parking lot number. If AR system 105 determines images include a parking lot number (step 1810: Yes), AR system 105 may continue to step 1824, where AR system 105 may update the mapping data based on the identified parking lot numbers and the VIN numbers. If, however, AR system 105 determines images do not include a parking lot number (step 1810: No), AR system 105 may continue to step 1820.

In step 1820, AR system 105 may determine whether images received from vehicles in step 1804 include landmarks that are associated with the mapping data. For example, AR system 105 may determine whether the images include columns, light fixtures, and/or road signs that have been identified in the mapping data from the facility. If AR system 105 determines the images include landmarks that match landmarks in the mapping data (step 1820: Yes), AR system 105 may continue to step 1808 and identify a location of vehicles based on captured landmarks. AR system may also continue to step 1824 and update mapping data by correlating the location of vehicles with landmarks and transmitting the updated data to client devices 150 or databases 180. However, if AR system 105 determines that the images do not include mapping data (step 1820: No), AR system 105 may continue to step 1822.

In step 1822, AR system 105 may attempt to update the vehicle location without vehicle specific data. AR system 105 may update the vehicle information by estimating vehicle position based on the information received from other vehicles. For example, images received from a specific vehicle may not include attributes that can be correlated with location. The location of this vehicle may be updated, nonetheless, using alternative location methods. For example, the location of the vehicle may be estimated based on the current location of other vehicles. In such embodiments, AR system 105 may conduct an elimination process of parking lots to estimate the position of a vehicle. Alternatively, or additionally, AR system 105 may use GPS, steering, and/or accelerometer information to estimate the new location of a vehicle when the image recognition does not identify either parking lot numbers or landmarks. With this calculations having been performed, AR system 105 may continue to step 1824, update the mapping data and transmit it.

Process 1800 describes steps to provide up-to-date mapping data information in a facility. The use of multiple instances of image recognition and alternative location methods may facilitate keeping up-to-date records with minimal user intervention. Accordingly, process 1800 may facilitate the execution of AR viewers by use of parking lot numbers and front and rear cameras from a plurality of vehicles to receive images from the front and rear cameras, identify one or more numbered parking lots from the images, and update the mapping data by correlating the vehicles with one or more of a plurality of numbered parking lots.

Figure 19:
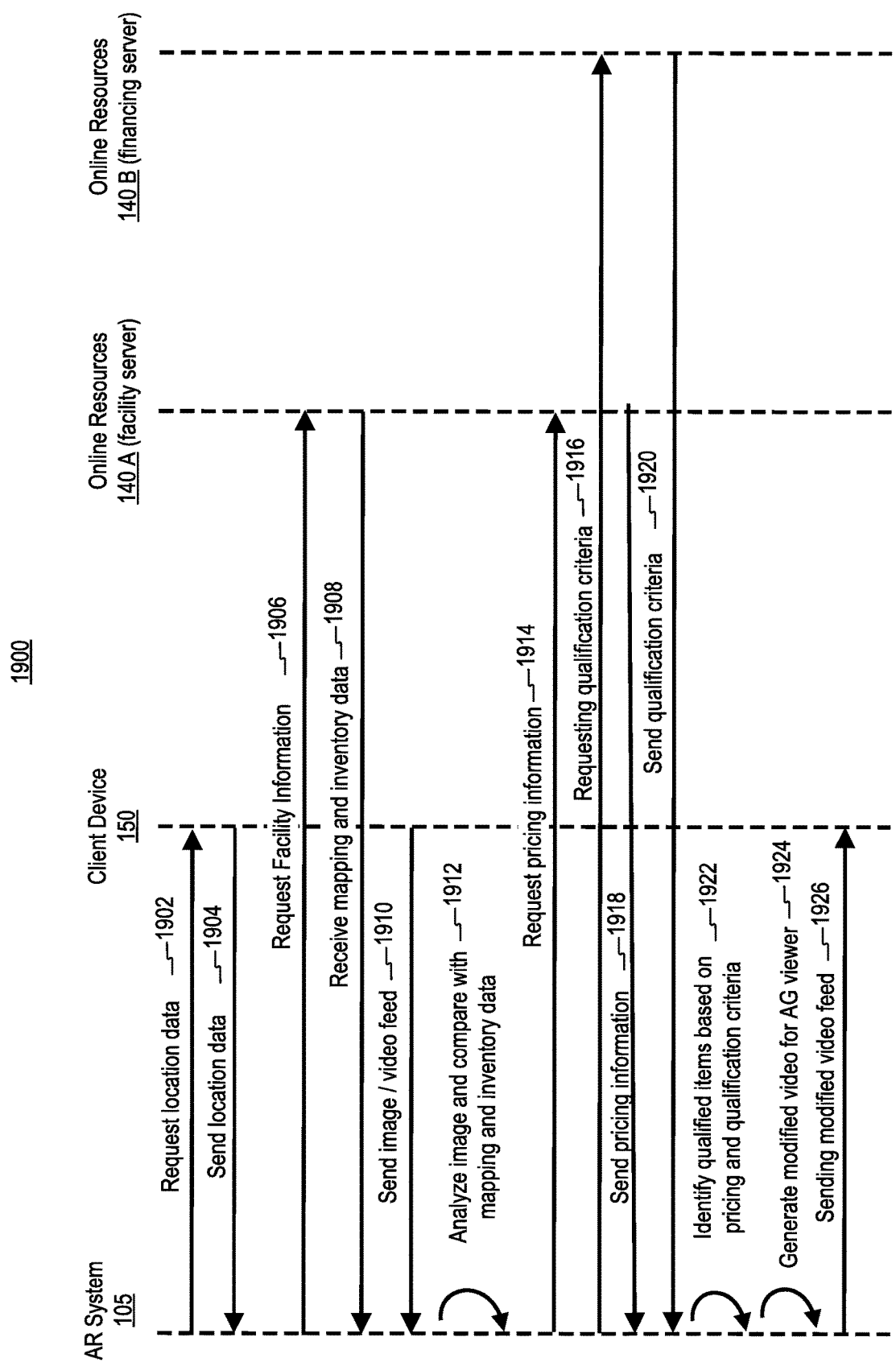
FIG. 19 is a process flow diagram illustrating an exemplary communication sequence for augmented reality operations, consistent with disclosed embodiments.

Referring now to FIG. 19, there is shown an exemplary process flow illustrating a communication sequence 1900, consistent with disclosed embodiments. As shown in FIG. 19, communication sequence 1900 may involve multiple elements of system 100, including client devices 150, AR system 105, and online resources 140. However, other elements of system 100 may be involved in communication sequence 1900. For example, databases 180 may perform some of the steps of communication sequence 1900.

In step 1902, AR system 105 may request location data from one or more client devices 150. In step 1904, client devices 150 may return the location data by sending coordinates or GPS data. In some embodiments, if AR system 105 determines that the location data received in step 1904 matches location data of one or more of the participating facilities, AR system 105 may request facility information from the participating facility in step 1906. In response, the facility, which may manage one or more of online resources 140, may return facility information including mapping data and/or inventory data in step 1908. For example, if the participating facility is a vehicle dealership, online resources 140 may transmit information of the location of vehicles in the parking lot and inventory data (including pricing information).

In step 1910, client devices 150 may send images or videos to AR system 105. For example, using AR application 614 (FIG. 6), client devices 150 may capture images in an augmented reality viewer. This captured images or video feeds may be transmitted to AR system 105 in step 1910. In step 1912, AR system 105 may analyze the images and compare them with mapping and inventory data (received in step 1908). Based on the analysis, AR system 105 may decide to request additional information. For example, if AR system 105 identifies a vehicle in the images received in step 1910, AR system 105 may send a request for pricing information for that vehicle to online resources 140 in step 1914. Further, in step 1916 AR system 105 may request qualification criteria from online resources. In some embodiments, AR system 105 may request the qualification criteria from different online resources 140. For example, while the facility information (in step 1906) and the pricing information (in step 1914) may be received from a facility server, the qualification criteria may be requested from a financing server, which may be associated with a bank.

Concurrently with step 1916, or in a different sequence, AR system 105 may receive the pricing information in step 1918. Similarly, concurrently or in a different sequence, AR system 105 may receive the qualification criteria in step 1920. In step 1922 AR system 105 may identify qualified items in the image/video feed received in step 1910 based on pricing and qualification criteria. For example, AR system 105 may identify vehicles in the images or video feed that cost less than a value determined in the qualification criteria. Based on the identification of step 1922, AR system 105 may generate modified video for an augmented reality viewer in step 1924. For example, as further described in connection with FIG. 15, AR system 105 may use AR models, update colors within contours or vehicles, or add tags, to vehicles that match qualification criteria.

In step 1926, AR system 105 may send the modified video feed to client devices 150. Alternatively, in embodiments in which AR system 105 is implemented within client devices 150, AR system 105 may display the modified video feed in step 1926.

Figure 20:
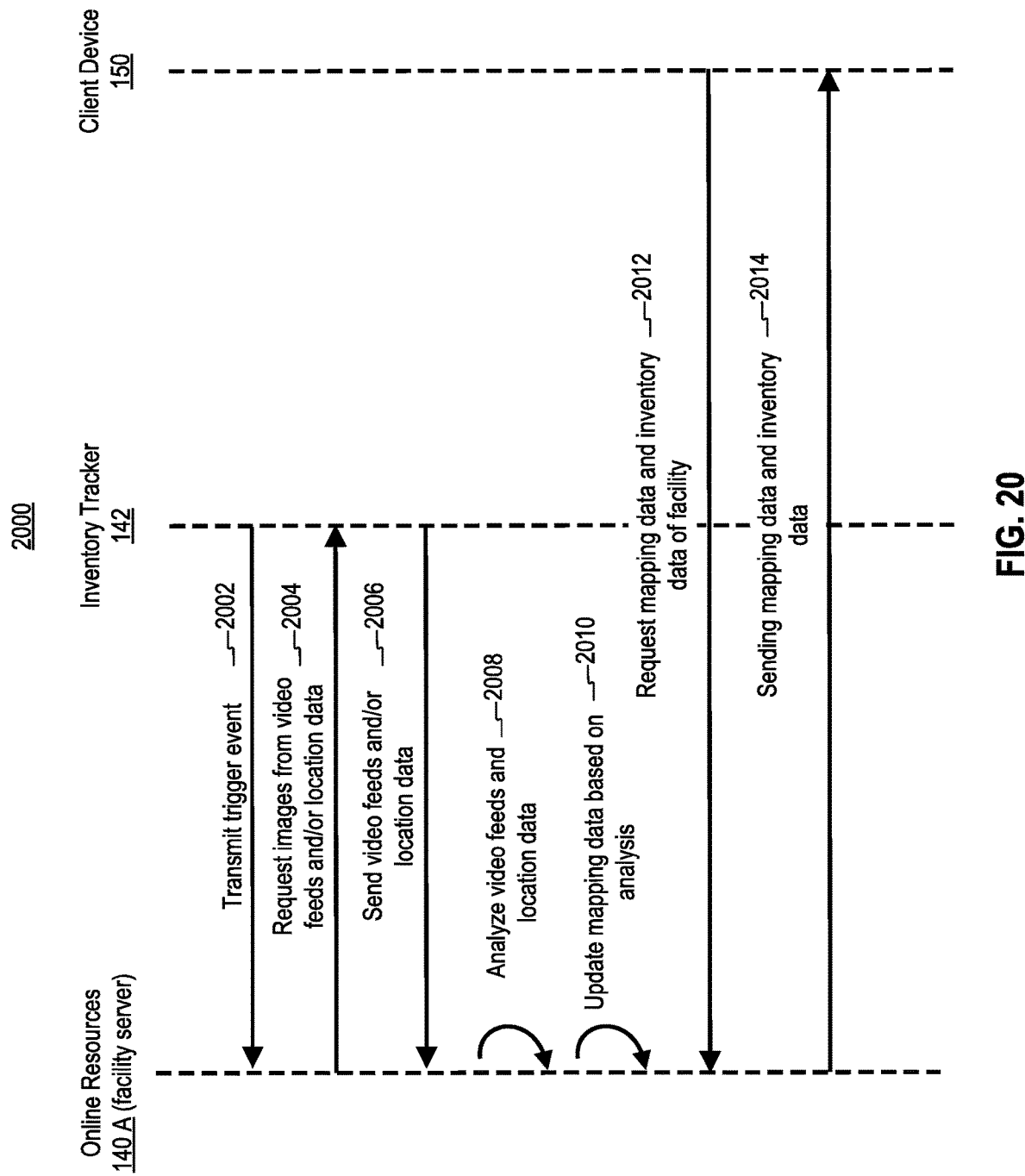
FIG. 20 is a process flow diagram illustrating a mapping data update exemplary communication sequence, consistent with disclosed embodiments.

Referring now to FIG. 20, there is shown a mapping update exemplary communication sequence 2000, consistent with disclosed embodiments. As shown in FIG. 20, communication sequence 2000 may involve multiple elements of system 100, including online resources 140, inventory trackers 142, and client devices 150. However, other elements of system 100 may be involved in communication sequence 2000. For example, AR system 105 may perform some of the steps of communication sequence 2000.

In step 2002, vehicles systems 142 may transmit a trigger event to online resources 140. For example, a vehicle in a dealer parking lot may transmit a trigger event when the vehicle location is updated per GPS location or when the vehicle is started. In such embodiments, the vehicle may send a trigger event to a facility server. In step 2004, online resources 140 may request images from video feeds and/or location data from vehicles systems 142. For example, online resources 140 may request images from front and rear cameras in step 2004. Additionally, or alternatively, online resources 140 may request steering information, accelerometer information, and/or location data. Inventory trackers 142 may send these videos, images, or location data in step 2006.

In step 2008, online resources 140 may analyze video feeds and location to estimate updated location of vehicles in a parking lot. As further described in connection with FIG. 18, online resources 140 (or AR system 105) may use the information retrieved from vehicles in step 2006 to estimate the updated location of vehicles. Thus, in step 2010, online resources 140 may update the mapping data based on the analysis of step 2008 to generate accurate mapping data that reflect the position of items in the facility after the triggering event of step 2002.

In step 2012, client devices 150 may request mapping data and/or inventory data from online resources 140. For example, in embodiments in which AR system 105 is implemented in client devices 150, client devices 150 may request mapping and inventory data as soon as the AR application 614 (FIG. 6) is enabled. In such embodiments, client devices 150 may request mapping and inventory data to perform the augmented reality navigation operations further described in connection with FIGS. 11-13.

In step 2014, online resources may send mapping and inventory data to client devices in response to the request of step 2012. The mapping and inventory data transmitted in step 2014 may be updated based on the analysis of step 2008. Accordingly, client devices 150 may receive current and accurate information in step 2014, facilitating accurate navigation and positioning.

Figure 21:
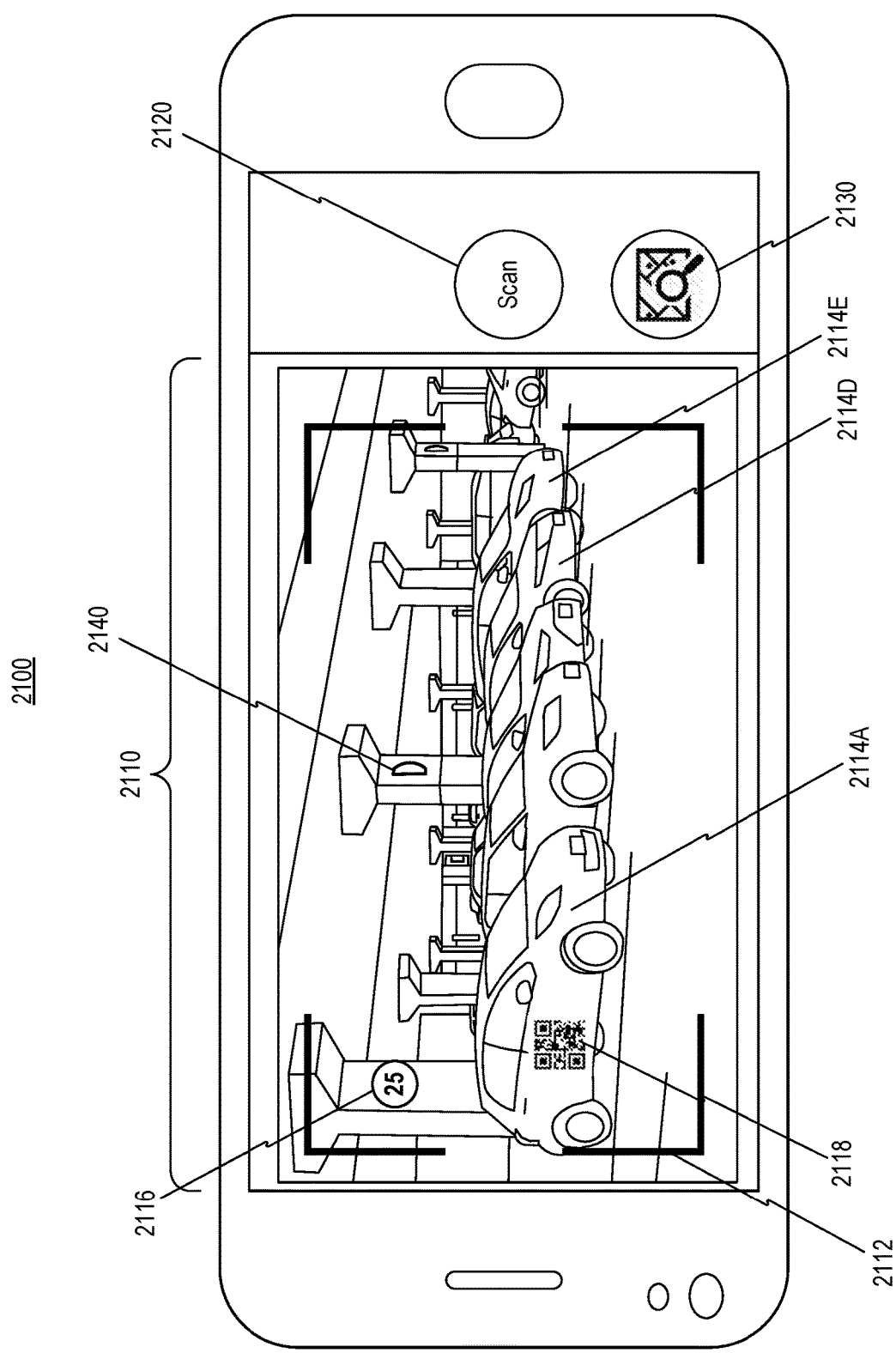
FIG. 21 is an exemplary first graphical user interface, according with disclosed embodiments.

Referring now to FIG. 21, there is shown an exemplary GUI 2100, consistent with disclosed embodiments. In some embodiments, GUI 2100 may be displayed in client devices 150 and may be displayed when a user opens AR application 614 (FIG. 6). For example, GUI 2100 may be displayed during step 1304 (FIG. 13), when augmented reality features get enabled in mobile devices.

GUI 2100 may include an AR viewer 2110. AR viewer 2110 may display a video feed that is captured with cameras of client devices 150. AR viewer 2110 may occupy a portion of client devices 150, as shown in FIG. 12. AR viewer 2110 may include guide marks 2112 that define a field of view of the AR viewer 2110. Guide marks 2112 may also delineate portions of the AR viewer 2110 that can be used for image recognition. In addition, AR viewer 2110 may display items 2114. In some embodiments, as shown in FIG. 21, items 2114 may be vehicles and a single field of view of AR viewer 2110 may display multiple items 2114, including items 2114A-2114E. In the same field of view, AR viewer 2110 may also display parking lot numbers 2116. As shown in FIG. 21, parking lot numbers 2116 may be displayed adjacent to items 2114. This relation may be used by AR system 105 or other elements of system 100 to identify locations of items.

In some embodiments, AR viewer 2110 may also display QR codes 2118. As shown in FIG. 21, QR codes 2118 may be display adjacent to items 2114. This relation may be used by AR system 105—or other elements of system 100—to identify vehicles without having to perform contour image recognition. In combination, QR codes 2118 and parking lot numbers 2116 may provide means for identifying vehicles quickly without requiring intensive computing resources for image recognition. Moreover, AR viewer 2110 may also display landmarks 2140. As previously discussed in connection to FIG. 12, these landmarks 2140 may also be used to pinpoint locations of vehicles or identify the location of the user to estimate locations of items 2114.

GUI 2100 may also include a scan button 2120. Scan button 2120 may trigger image recognition algorithms and/or AR modules to modify the video feed captured in AR viewer 2110. Moreover, GUI 2100 may also include a map button 2130. Map button 2130 may change the view presented in AR viewer 2110 and display a map of a facility, as further described in connection to FIG. 27.

Figure 22:
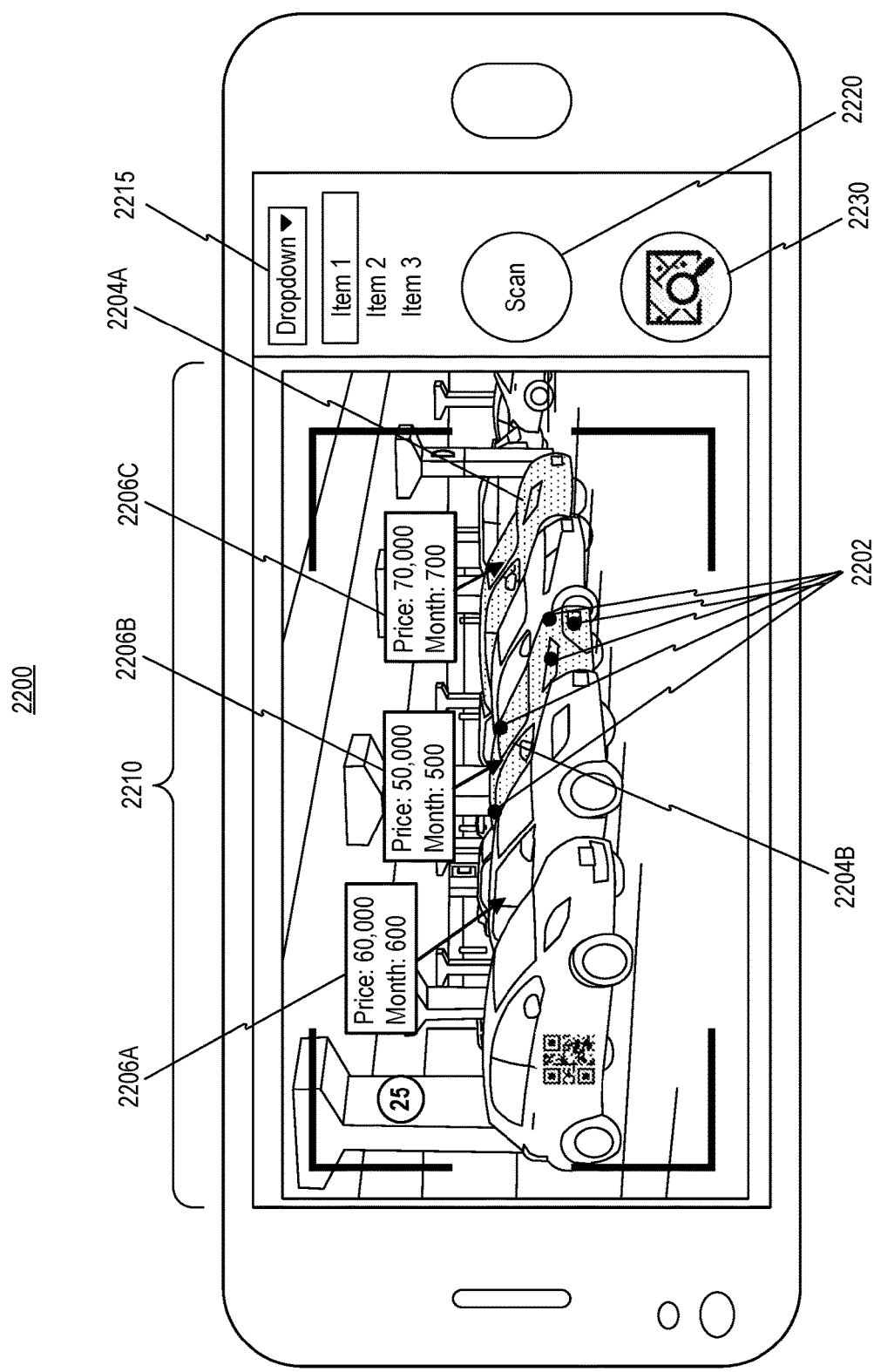
FIG. 22 is an exemplary second graphical user interface showing augmented reality results, according with disclosed embodiments.

Referring now to FIG. 22, there is shown an exemplary GUI 2200, consistent with disclosed embodiments. In some embodiments, GUI 2200 may be displayed in client devices 150 and may be displayed when a user interacts with scan button 2120 of GUI 2100. Alternatively, or additionally, GUI 2200 may be displayed in client devices 150 when a user operates AR application 614 (FIG. 6). For example, GUI 2100 may be displayed when the video feed is modified in step 1120 (FIG. 11).

GUI 2200 may include a modified AR viewer 2210 which may display the same elements of AR viewer 2110 as background. However, unlike AR viewer 2110, AR 2210 may display augmented reality elements that modify the video feed initially captured in GUI 2100. For example, in AR viewer 2210 some of the items 2114 may be modified. As shown in FIG. 22, some of the items 2114 may be modified to have a different color or texture. Specifically, FIG. 22 shows that items 2114C and 2114E were modified to display a different color, creating modified items 2204A and 2204B. Modified items 2204 may be vehicles that qualify under the qualification criteria, and AR system 105 may highlight them to help the user navigate a parking lot.

In addition, AR viewer 2210 may display tags 2206. In some embodiments, AR system 105 may generate modified video feeds by including tags that display information of items 2114 and/or modified items 2204. These tags may be displayed in AR viewer 2210 in a location associated with respective tags 2206. Accordingly, as shown in FIG. 22, AR viewer 2210 may include tags 2206A-2206C presenting cost and payment data.

AR viewer 2210 may also display anchor points 2202. As previously described in connection with FIG. 15, AR system 105 may modify video feeds by overlaying AR models on identified items in the field of view. In such embodiments, AR viewer 2210 may display the anchor points that are used to incorporate AR models in captured images. In embodiments where AR viewer 2210 is used to identify vehicles, anchor points 2202 may include points in headlights, license plate, windshield, and roof. Anchor points 2202 may be used as references points to adapt AR models and create the modified video feed. In some cases, like when an AR model is not available, the modified video feed shown in AR viewer 2210 may simply change colors or add tags, illustrated for modified item 2204.

GUI 2200 may also include scan button 2220 which may perform a new scan when the user moves or when the user is not satisfied with the results presented. In addition, GUI 2200 may also include a map icon 2230 to change the view from the AR viewer 2210 to a top-view map, as further described in connection with FIG. 27. Moreover, GUI 2200 may also display a drop-down menu 2215. The drop-down menu may list items in the facility that meet the qualification criteria. For example, when a user is looking for vehicles, drop-down menu 2215 may list all the vehicles in the parking lot that meet the qualification criteria. In some embodiments, drop-down menu 2215 may include interactive icons. When one of the interactive icons in the list is selected, AR viewer 2210 may then be modified to highlight only the selected item. In some embodiments, if the item selected from drop-down menu 2215 is not in the AR viewer 2210 field of view, AR viewer 2210 may be modified to show directions for the user to arrive at the selected item, as further described in connection with FIG. 24. Further, in some embodiments, in response to determining that at least one location attribute matches at least one of the vehicles or the landmarks, AR system 105 may display a drop-down menu in the graphical user interface that lists each of the qualified items.

Figure 23:
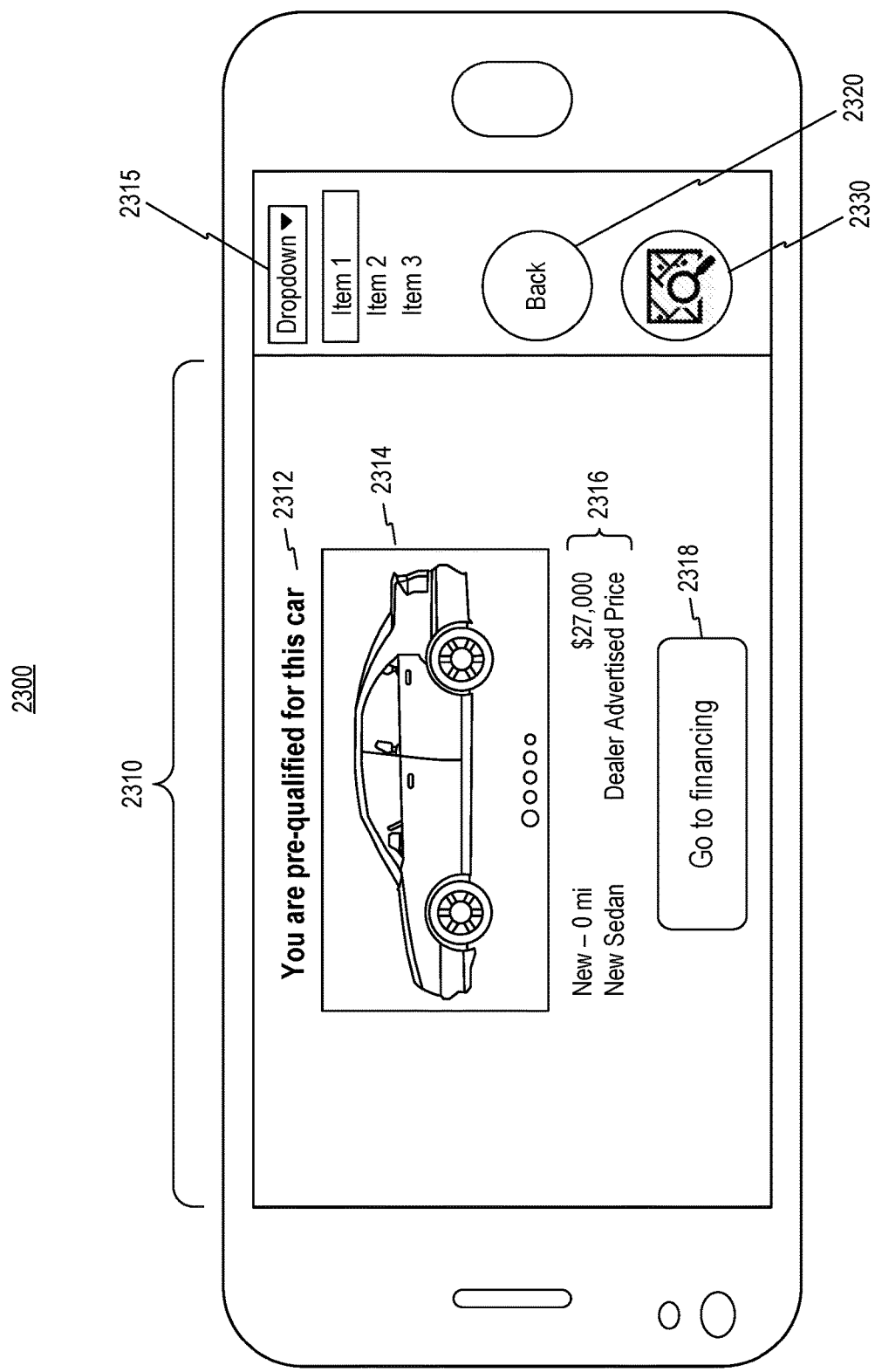
FIG. 23 is an exemplary third graphical user interface showing search results, according with disclosed embodiments.

Referring now to FIG. 23, there is shown an exemplary GUI 2300, consistent with disclosed embodiments. In some embodiments, GUI 2300 may be displayed in client devices 150 when a user selects one of the modified items 2204 of FIG. 22. Modified items 2204 may be modified not only to change appearance but also to become interactive icons that may provide indication of qualified items. In such embodiments, a user may select one of the modified items 2204, and GUI 2300 may be displayed in client devices 150 with the selection.

GUI 2300 may include a result window 2310. Result window 2310 may include a qualification message 2312, a stock image 2314 (associated with the selected modified item 2204), detailed information 2316, and an action button 2318. Qualification message 2312 may display a message for the user and may indicate whether the selected item is available for the user. Stock image 2314 may display an image of the item that may be used by the user to confirm that the identified vehicle is the desired vehicle observed in GUI 2200. Detailed information 2316 may include additional information that may be more specific than the information displayed in tags 2206. Action button 2318 may generate a query to a server, such as the facility server or a financing server, based on the results obtained from the image identification and the user's selections.

GUI 2300 may also include a drop-down menu 2315, which may list items in the facility. Further drop-down menu 2315 may list interactive icons that may change the results displayed in results window 2310. Further, GUI 2300 may include a back button 2320, which may return to, for example, GUI 2200. GUI 2300 may also include a map button 2330, which may modify the result window 2310 for a top-view map, further described in connection with FIG. 27.

Figure 24:
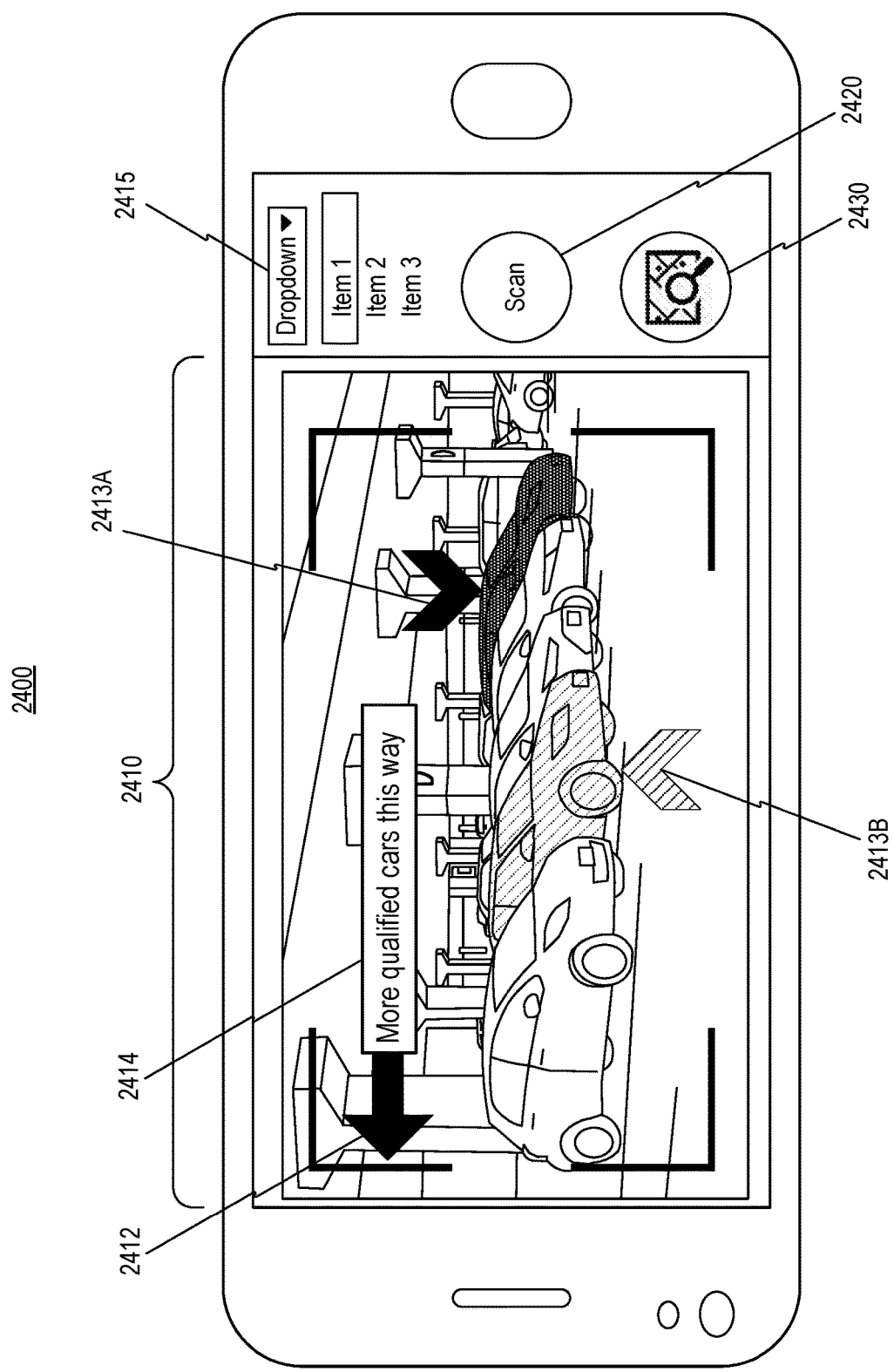
FIG. 24 is an exemplary fourth graphical user interface showing augmented reality navigation tools, according with disclosed embodiments.

Referring now to FIG. 24, there is shown an exemplary GUI 2400, consistent with disclosed embodiments. In some embodiments, GUI 2400 may be displayed in client devices 150 when a user selects one item in dropdown menu 2215 of FIG. 22. Alternatively, or additionally, GUI 2400 may be displayed once a user interacts with scan button 2120 of FIG. 21. For example, GUI 2400 may be displayed when there are items that comply with the qualification criteria that are not in the field of view of AR viewer 2210.

GUI 2400 may include an AR viewer 2410. AR viewer 2410 may display the same elements of AR viewer 2110 as background. However, unlike AR viewer 2110, AR 2210 may display augmented reality elements that modify the video feed initially captured in GUI 2100. For example, as shown in FIG. 24, AR viewer 2410 may display highlighted items with a different color or texture. In addition, AR viewer 2410 may display navigation icons 2412, navigation indicators 2413, and navigation messages 2414. Navigation indicators 2413 may provide indications associated with qualified items displayed in the video feed. For example, as shown in FIG. 24, navigation indicators may include chevrons that point to qualified items displayed in AR viewer 2410. Indeed, in some embodiments instead of modifying the appearance of an item, AR system 105 may only provide indicators such as navigation indicators 2413 (including 2413A and 2413B). Further, navigation indicators 2413 may be coded based on the classification of qualified items. For instance, navigation indicators 2413 may replicate the color or pattern of modified qualified items. On the other hand, navigation messages 2414 may provide directions for users to find more qualified items. For example, when used in a parking lot to search for vehicles, AR viewer 2410 may show navigation icons 2412 and navigation messages 2414 that guide a user to additional vehicles that meet qualification criteria.

GUI 2400 may also include a drop-down menu 2415, which may list items in the facility. Further, drop-down menu 2415 may list interactive icons that may change the navigation icons 2412 and a navigation messages 2414. Moreover, GUI 2400 may include a scan button 2420, which may rerun image recognition operations. GUI 2400 may also include a map button 2430, which may modify AR viewer 2410 to display a top-view map.

Figure 25:
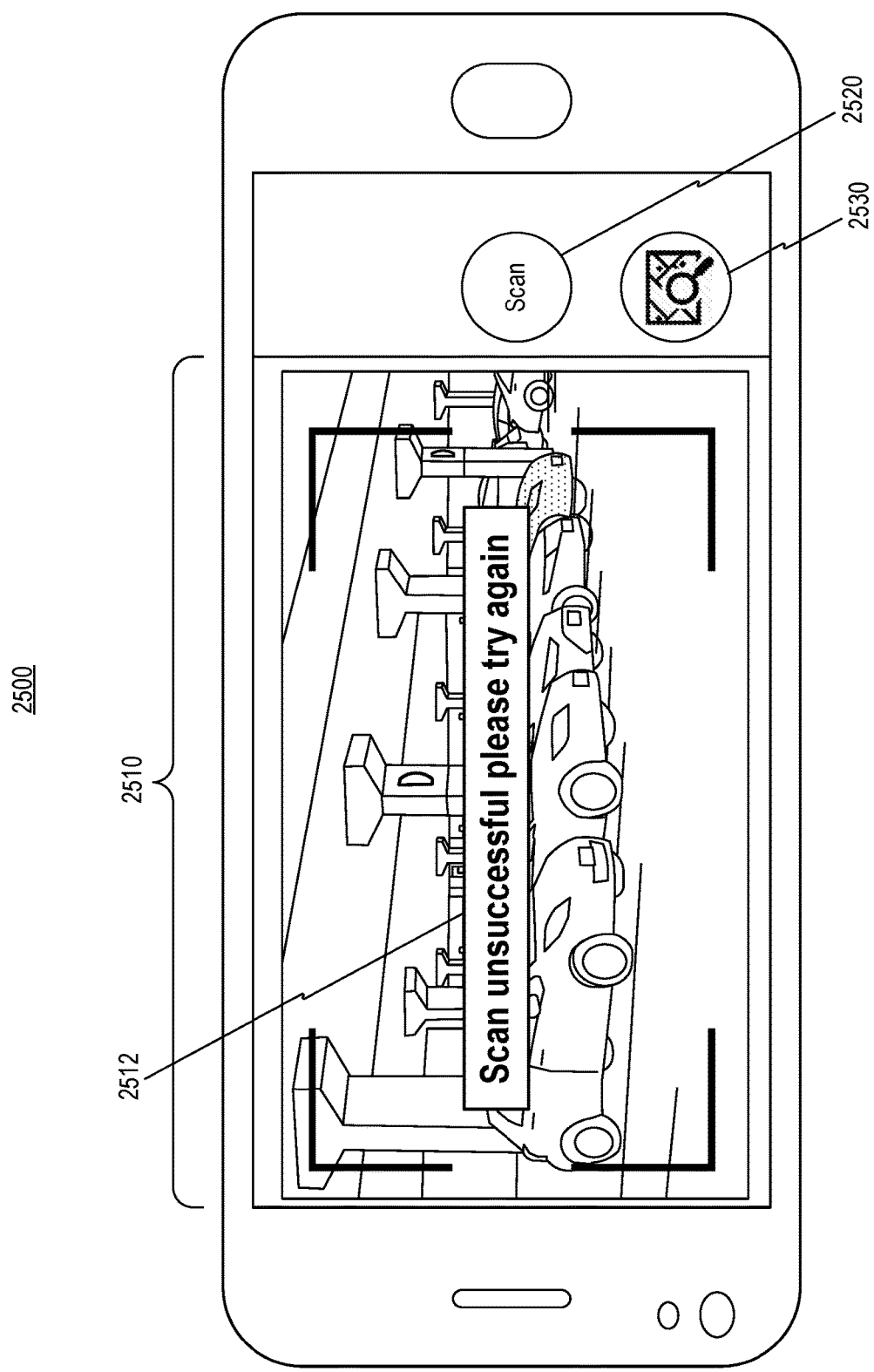
FIG. 25 is an exemplary fifth graphical user interface showing a notification message, according with disclosed embodiments.

Referring now to FIG. 25 there is shown an exemplary GUI 2500, consistent with disclosed embodiments. In some embodiments, GUI 2500 may be displayed in client devices 150 when the image recognition is unsuccessful or when the location information is unavailable. For example, GUI 2500 may be displayed when AR system 105 is unable to identify a location of client devices 150.

GUI 2500 may include an AR viewer 2510. AR viewer 2510 may display the same elements of AR viewer 2110 as background. However, unlike AR viewer 2110, AR 2510 may display an error message 2512 overlaying the other elements in AR viewer 2510.

GUI 2500 may also include a scan button 2520, which may rerun image recognition operations. GUI 2500 may also include a map button 2530, which may modify AR viewer 2510 to display a top-view map.

Figure 26:
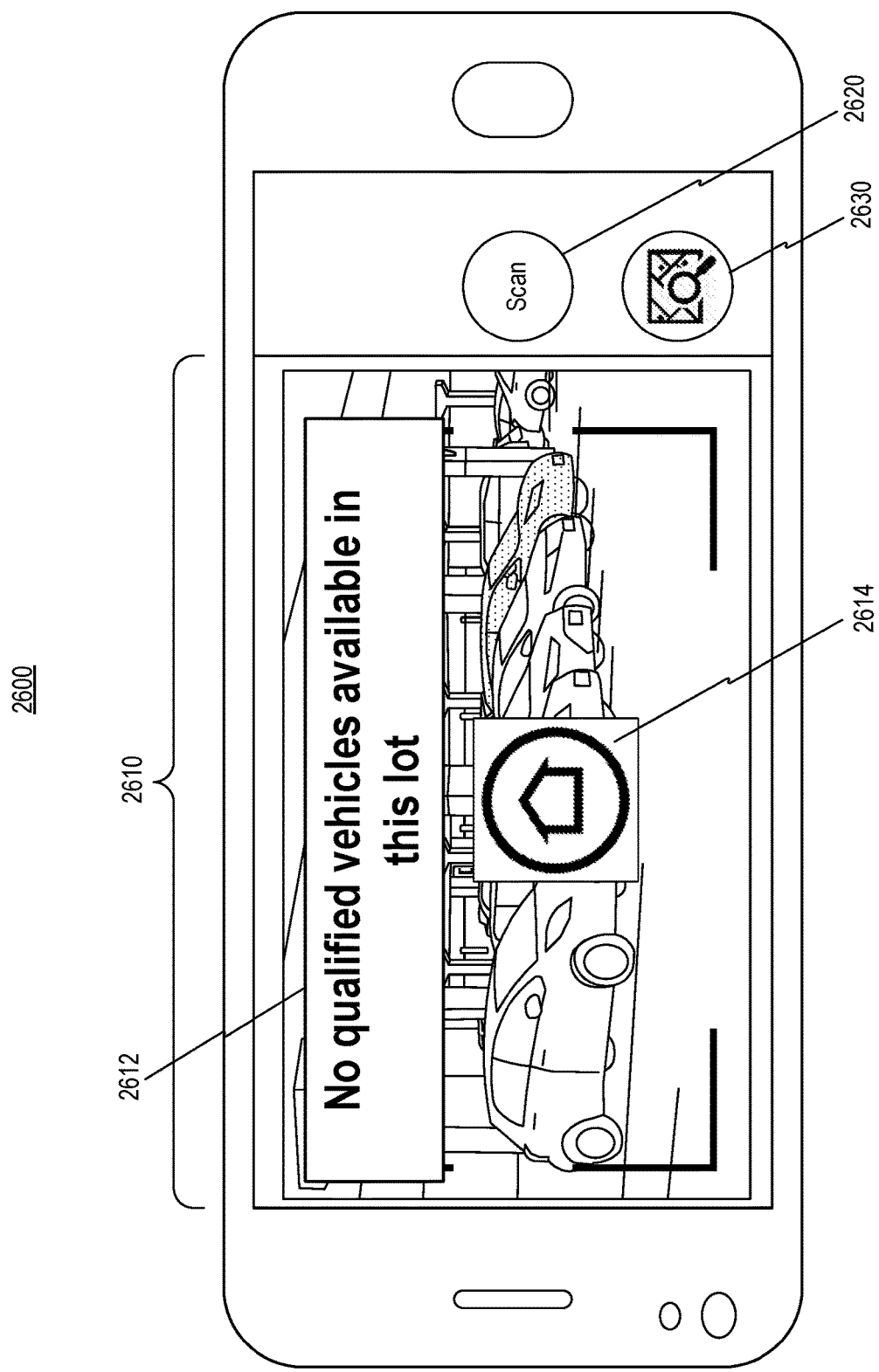
FIG. 26 is an exemplary sixth graphical user interface showing an error notification message, according with disclosed embodiments.

Referring now to FIG. 26 there is shown an exemplary GUI 2600, consistent with disclosed embodiments. In some embodiments, GUI 2600 may be displayed in client devices 150 when AR system 105 determines that none of the items in the facility meet the user's qualification criteria. For example, GUI 2600 may be displayed when AR system 105 determines that none of the vehicles in a dealership's parking lot meet the qualification criteria configured by the user or online resources 140.

GUI 2600 may include an AR viewer 2610. AR viewer 2610 may display the same elements of AR viewer 2110 as background. However, unlike AR viewer 2110, AR 2610 may display a notification message 2612 and a home button 2614 overlaying the other elements in AR viewer 2610.

GUI 2600 may also include a scan button 2620, which may return rerun image recognition operations. GUI 2600 may also include a map button 2630, which may modify AR viewer 2610 to display a top-view map.

Figure 27:
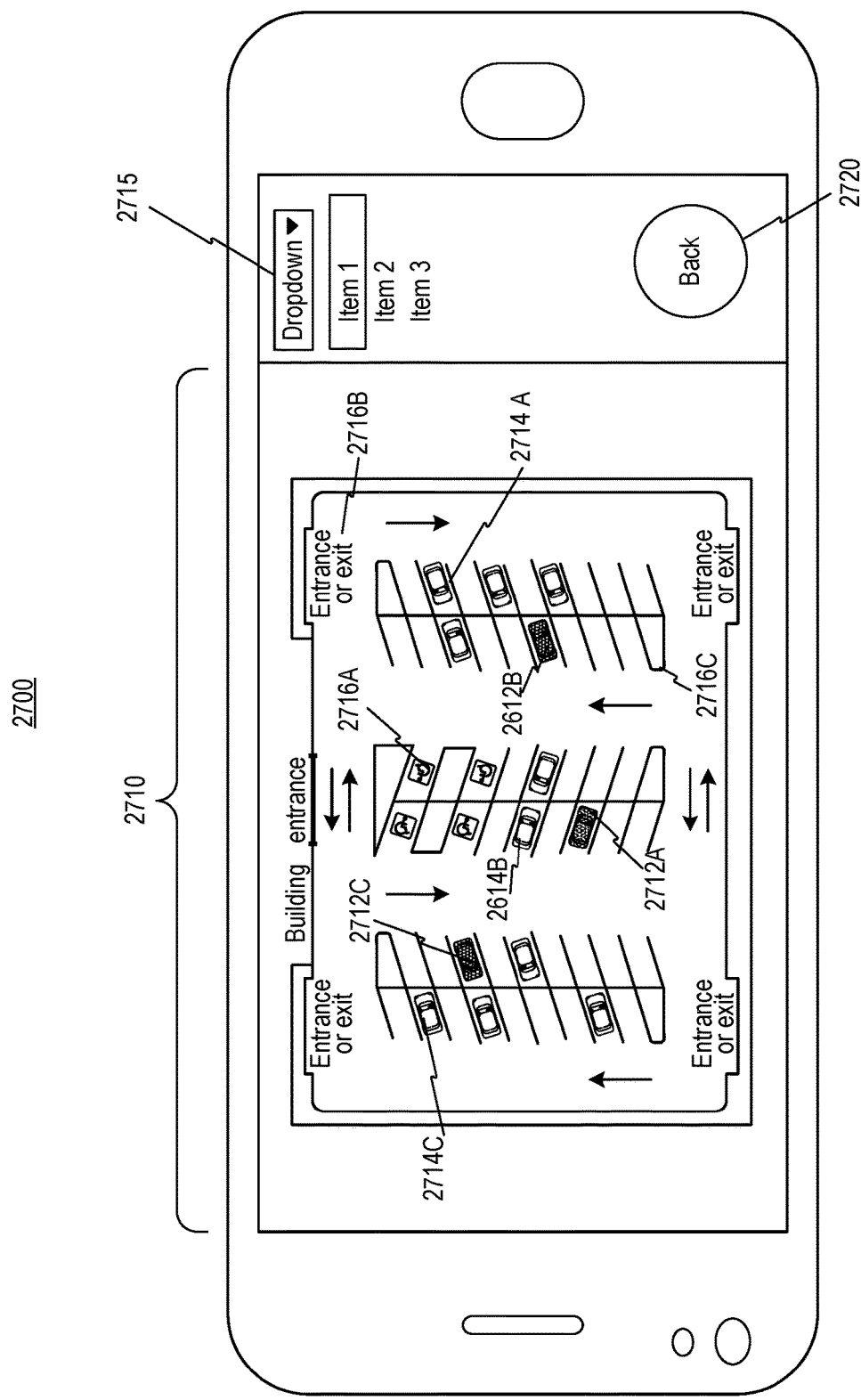
FIG. 27 is an exemplary seventh graphical user interface showing a top-view map, according with disclosed embodiments.

Referring now to FIG. 27, there is shown an exemplary GUI 2700, consistent with disclosed embodiments. In some embodiments, GUI 2700 may be displayed in client devices 150 when a user selects map buttons displayed in other GUIs. For example, GUI 2700 may be displayed when a user interacts with map button 2220, map button 2230, and/or map button 2130. Alternatively, or additionally, GUI 2700 may be displayed when a user starts an augmented reality application like AR application 614 (FIG. 6).

GUI 2710 may include a top-view map 2710. Top-view map 2710 may be generated based on mapping data received from a facility server. For example, top-view map 2710 may be a map of a dealership parking lot and include information of the location of vehicles in the dealership.

Top-view map 2710 may include qualified items 2712 (2712A-2712C) and nonqualified items 2714 (2714A-2712B). In some embodiments, as shown in FIG. 27, include qualified items 2712 and nonqualified items 2714 may be vehicles in the parking lot. Additionally, or alternatively, include qualified items 2712 and nonqualified items 2714 may be distinguishable with a color-code convention or with some different texture. In this way, a user can quickly identify the different items within the facility that match the qualification criteria.

Top-view map 2710 may also include landmarks 2716. As shown in FIG. 27, landmarks 2716 may include exits and/or parking lines. However, landmarks 2716 may also include columns and/or traffic signals. While top-view map 2710 is displayed occupying most of the screen in GUI 2700, in some embodiments top-view map 2710 may be displayed smaller in a portion of, for example, AR viewer 2110. Therefore, in some embodiments, client devices 150 may be configured to generate top-view map 2710 based on the mapping data and overlying top-view map 2710 over other GUIs.

GUI 2700 may also include a drop-down menu 2715, which may list items in the facility. Further dropdown menu 2715 may list interactive icons that may change top-view map 2710 to highlight a specific item in the map. For example, when a specific item is selected in dropdown menu 2715, top-view map 2710 may be modified so only the specific item is highlighted in top-view map 2710. Further, GUI 2700 may include a back button 2720, which may return to an AR viewer such as GUI 2100.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted. Furthermore, while some of the exemplary embodiments of the computerized methods were described using Java language or C to illustrate exemplary scripts and routines, the disclosed methods and systems may be implemented using alternative languages. The disclosed embodiments may use one or multiple programming languages in addition to Java or C. For example, the disclosed embodiments may also be implemented using Python, C++, C#, R, Go, Swift, Ruby, and/or their combinations.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. An augmented reality system, comprising:
   one or more processors; and
   one or more storage devices storing instructions that, when executed, configure the one or more processors to perform operations comprising:
   determining a location of a mobile device;
   identifying a facility based on the location;
   requesting mapping data from a facility server, the mapping data comprising a plurality of vehicles, vehicle location data, and landmarks;
   identifying at least one location attribute in a video feed captured by an augmented reality viewer displayed in the mobile device;
   determining whether the at least one location attribute matches at least one of the vehicles or the landmarks;
   in response to determining that the at least one location attribute matches at least one of the vehicles or the landmarks:
     identifying qualified vehicles from the vehicles based on qualification criteria;
     determining whether at least one of the qualified vehicles is in a field of view of the augmented reality viewer based on object attributes, identified in the field of view, and the vehicle location data; and
     generating a modified video feed by providing an indication associated with qualified vehicles in the field of view,
   wherein identifying qualified vehicles comprises:
     retrieving, from a provider server, a maximum monthly payment associated with a user;
     requesting, from the facility server, pricing associated with the vehicles;
     calculating monthly payments for the vehicles based on the pricing;
     comparing the monthly payments with the maximum monthly payment; and
     identifying vehicles with monthly payments below the maximum monthly payment as the qualified vehicles.

2. The system of claim 1, wherein
   determining a location of the mobile device comprises determining a location of a wearable device; and
   identifying qualified vehicles comprises retrieving qualification criteria stored in a memory device of the mobile device.

3. The system of claim 1, wherein identifying the at least one location attribute comprises:
   normalizing a plurality of images from the video feed;
   extracting secondary attributes from the images by employing a convolutional neural network;
   identifying vehicle contours in the images based on the secondary attributes; and
   categorizing the vehicle contours using classification models.

4. The system of claim 3, wherein the classification model identifies a vehicle make, a vehicle model, and a vehicle trim.

5. The system of claim 4, wherein the classification model further identifies a vehicle year and a vehicle color.

6. The system of claim 4, wherein generating the modified video feed comprises:
   retrieving, from a database, an augmented reality model for the qualified vehicles;
   selecting augmented reality models for qualified vehicles in the field of view based on the identified vehicle make, vehicle model, and vehicle trim line; and
   overlaying the selected augmented reality models on qualified vehicles in the field of view.

7. The system of claim 3, wherein:
   identifying the at least one location attribute comprises identifying a QR code within at least one of the vehicle contours;
   resolving the QR code to obtain a vehicle code;

transmitting the vehicle code to the facility server; and
receiving, from the facility server, a vehicle identification number and vehicle pricing information.

8. The system of claim 1, wherein generating the modified video feed further comprises overlaying a tag over the qualified vehicles in the field of view, the tag comprising corresponding pricing information.

9. The system of claim 1, wherein generating the modified video feed comprises changing the appearance of qualified vehicles by modifying a color of the qualified vehicles in the field of view.

10. The system of claim 9, wherein modifying the color comprises:
calculating an original color gradient for each one of the qualified vehicles in the field of view; and
replicating the color gradient with a highlighting color when modifying the color of the qualified vehicles in the field of view.

11. The system of claim 10, wherein generating the modified video feed further comprises modifying the color of non-qualified vehicles in the field of view to a color different from the highlighting color.

12. The system of claim 1, wherein:
requesting mapping data from a facility server comprises associating the vehicles with parking lot numbers;
identifying at least one location attribute comprises identifying numbers in the augmented reality viewer; and
determining whether the at least one location attribute matches at least one of the vehicles or the landmarks comprises determining whether the identified numbers match at least one of the parking lot numbers.

13. The system of claim 1, wherein:
identifying a facility comprises identifying a car dealership comprising a plurality of numbered parking lots;
the facility server is coupled to front and rear cameras from the vehicles; and
the facility server is configured to:
receive images from the front and rear cameras;
identifying one or more numbered parking lots from the images; and
updating the mapping data by correlating each of the plurality of vehicles with one or more of the plurality of numbered parking lots.

14. The system of claim 13, wherein:
the facility server is coupled to GPS systems of each of the plurality of vehicles; and
the vehicle location data comprises GPS information from each of the plurality of vehicles.

15. The system of claim 1, wherein:
generating the modified video feed comprises generating a graphical user interface displayed in the mobile device comprising the augmented reality viewer and a button; and
the operations further comprise:
in response to determining the at least one location attribute matches at least one of the plurality of vehicles or the landmarks, displaying a drop-down menu in the graphical user interface, the drop-down menu listing each of the qualified vehicles.

16. The system of claim 15, wherein
generating the graphical user interface comprises generating a second button in the graphical user interface, and
the operations further comprise:
in response to a user interaction with the second button:
generating a top-view map based on the mapping data, the top-view map comprising icons for the vehicles and icons for the landmarks, the icons associated with qualified vehicles having a different color than icons associated with non-qualified vehicles; and
overlying the top-view map over the graphical user interface; and
in response to determining that the at least one location attribute does not match at least one of the plurality of vehicles or the landmarks:
generating a retry message; and
displaying the retry message over the augmented reality viewer; and
in response to determining that none of the vehicles are qualified vehicles:
generating a notification graphical user interface, the notification graphical user interface indicating there are no qualified vehicles in the facility, the notification graphical user interface comprising a home button; and
overlaying the notification graphical user interface over the augmented reality viewer.

17. The system of claim 1, wherein determining whether at least one of the qualified vehicles is displayed in the augmented reality viewer comprises:
capturing a sample image from the video feed;
applying a classification function to the sample image, the classification function identifying vehicle model, vehicle make, and vehicle year; and
comparing the location of the mobile device with mapping data to identify a VIN.

18. A non-transitory computer-readable medium storing instructions that, when executed by a processor, cause the processor to operate an augmented reality system, the operations comprising:
determining a location of a mobile device;
identifying a facility based on the location;
requesting mapping data from a facility server, the mapping data comprising a plurality of vehicles, vehicle location data, and landmarks;
identifying at least one location attribute in a video feed captured by an augmented reality viewer displayed in the mobile device;
determining whether the at least one location attribute matches at least one of the vehicles or the landmarks;
in response to determining that the at least one location attribute matches at least one of the plurality of vehicles or the landmarks:
identifying qualified vehicles from the vehicles based on qualification criteria;
determining whether at least one of the qualified vehicles is in a field of view of the augmented reality viewer based on object attributes identified in the field of view and the vehicle location data; and
generating a modified video feed by providing an indication associated with qualified vehicles in the field of view,
wherein identifying qualified vehicles comprises:
retrieving, from a provider server, a maximum monthly payment associated with a user;
requesting, from the facility server, pricing associated with the vehicles;
calculating monthly payments for the vehicles based on the pricing;
comparing the monthly payments with the maximum monthly payment; and identifying vehicles with monthly payments below the maximum monthly payment as the qualified vehicles.

19. A computer-implemented method for generating augmented reality images, the method comprising:
- determining a location of a mobile device;
- identifying a facility based on the location;
- requesting mapping data from a facility server, the mapping data comprising a plurality of vehicles, vehicle location data, and landmarks;
- identifying at least one location attribute in a video feed captured by an augmented reality viewer displayed in the mobile device;
- determining whether the at least one location attribute matches at least one of the vehicles or the landmarks;
- in response to determining that the at least one location attribute matches at least one of the vehicles or the landmarks:
  - identifying qualified vehicles from the vehicles based on qualification criteria;
  - determining whether at least one of the qualified vehicles is in a field of view of the augmented reality viewer based on object attributes identified in the field of view and the vehicle location data; and
  - generating a modified video feed by providing an indication associated with qualified vehicles in the field of view;
- wherein identifying qualified vehicles comprises:
  - retrieving, from a provider server, a maximum monthly payment associated with a user;
  - requesting, from the facility server, pricing associated with the vehicles;
  - calculating monthly payments for the vehicles based on the pricing;
  - comparing the monthly payments with the maximum monthly payment; and
  - identifying vehicles with monthly payments below the maximum monthly payment as the qualified vehicles.

* * * * *